United States Patent
Silverbrook et al.

(10) Patent No.: US 7,775,616 B2
(45) Date of Patent: *Aug. 17, 2010

(54) PRINTHEAD HAVING CONTROLLERS FOR MULTI-CHANNEL PRINTHEAD MODULES

(75) Inventors: Kia Silverbrook, Balmain (AU); Mark Jackson Pulver, Balmain (AU); Simon Robert Walmsley, Balmain (AU); Michael John Webb, Balmain (AU); Richard Thomas Plunkett, Balmain (AU); John Robert Sheahan, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 2 days.

This patent is subject to a terminal disclaimer.

(21) Appl. No.: 11/766,061

(22) Filed: Jun. 20, 2007

(65) Prior Publication Data
US 2007/0242094 A1 Oct. 18, 2007

Related U.S. Application Data

(63) Continuation of application No. 10/854,506, filed on May 27, 2004, now Pat. No. 7,267,417.

(51) Int. Cl.
*B41J 29/38* (2006.01)
*B41J 2/16* (2006.01)
*B41J 2/155* (2006.01)

(52) U.S. Cl. .............. 347/13; 347/42; 347/49
(58) Field of Classification Search .............. 347/49, 347/50, 13
See application file for complete search history.

(56) References Cited

U.S. PATENT DOCUMENTS

| | | | | |
|---|---|---|---|---|
| 4,739,344 A | * | 4/1988 | Sullivan et al. | 346/76.1 |
| 5,043,740 A | | 8/1991 | Kneezel et al. | |
| 5,091,737 A | * | 2/1992 | Toganoh et al. | 347/50 |
| 5,198,054 A | * | 3/1993 | Drake et al. | 347/42 |
| 5,412,406 A | * | 5/1995 | Fujimoto | 347/13 |
| 5,581,284 A | | 12/1996 | Hermanson | |
| 5,926,201 A | * | 7/1999 | Fleming et al. | 347/13 |
| 6,068,367 A | * | 5/2000 | Fabbri | 347/49 |
| 6,243,109 B1 | * | 6/2001 | Ishinaga et al. | 347/5 |
| 6,247,788 B1 | | 6/2001 | Kamei | |
| 6,281,908 B1 | | 8/2001 | Gibson et al. | |
| 6,293,655 B1 | | 9/2001 | Imanaka et al. | |

(Continued)

FOREIGN PATENT DOCUMENTS

EP 0674993 A2 10/1995

(Continued)

*Primary Examiner*—Matthew Luu
*Assistant Examiner*—Shelby Fidler

(57) ABSTRACT

A printhead is provided having elongate printhead modules arranged parallel to each other to extend across a pagewidth and controllers for processing print data into dot data and for controlling the printhead modules in accordance with the dot data. Each printhead module has plural ink ejection nozzles. At least one of the printhead modules is longer than the other printhead modules. The controllers control ink ejection of the nozzles of the printhead modules in accordance with the dot data. At least one of the controllers is arranged to control all of the printhead modules and at least one other of the controllers is arranged to control only one of the printhead modules. Each controller has serial outputs for supplying the dot data for channels of the associated printhead module or modules.

7 Claims, 37 Drawing Sheets

U.S. PATENT DOCUMENTS

| | | |
|---|---|---|
| 6,318,828 B1 | 11/2001 | Barbour et al. |
| 6,350,004 B1 | 2/2002 | Askren |
| 6,367,903 B1 | 4/2002 | Gast et al. |
| 6,530,635 B2 | 3/2003 | Otsuki |
| 6,547,367 B1 | 4/2003 | Hamada |
| 6,554,387 B1 | 4/2003 | Otsuki |
| 6,652,052 B2 | 11/2003 | Silverbrook |
| 7,083,266 B2 * | 8/2006 | Ahne et al. .................. 347/59 |
| 2004/0046971 A1 * | 3/2004 | Lapstun et al. ............... 358/1.1 |
| 2004/0183843 A1 * | 9/2004 | Walmsley et al. ............. 347/12 |
| 2004/0223014 A1 | 11/2004 | Barr et al. |
| 2007/0176964 A1 * | 8/2007 | Silverbrook et al. .......... 347/40 |

FOREIGN PATENT DOCUMENTS

| | | |
|---|---|---|
| EP | 1029673 A1 | 8/2000 |
| WO | WO 00/06386 A | 2/2000 |

* cited by examiner

Note: All logic clocked on phiclk

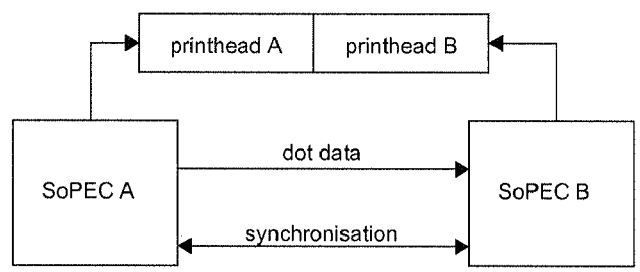
FIG. 45
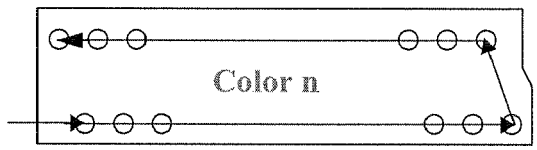
FIG. 46
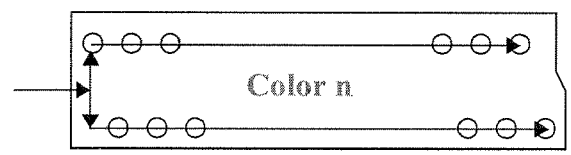
FIG. 47
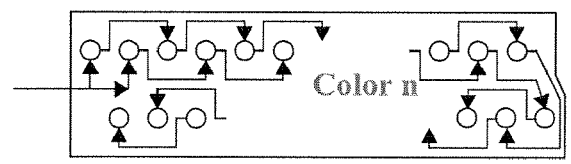
FIG. 48
| printhead 0 | printhead 1 | printhead 2 | - - - | printhead n |
FIG. 49

| Firing Order | | Row position | Adjusted Firing Order | | Row position relative to ideal segment row 0 |
|---|---|---|---|---|---|
| 1 | o o o o o o o o o o | 0 | 4 | o o o o o o o o o o | 0.3 |
| 6 | o o o o o o o o o o | 3.5 | 9 | o o o o o o o o o o | 3.8 |
| 2 | o o o o o o o o o o | 10.1 | 5 | o o o o o o o o o o | 10.4 |
| 7 | o o o o o o o o o o | 13.6 | 10 | o o o o o o o o o o | 13.9 |
| 3 | o o o o o o o o o o | 20.2 | 6 | o o o o o o o o o o | 20.5 |
| 8 | o o o o o o o o o o | 23.7 | 1 | o o o o o o o o o o | 24.0 |
| 4 | o o o o o o o o o o | 30.3 | 7 | o o o o o o o o o o | 30.6 |
| 9 | o o o o o o o o o o | 33.8 | 2 | o o o o o o o o o o | 34.1 |
| 5 | o o o o o o o o o o | 40.4 | 8 | o o o o o o o o o o | 40.7 |
| 10 | o o o o o o o o o o | 43.9 | 3 | o o o o o o o o o o | 44.2 |
| | Ideal segment | | | Segment misplaced by 0.3 line-pitches | |

FIG. 68

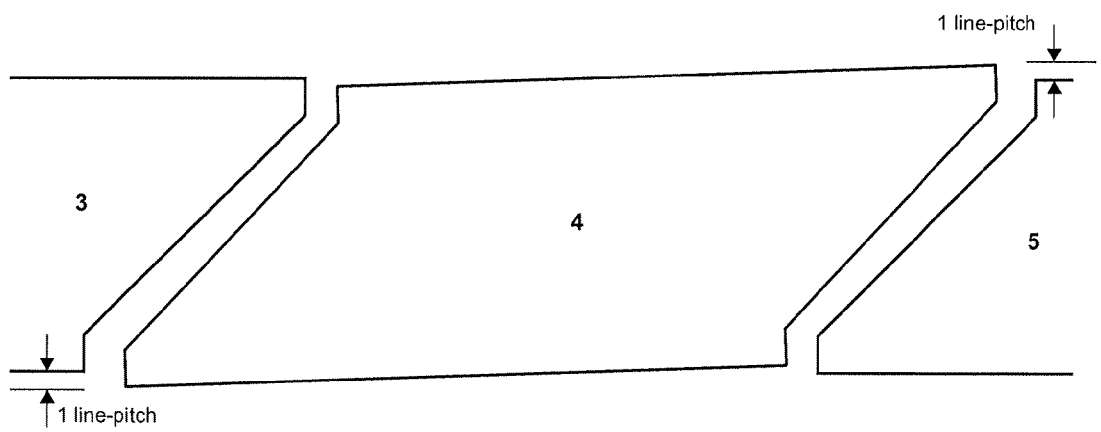

FIG. 69

PRINTHEAD HAVING CONTROLLERS FOR MULTI-CHANNEL PRINTHEAD MODULES

CROSS REFERENCE TO RELATED APPLICATIONS

This application is a continuation of U.S. application Ser. No. 10/854,506 filed on May 27, 2004, now issued U.S. Pat. No. 7,267,417, all of which are herein incorporated by reference.

FIELD OF THE INVENTION

The present invention relates to the field of printer controllers, which receive print data (usually from an external source such as a network or personal computer) and provide it to one or more printheads or other printing mechanisms.

The invention has primarily been developed for use in a pagewidth inkjet printer in which considerable data processing and ordering is required of the printer controller, and will be described with reference to this example. However, it will be appreciated that the invention is not limited to any particular type of printing technology, and may be used in, for example, non-pagewidth and non-inkjet printing applications.

CO-PENDING APPLICATIONS

Various methods, systems and apparatus relating to the present invention are disclosed in the following co-pending applications filed by the applicant or assignee of the present invention simultaneously with the present application:

| | | | | | |
|---|---|---|---|---|---|
| 10/854,521 | 10/854,522 | 10/854,488 | 10/854,487 | 10/854,503 | 10/854,504 |
| 10/854,509 | 7,188,928 | 7,093,989 | 10/854,497 | 10/854,495 | 10/854,498 |
| 10/854,511 | 10/854,512 | 10/854,525 | 10/854,526 | 10/854,516 | 10/854,508 |
| 10/854,515 | 10/854,506 | 10/854,505 | 10/854,493 | 10/854,494 | 10/854,489 |
| 10/854,490 | 10/854,492 | 10/854,491 | 10/854,528 | 10/854,523 | 10/854,527 |
| 10/854,524 | 10/854,520 | 10/854,514 | 10/854,519 | 10/854,513 | 10/854,499 |
| 10/854,501 | 10/854,500 | 10/854,502 | 10/854,518 | 10/854,517 | |

The disclosures of these co-pending applications are incorporated herein by cross-reference.

CROSS-REFERENCES

Various methods, systems and apparatus relating to the present invention are disclosed in the following co-pending applications filed by the applicant or assignee of the present invention. The disclosures of all of these co-pending applications are incorporated herein by cross-reference.

| | | | | | |
|---|---|---|---|---|---|
| 09/517,539 | 6,566,858 | 6,331,946 | 6,246,970 | 6,442,525 | 09/517,384 |
| 09/505,951 | 6,374,354 | 09/517,608 | 6,816,968 | 6,757,832 | 6,334,190 |
| 6,745,331 | 09/517,541 | 10/636,263 | 10/636,283 | 10/407,212 | 10/407,207 |
| 10/683,064 | 10/683,041 | 10/727,181 | 10/727,162 | 10/727,163 | 10/727,245 |
| 7,121,639 | 7,165,824 | 7,152,942 | 10/727,157 | 7,181,572 | 7,096,137 |
| 10/727,257 | 10/727,238 | 7,188,282 | 10/727,159 | 10/727,180 | 10/727,179 |
| 10/727,192 | 10/727,274 | 10/727,164 | 10/727,161 | 10/727,198 | 10/727,158 |
| 10/754,536 | 10/754,938 | 10/727,227 | 10/727,160 | 6,795,215 | 6,859,289 |
| 6,977,751 | 6,398,332 | 6,394,573 | 6,622,923 | 6,747,760 | 6,921,144 |
| 10/780,624 | 7,194,629 | 10/791,792 | 7,182,267 | 7,025,279 | 6,857,571 |
| 6,817,539 | 6,830,198 | 6,992,791 | 7,038,809 | 6,980,323 | 7,148,992 |
| 7,139,091 | 6,947,173 | | | | |

BACKGROUND OF THE INVENTION

In a printhead module comprising a plurality of nozzles, there is always the possibility that a manufacturing defect, or over time in service, will cause one or more nozzle to fail. A failed nozzle can sometimes be corrected by error diffusion or color replacement. However, these solutions at best provide approximations of the color missing due to the defective nozzle.

The chances of a nozzle defect increases at least linearly with the number of nozzles on the printhead module, both through the increase in sample space for a failure to occur, and the reduction in nozzle size which requires higher tolerances. Defective chips reduce yield, which increases the effective cost of the remaining chips. Nozzles that fail in chips in service increase the costs of providing warranty cover.

It may also be desirable to reduce the rate at which nozzles fire in printhead. This may be, for example, to reduce thermal problems or can be the result of the desired nozzle fire rate exceeding the rate at which any given nozzle can fire.

The Applicant has designed a printhead that incorporates one or more redundant rows of nozzles. It would be desirable to provide a printer controller capable of providing data to such a printhead.

SUMMARY OF THE INVENTION

In a first aspect the present invention provides a printhead comprising:

A printhead comprising:

a plurality of elongate printhead modules arranged parallel to each other to extend across a pagewidth, each printhead module having a plurality of ink ejection nozzles, at least one of the printhead modules being longer than the other printhead modules; and a plurality of controllers for processing print data into dot data and for controlling ink ejection of the nozzles of the printhead modules in accordance with the dot data, at least one of the controllers being arranged to control all of the printhead modules and at least one other of the controllers being arranged to control only one of the printhead modules, each controller having a plurality of serial outputs for supplying the dot data for a plurality of channels of the associated printhead module or modules.

In each printhead module, the at least two channels may include at least two color channels, at least one fixative channel and/or at least one infrared ink channel.

The at least one other of the controllers may be arranged to receive at least some of the dot data generated by the at least one controller and the at least one other of the controllers may be configured to control the respective printhead module based on the dot data generated thereby and the received dot data.

The controllers may be connected to a common input of the printhead modules.

The printhead modules may be configured such that no dot data passes between them.

At least one of the controllers may be configured to output to the associated printhead module or modules dot data to be printed with at least two different inks and control data for controlling printing of the dot data.

DETAILED DESCRIPTION OF PREFERRED EMBODIMENT

Figure 1:
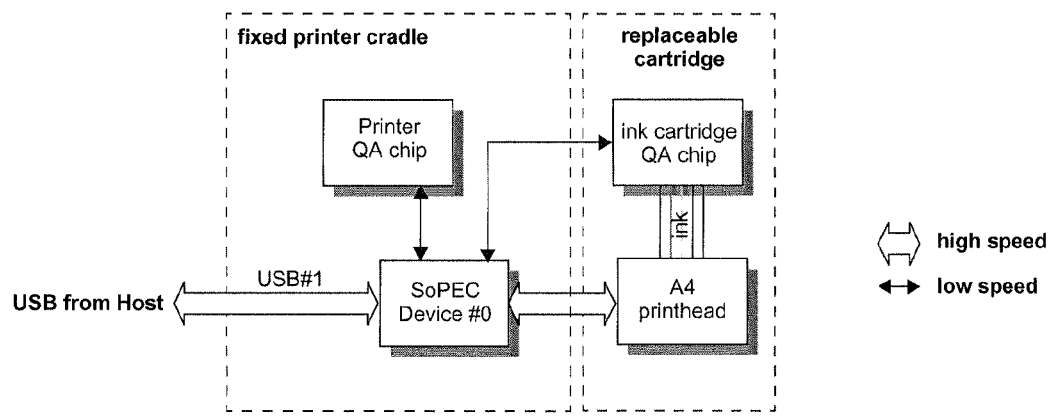
FIG. 1. Single SoPEC A4 Simplex system
FIG. 2. Dual SoPEC A4 Simplex system
FIG. 3. Dual SoPEC A4 Duplex system
FIG. 4. Dual SoPEC A3 simplex system
FIG. 5. Quad SoPEC A3 duplex system
FIG. 6. SoPEC A4 Simplex system with extra SoPEC used as DRAM storage
FIG. 7. SoPEC A4 Simplex system with network connection to Host PC
FIG. 8. Document data flow
FIG. 9. Pages containing different numbers of bands
FIG. 10. Contents of a page band
FIG. 11. Page data path from host to SoPEC
FIG. 12. Page structure
FIG. 13. SoPEC System Top Level partition
FIG. 14. High level block diagram of DNC
FIG. 15. Dead nozzle table format
FIG. 16. Set of dots operated on for error diffusion
FIG. 17. Block diagram of DNC
FIG. 18. Printhead Nozzle Layout for conceptual 36 Nozzle AB single segment printhead
FIG. 19. Paper and printhead nozzles relationship (example with $D_1=D_2=5$)
FIG. 20. Dot line store logical representation
FIG. 21. Conceptual view of 2 adjacent printhead segments possible row alignment
FIG. 22. Conceptual view of 2 adjacent printhead segments row alignment (as seen by the LLU)
FIG. 23. Paper and printhead nozzles relationship (example with $D_1=D_2=5$)
FIG. 24. Conceptual view of vertically misaligned printhead segment rows (external)
FIG. 25. Conceptual view of vertically misaligned printhead segment rows (internal)
FIG. 26. Conceptual view of color dependent vertically misaligned printhead segment rows (internal)
FIG. 27. Conceptual horizontal misalignment between segments
FIG. 28. Relative positions of dot fired (example cases)
FIG. 29. PHI to linking printhead connection (Single SoPEC)
FIG. 30. PHI to linking printhead connection (2 SoPECs)
FIG. 31. CPU command word format
FIG. 32. Example data and command sequence on a print head channel
FIG. 33. PHI block partition
FIG. 34. Data generator state diagram
FIG. 35. PHI mode Controller
FIG. 36. Encoder RTL diagram
FIG. 37. 28-bit scrambler
FIG. 38. Printing with 1 SoPEC
FIG. 39. Printing with 2 SoPECs (existing hardware)
FIG. 40. Each SoPEC generates dot data and writes directly to a single printhead
FIG. 41. Each SoPEC generates dot data and writes directly to a single printhead
FIG. 42. Two SoPECs generate dots and transmit directly to the larger printhead
FIG. 43. Serial Load
FIG. 44. Parallel Load
FIG. 45. Two SoPECs generate dot data but only one transmits directly to the larger printhead
FIG. 46. Odd and Even nozzles on same shift register
FIG. 47. Odd and Even nozzles on different shift registers
FIG. 48. Interwoven shift registers
FIG. 49. Linking Printhead Concept
FIG. 50. Linking Printhead 30 ppm
FIG. 51. Linking Printhead 60 ppm
FIG. 52. Theoretical 2 tiles assembled as A-chip/A-chip—right angle join
FIG. 53. Two tiles assembled as A-chip/A-chip
FIG. 54. Magnification of color n in A-chip/A-chip
FIG. 55. A-chip/A-chip growing offset
FIG. 56. A-chip/A-chip aligned nozzles, sloped chip placement
FIG. 57. Placing multiple segments together
FIG. 58. Detail of a single segment in a multi-segment configuration
FIG. 59. Magnification of inter-slope compensation
FIG. 60. A-chip/B-chip
FIG. 61. A-chip/B-chip multi-segment printhead
FIG. 62. Two A-B-chips linked together
FIG. 63. Two A-B-chips with on-chip compensation
FIG. 64. SoPEC System top level partition
FIG. 65. Print construction and Nozzle position
FIG. 66. Conceptual horizontal misplacement between segments
FIG. 67. Printhead row positioning and default row firing order
FIG. 68. Firing order of fractionally misaligned segment
FIG. 69. Example of yaw in printhead IC misplacement
FIG. 70. Vertical nozzle spacing
FIG. 71. Single printhead chip plus connection to second chip
FIG. 72. Two printheads connected to form a larger printhead
FIG. 73. Colour arrangement.

A printhead having SoPEC ASICs (Small office home office Print Engine Controller) suitable for use in price sensitive SoHo printer products is provided. The SoPEC ASIC is intended to be a relatively low cost solution for linking printhead control, replacing the multichip solutions in larger more professional systems with a single chip. The increased cost competitiveness is achieved by integrating several systems such as a modified PEC1 printing pipeline, CPU control system, peripherals and memory sub-system onto one SoC ASIC, reducing component count and simplifying board design. SoPEC contains features making it suitable for multifunction or "all-in-one" devices as well as dedicated printing systems.

Basic features of the preferred embodiment of SoPEC include:
- Continuous 30 ppm operation for 1600 dpi output at A4/Letter.
- Linearly scalable (multiple SoPECs) for increased print speed and/or page width.
- 192 MHz internal system clock derived from low-speed crystal input
- PEP processing pipeline, supports up to 6 color channels at 1 dot per channel per clock cycle
- Hardware color plane decompression, tag rendering, halftoning and compositing
- Data formatting for Linking Printhead
- Flexible compensation for dead nozzles, printhead misalignment etc.
- Integrated 20 Mbit (2.5 MByte) DRAM for print data and CPU program store
- LEON SPARC v8 32-bit RISC CPU
- Supervisor and user modes to support multi-threaded software and security
- 1 kB each of I-cache and D-cache, both direct mapped, with optimized 256-bit fast cache update.
- 1×USB2.0 device port and 3×USB2.0 host ports (including integrated PHYs)
- Support high speed (480 Mbit/sec) and full speed (12 Mbit/sec) modes of USB2.0
- Provide interface to host PC, other SoPECs, and external devices e.g. digital camera
- Enable alternative host PC interfaces e.g. via external USB/ethernet bridge
- Glueless high-speed serial LVDS interface to multiple Linking Printhead chips
- 64 remappable GPIOs, selectable between combinations of integrated system control components:
- 2×LSS interfaces for QA chip or serial EEPROM
- LED drivers, sensor inputs, switch control outputs
- Motor controllers for stepper and brushless DC motors
- Microprogrammed multi-protocol media interface for scanner, external RAM/Flash, etc.
- 112-bit unique ID plus 112-bit random number on each device, combined for security protocol support
- IBM Cu-11 0.13 micron CMOS process, 1.5V core supply, 3.3V IO.
- 208 pin Plastic Quad Flat Pack The preferred embodiment linking printhead produces 1600 dpi bi-level dots. On low-diffusion paper, each ejected drop forms a 22.5 µm diameter dot. Dots are easily produced in isolation, allowing dispersed-dot dithering to be exploited to its fullest. Since the preferred form of the linking printhead is pagewidth and operates with a constant paper velocity, color planes are printed in good registration, allowing dot-on-dot printing. Dot-on-dot printing minimizes 'muddying' of midtones caused by inter-color bleed.

The SoPEC device can be used in several printer configurations and architectures. In the general sense, every preferred embodiment SoPEC-based printer architecture will contain:
- One or more SoPEC devices.
- One or more linking printheads.
- Two or more LSS busses.
- Two or more QA chips.
- Connection to host, directly via USB2.0 or indirectly.
- Connections between SoPECs (when multiple SoPECs are used).

The SoPEC device contains several system on a chip (SoC) components, as well as the print engine pipeline control application specific logic.

The print engine pipeline (PEP) reads compressed page store data from the embedded memory, optionally decompresses the data and formats it for sending to the printhead. The print engine pipeline functionality includes expanding the page image, dithering the contone layer, compositing the black layer over the contone layer, rendering of Netpage tags, compensation for dead nozzles in the printhead, and sending the resultant image to the linking printhead.

SoPEC contains an embedded CPU for general-purpose system configuration and management. The CPU performs page and band header processing, motor control and sensor monitoring (via the GPIO) and other system control functions. The CPU can perform buffer management or report buffer status to the host. The CPU can optionally run vendor application specific code for general print control such as paper ready monitoring and LED status update.

The printhead is constructed by abutting a number of printhead ICs together. Each SoPEC can drive up to 12 printhead ICs at data rates up to 30 ppm or 6 printhead ICs at data rates up to 60 ppm. For higher data rates, or wider printheads, multiple SoPECs must be used.

In a multi-SoPEC system, the primary communication channel is from a USB2.0 Host port on one SoPEC (the ISCMaster), to the USB2.0 Device port of each of the other SoPECs (ISCSlaves). If there are more ISCSlave SoPECs than available USB Host ports on the ISCMaster, additional connections could be via a USB Hub chip, or daisy-chained SoPEC chips. Typically one or more of SoPEC's GPIO signals would also be used to communicate specific events between multiple SoPECs.

In FIG. 1, a single SoPEC device is used to control a linking printhead with 11 printhead ICs. The SoPEC receives compressed data from the host through its USB device port. The compressed data is processed and transferred to the printhead. This arrangement is limited to a speed of 30 ppm. The single SoPEC also controls all printer components such as motors, LEDs, buttons etc, either directly or indirectly.

Figure 2:
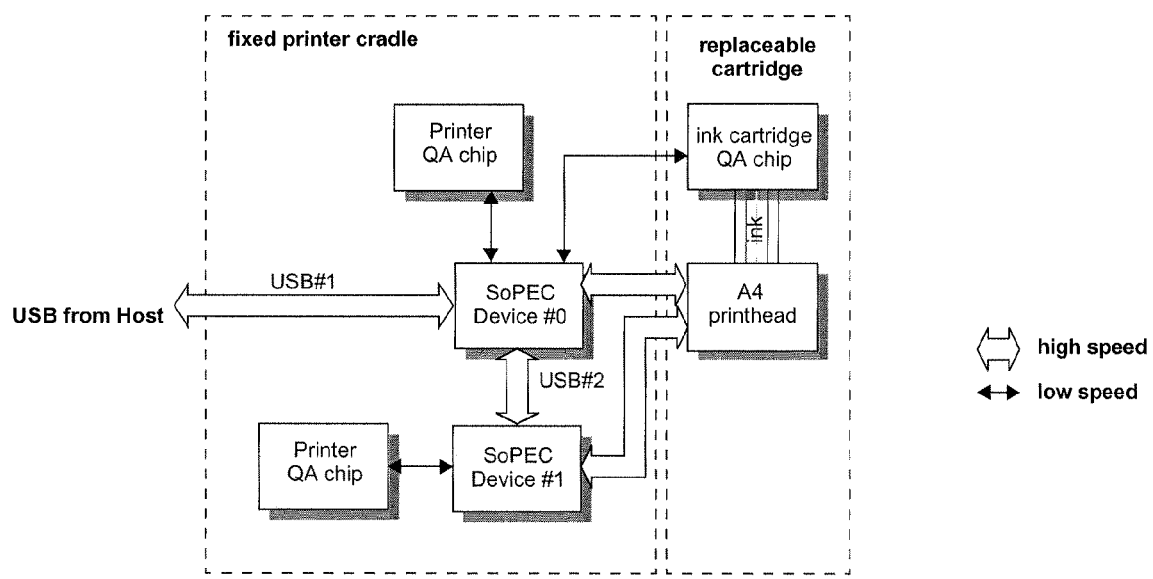

In FIG. 2, two SoPECs control a single linking printhead, to provide 60 ppm A4 printing. Each SoPEC drives 5 or 6 of the printheads ICs that make up the complete printhead. SoPEC #0 is the ISCMaster, SoPEC #1 is an ISCSlave. The ISCMaster receives all the compressed page data for both SoPECs and re-distributes the compressed data for the ISCSlave over a local USB bus. There is a total of 4 MBytes of page store memory available if required. Note that, if each page has 2 MBytes of compressed data, the USB2.0 interface to the host needs to run in high speed (not full speed) mode to sustain 60 ppm printing. (In practice, many compressed pages will be much smaller than 2 MBytes). The control of printer components such as motors, LEDs, buttons etc, is shared between the 2 SoPECs in this configuration.

Figure 3:
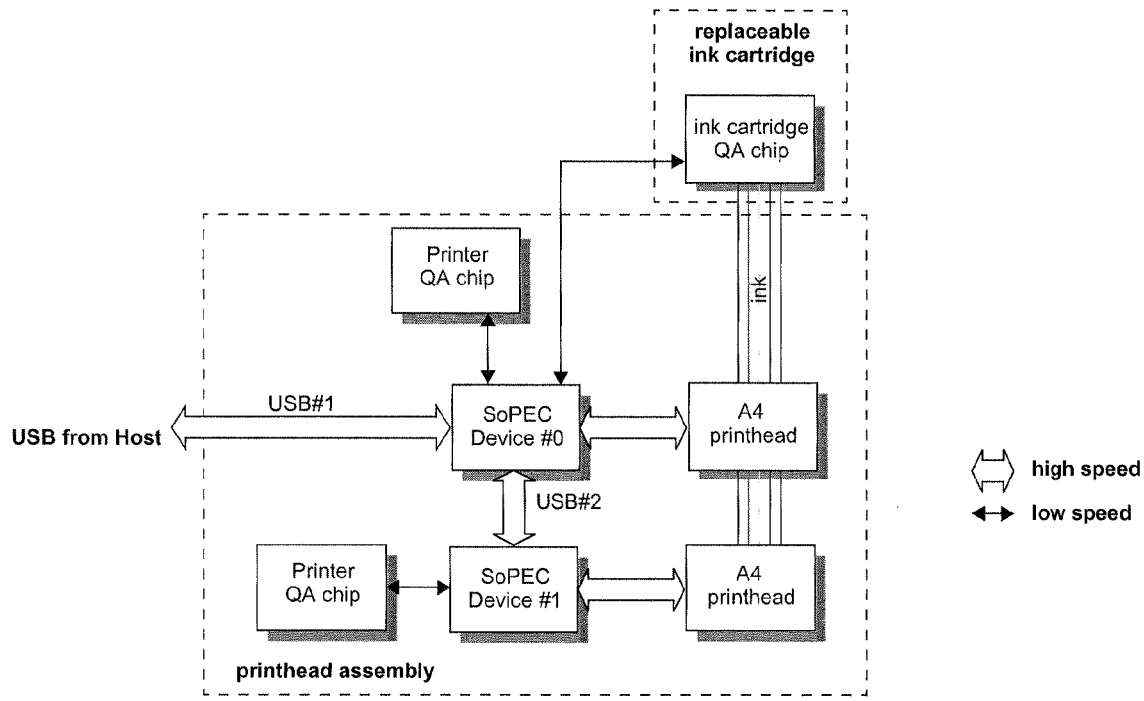

In FIG. 3, two SoPEC devices are used to control two printheads. Each printhead prints to opposite sides of the same page to achieve duplex printing. SoPEC #0 is the ISCMaster, SoPEC #1 is an ISCSlave. The ISCMaster receives all the compressed page data for both SoPECs and re-distributes the compressed data for the ISCSlave over a local USB bus. This configuration could print 30 double-sided pages per minute.

Figure 4:
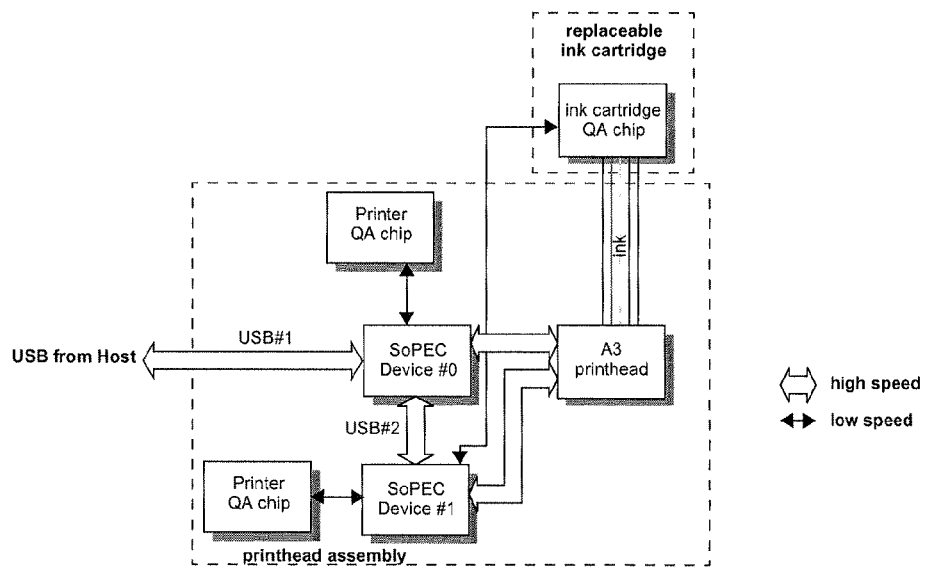

In FIG. 4, two SoPEC devices are used to control one A3 linking printhead, constructed from 16 printhead ICs. Each SoPEC controls 8 printhead ICs. This system operates in a similar manner to the 60 ppm A4 system in FIG. 2, although the speed is limited to 30 ppm at A3, since each SoPEC can only drive 6 printhead ICs at 60 ppm speeds. A total of 4 Mbyte of page store is available, this allows the system to use compression rates as in a single SoPEC A4 architecture, but with the increased page size of A3.

Figure 5:
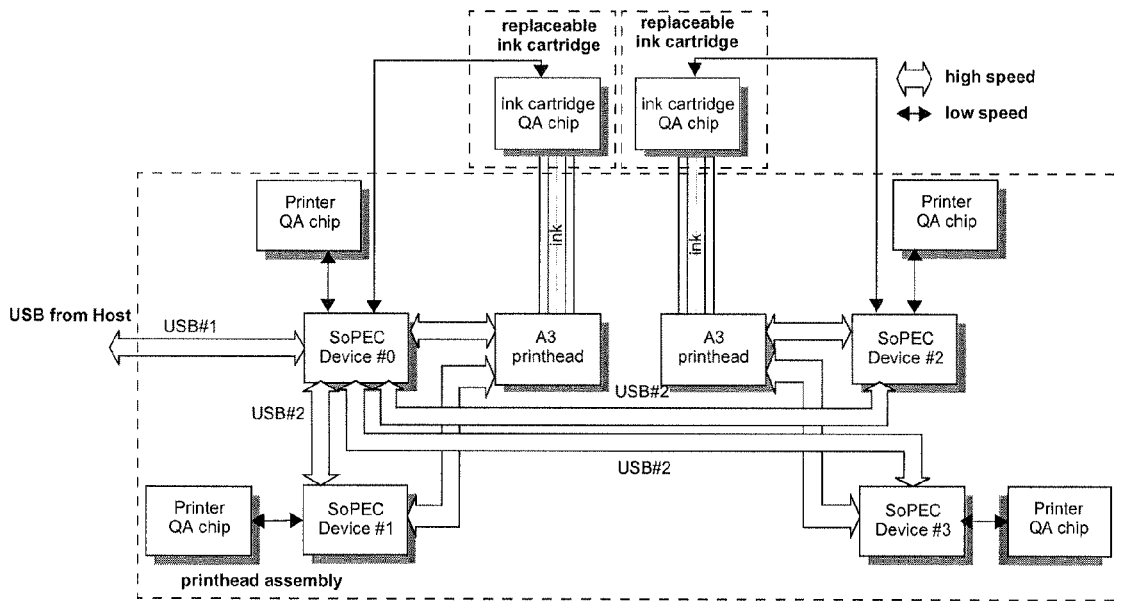

In FIG. 5 a four SoPEC system is shown. It contains 2 A3 linking printheads, one for each side of an A3 page. Each printhead contain 16 printhead ICs, each SoPEC controls 8 printhead ICs. SoPEC #0 is the ISCMaster with the other SoPECs as ISCSlaves. Note that all 3 USB Host ports on SoPEC #0 are used to communicate with the 3 ISCSlave SoPECs. In total, the system contains 8 Mbytes of compressed page store (2 Mbytes per SoPEC), so the increased page size does not degrade the system print quality, from that of an A4 simplex printer. The ISCMaster receives all the compressed page data for all SoPECs and re-distributes the compressed data over the local USB bus to the ISCSlaves. This configuration could print 30 double-sided A3 sheets per minute.

Figure 6:
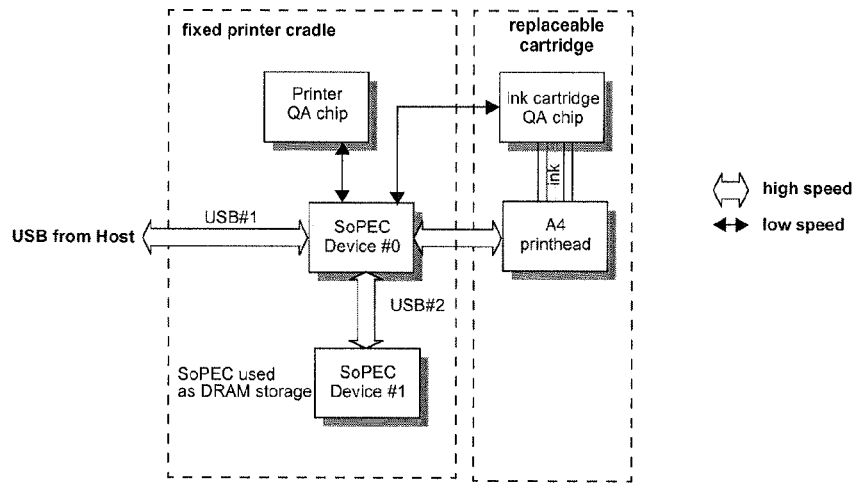
Figure 7:
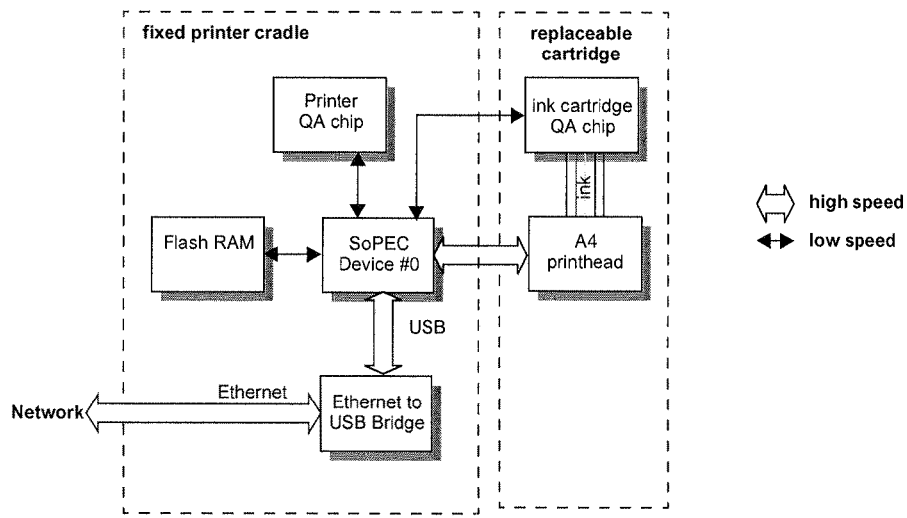
Figure 8:
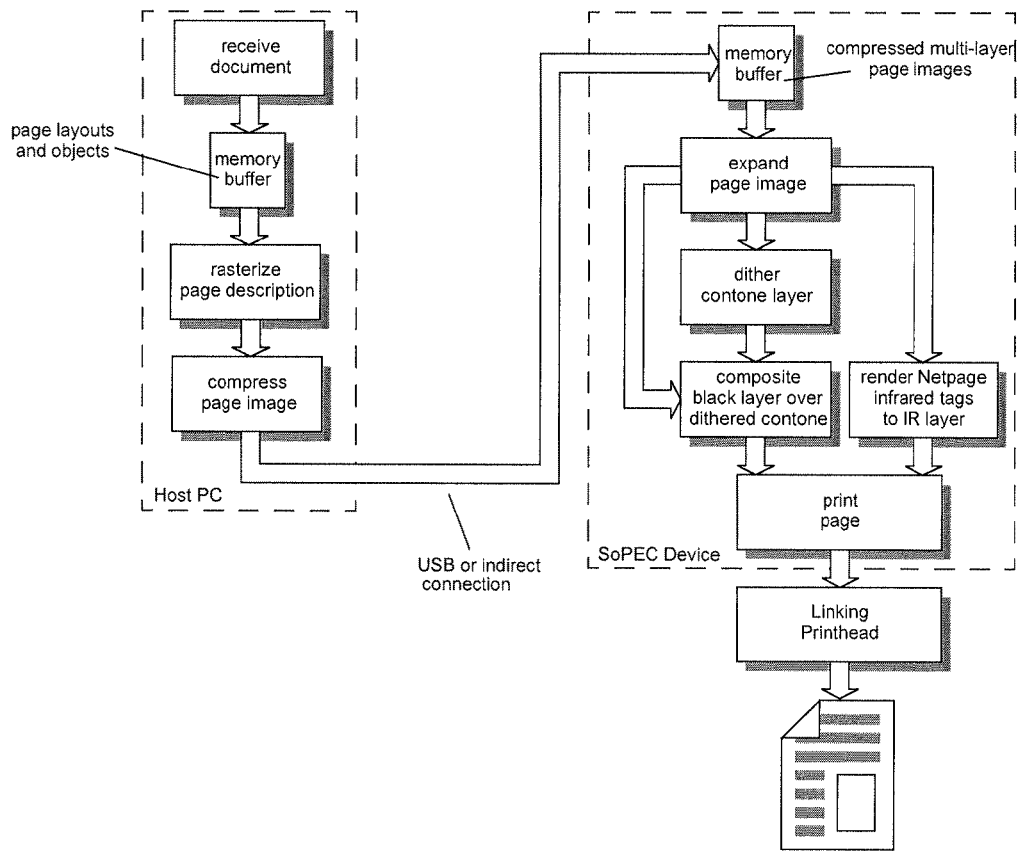
Figure 9:
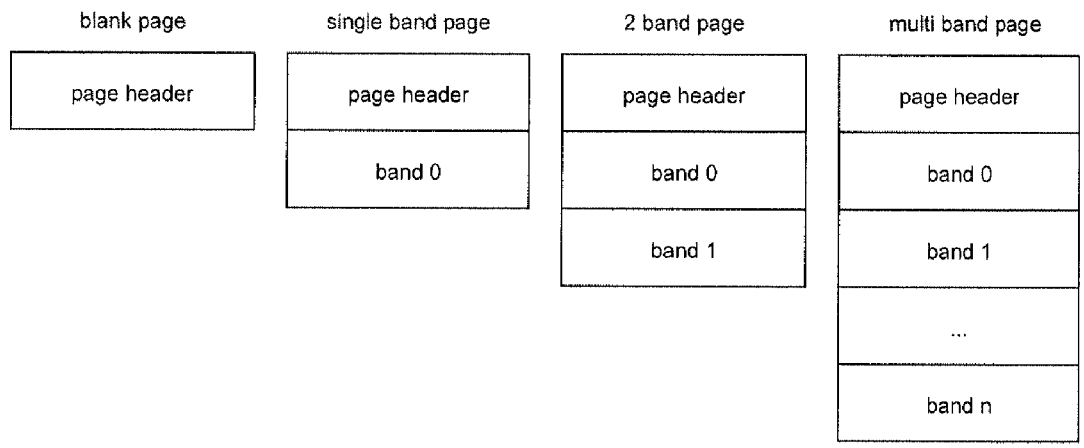
Figure 10:
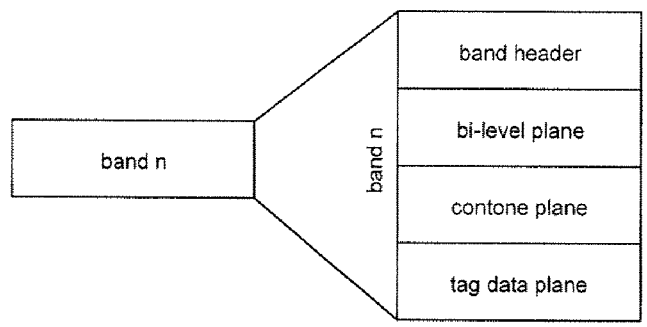
Figure 11:
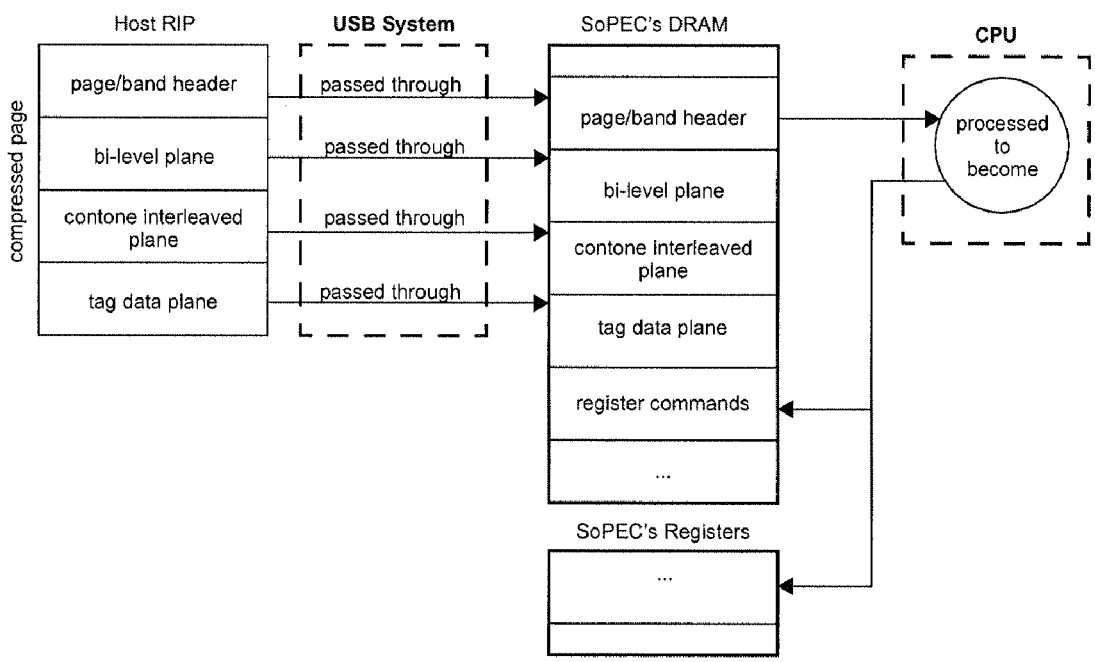
Figure 12:
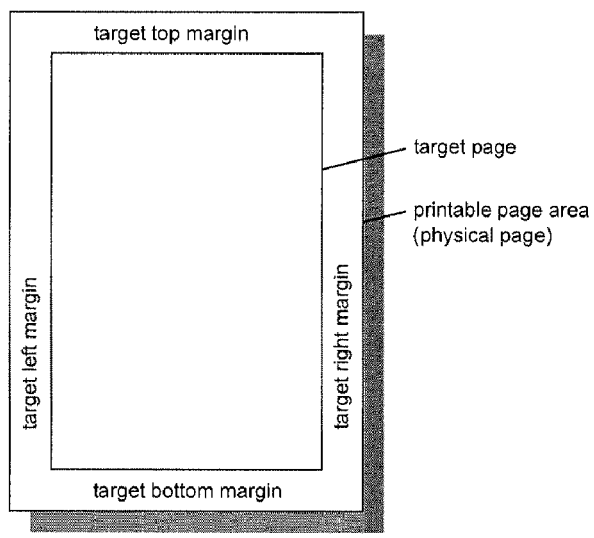

Extra SoPECs can be used for DRAM storage e.g. in FIG. 6 an A4 simplex printer can be built with a single extra SoPEC used for DRAM storage. The DRAM SoPEC can provide guaranteed bandwidth delivery of data to the printing SoPEC. SoPEC configurations can have multiple extra SoPECs used for DRAM storage.

The Host PC rasterizes and compresses the incoming document on a page by page basis. The page is restructured into bands with one or more bands used to construct a page. The compressed data is then transferred to the SoPEC device directly via a USB link, or via an external bridge e.g. from ethernet to USB. A complete band is stored in SoPEC embedded memory. Once the band transfer is complete the SoPEC device reads the compressed data, expands the band, normalizes contone, bi-level and tag data to 1600 dpi and transfers the resultant calculated dots to the linking printhead.

The document data flow is
The RIP software rasterizes each page description and compress the rasterized page image.
The infrared layer of the printed page optionally contains encoded Netpage tags at a programmable density.
The compressed page image is transferred to the SoPEC device via the USB (or ethernet), normally on a band by band basis.
The print engine takes the compressed page image and starts the page expansion.
The first stage page expansion consists of 3 operations performed in parallel
expansion of the JPEG-compressed contone layer
expansion of the SMG4 fax compressed bi-level layer
encoding and rendering of the bi-level tag data.
The second stage dithers the contone layer using a programmable dither matrix, producing up to four bi-level layers at full-resolution.
The third stage then composites the bi-level tag data layer, the bi-level SMG4 fax de-compressed layer and up to four bi-level JPEG de-compressed layers into the full-resolution page image.
A fixative layer is also generated as required.
The last stage formats and prints the bi-level data through the linking printhead via the printhead interface.

The SoPEC device can print a full resolution page with 6 color planes. Each of the color planes can be generated from compressed data through any channel (either JPEG compressed, bi-level SMG4 fax compressed, tag data generated, or fixative channel created) with a maximum number of 6 data channels from page RIP to linking printhead color planes.

The mapping of data channels to color planes is programmable. This allows for multiple color planes in the printhead to map to the same data channel to provide for redundancy in the printhead to assist dead nozzle compensation.

Also a data channel could be used to gate data from another data channel. For example in stencil mode, data from the bilevel data channel at 1600 dpi can be used to filter the contone data channel at 320 dpi, giving the effect of 1600 dpi edged contone images, such as 1600 dpi color text.

The SoPEC is a page rendering engine ASIC that takes compressed page images as input, and produces decompressed page images at up to 6 channels of bi-level dot data as output. The bi-level dot data is generated for the Memjet linking printhead. The dot generation process takes account of printhead construction, dead nozzles, and allows for fixative generation.

A single SoPEC can control up to 12 linking printheads and up to 6 color channels at >10,000 lines/sec, equating to 30 pages per minute. A single SoPEC can perform full-bleed printing of A4 and Letter pages. The 6 channels of colored ink are the expected maximum in a consumer SOHO, or office Memjet printing environment:
CMY, for regular color printing.
K, for black text, line graphics and gray-scale printing.
IR (infrared), for Netpage-enabled applications.
F (fixative), to enable printing at high speed. Because the Memjet printer is capable of printing so fast, a fixative may be required on specific media types (such as calendared paper) to enable the ink to dry before the page touches a previously printed page. Otherwise the pages may bleed on each other. In low speed printing environments, and for plain and photo paper, the fixative is not be required.

SoPEC is color space agnostic. Although it can accept contone data as CMYX or RGBX, where X is an optional 4th channel (such as black), it also can accept contone data in any print color space. Additionally, SoPEC provides a mechanism for arbitrary mapping of input channels to output channels, including combining dots for ink optimization, generation of channels based on any number of other channels etc. However, inputs are typically CMYK for contone input, K for the bi-level input, and the optional Netpage tag dots are typically rendered to an infra-red layer. A fixative channel is typically only generated for fast printing applications.

SoPEC is resolution agnostic. It merely provides a mapping between input resolutions and output resolutions by means of scale factors. The expected output resolution is 1600 dpi, but SoPEC actually has no knowledge of the physical resolution of the linking printhead.

SoPEC is page-length agnostic. Successive pages are typically split into bands and downloaded into the page store as each band of information is consumed and becomes free. SoPEC provides mechanisms for synchronization with other SoPECs. This allows simple multi-SoPEC solutions for simultaneous A3/A4/Letter duplex printing. However, SoPEC is also capable of printing only a portion of a page image. Combining synchronization functionality with partial page rendering allows multiple SoPECs to be readily combined for alternative printing requirements including simultaneous duplex printing and wide format printing.

Figure 13:
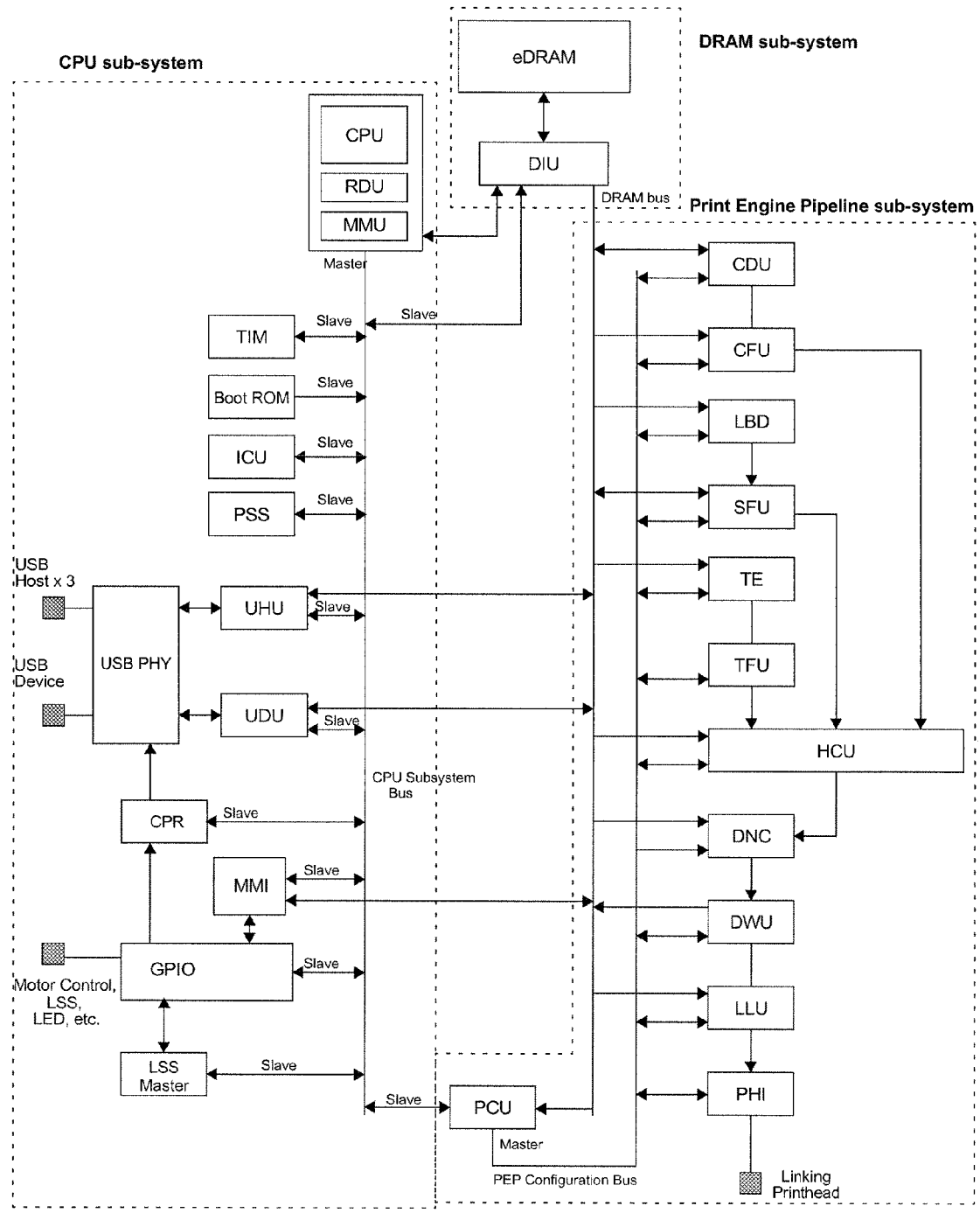

From the highest point of view the SoPEC device consists of 3 distinct subsystems
  CPU Subsystem
  DRAM Subsystem
  Print Engine Pipeline (PEP) Subsystem See FIG. 13 for a block level diagram of SoPEC.

The CPU subsystem controls and configures all aspects of the other subsystems. It provides general support for interfacing and synchronising the external printer with the internal print engine. It also controls the low speed communication to the QA chips. The CPU subsystem contains various peripherals to aid the CPU, such as GPIO (includes motor control), interrupt controller, LSS Master, MMI and general timers. The CPR block provides a mechanism for the CPU to powerdown and reset individual sections of SoPEC. The UDU and UHU provide high-speed USB2.0 interfaces to the host, other SoPEC devices, and other external devices. For security, the CPU supports user and supervisor mode operation, while the CPU subsystem contains some dedicated security components.

The DRAM subsystem accepts requests from the CPU, UHU, UDU, MMI and blocks within the PEP subsystem. The DRAM subsystem (in particular the DIU) arbitrates the various requests and determines which request should win access to the DRAM. The DIU arbitrates based on configured parameters, to allow sufficient access to DRAM for all requesters. The DIU also hides the implementation specifics of the DRAM such as page size, number of banks, refresh rates etc.

The PEP subsystem accepts compressed pages from DRAM and renders them to bi-level dots for a given print line destined for a printhead interface that communicates directly with up to 12 linking printhead ICs.

The first stage of the page expansion pipeline is the CDU, LBD and TE. The CDU expands the JPEG-compressed contone (typically CMYK) layer, the LBD expands the compressed bi-level layer (typically K), and the TE encodes Netpage tags for later rendering (typically in IR, Y or K ink). The output from the first stage is a set of buffers: the CFU, SFU, and TFU. The CFU and SFU buffers are implemented in DRAM.

The second stage is the HCU, which dithers the contone layer, and composites position tags and the bi-level spot0 layer over the resulting bi-level dithered layer. A number of options exist for the way in which compositing occurs. Up to 6 channels of bi-level data are produced from this stage. Note that not all 6 channels may be present on the printhead. For example, the printhead may be CMY only, with K pushed into the CMY channels and IR ignored. Alternatively, the position tags may be printed in K or Y if IR ink is not available (or for testing purposes).

The third stage (DNC) compensates for dead nozzles in the printhead by color redundancy and error diffusing dead nozzle data into surrounding dots.

The resultant bi-level 6 channel dot-data (typically CMYK-IRF) is buffered and written out to a set of line buffers stored in DRAM via the DWU.

Finally, the dot-data is loaded back from DRAM, and passed to the printhead interface via a dot FIFO. The dot FIFO accepts data from the LLU up to 2 dots per system clock cycle, while the PHI removes data from the FIFO and sends it to the printhead at a maximum rate of 1.5 dots per system clock cycle.

SoPEC must address
  20 Mbit DRAM.
  PCU addressed registers in PEP.
  CPU-subsystem addressed registers.

SoPEC has a unified address space with the CPU capable of addressing all CPU-subsystem and PCU-bus accessible registers (in PEP) and all locations in DRAM. The CPU generates byte-aligned addresses for the whole of SoPEC. 22 bits are sufficient to byte address the whole SoPEC address space.

The embedded DRAM is composed of 256-bit words. Since the CPU-subsystem may need to write individual bytes of DRAM, the DIU is byte addressable. 22 bits are required to byte address 20 Mbits of DRAM.

Most blocks read or write 256-bit words of DRAM. For these blocks only the top 17 bits i.e. bits 21 to 5 are required to address 256-bit word aligned locations.

The exceptions are
  CDU which can write 64-bits so only the top 19 address bits i.e. bits 21-3 are required.
  The CPU-subsystem always generates a 22-bit byte-aligned DIU address but it will send flags to the DIU indicating whether it is an 8, 16 or 32-bit write.
  The UHU and UDU generate 256-bit aligned addresses, with a byte-wise write mask associated with each data word, to allow effective byte addressing of the DRAM.

Regardless of the size no DIU access is allowed to span a 256-bit aligned DRAM word boundary.

PEP Unit configuration registers which specify DRAM locations should specify 256-bit aligned DRAM addresses i.e. using address bits 21:5. Legacy blocks from PEC1 e.g. the LBD and TE may need to specify 64-bit aligned DRAM addresses if these reused blocks DRAM addressing is difficult to modify. These 64-bit aligned addresses require address bits 21:3. However, these 64-bit aligned addresses should be programmed to start at a 256-bit DRAM word boundary. Unlike PEC1, there are no constraints in SoPEC on data organization in DRAM except that all data structures must start on a 256-bit DRAM boundary. If data stored is not a multiple of 256-bits then the last word should be padded.

The CPU subsystem bus supports 32-bit word aligned read and write accesses with variable access timings. The CPU subsystem bus does not currently support byte reads and writes.

Figure 14:
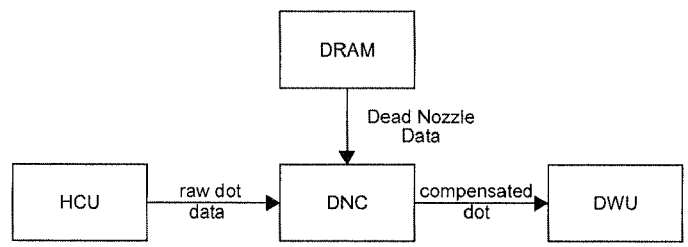

The Dead Nozzle Compensator (DNC) is responsible for adjusting Memjet dot data to take account of non-functioning nozzles in the Memjet printhead. Input dot data is supplied from the HCU, and the corrected dot data is passed out to the DWU. The high level data path is shown by the block diagram in FIG. 14.

The DNC compensates for a dead nozzles by performing the following operations:
  Dead nozzle removal, i.e. turn the nozzle off
  Ink replacement by direct substitution e.g. K->Alternative
  Ink replacement by indirect substitution e.g. K->CMY
  Error diffusion to adjacent nozzles
  Fixative corrections The DNC is required to efficiently support up to 5% dead nozzles, under the expected DRAM bandwidth allocation, with no restriction on where dead nozzles are located and handle any fixative correction due to nozzle compensations. Performance must degrade gracefully after 5% dead nozzles.

Figure 15:
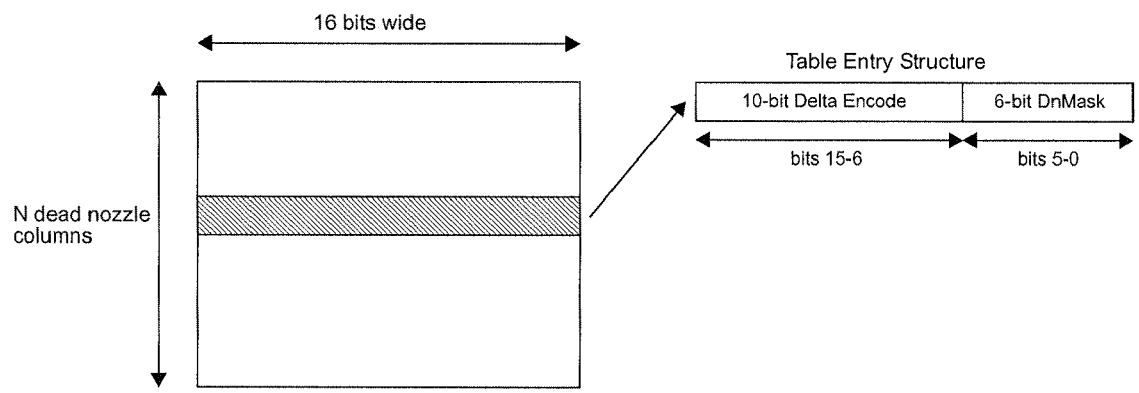
Figure 16:
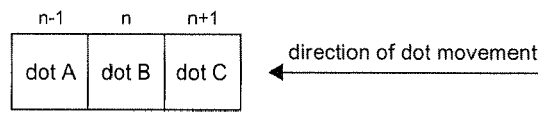
Figure 17:
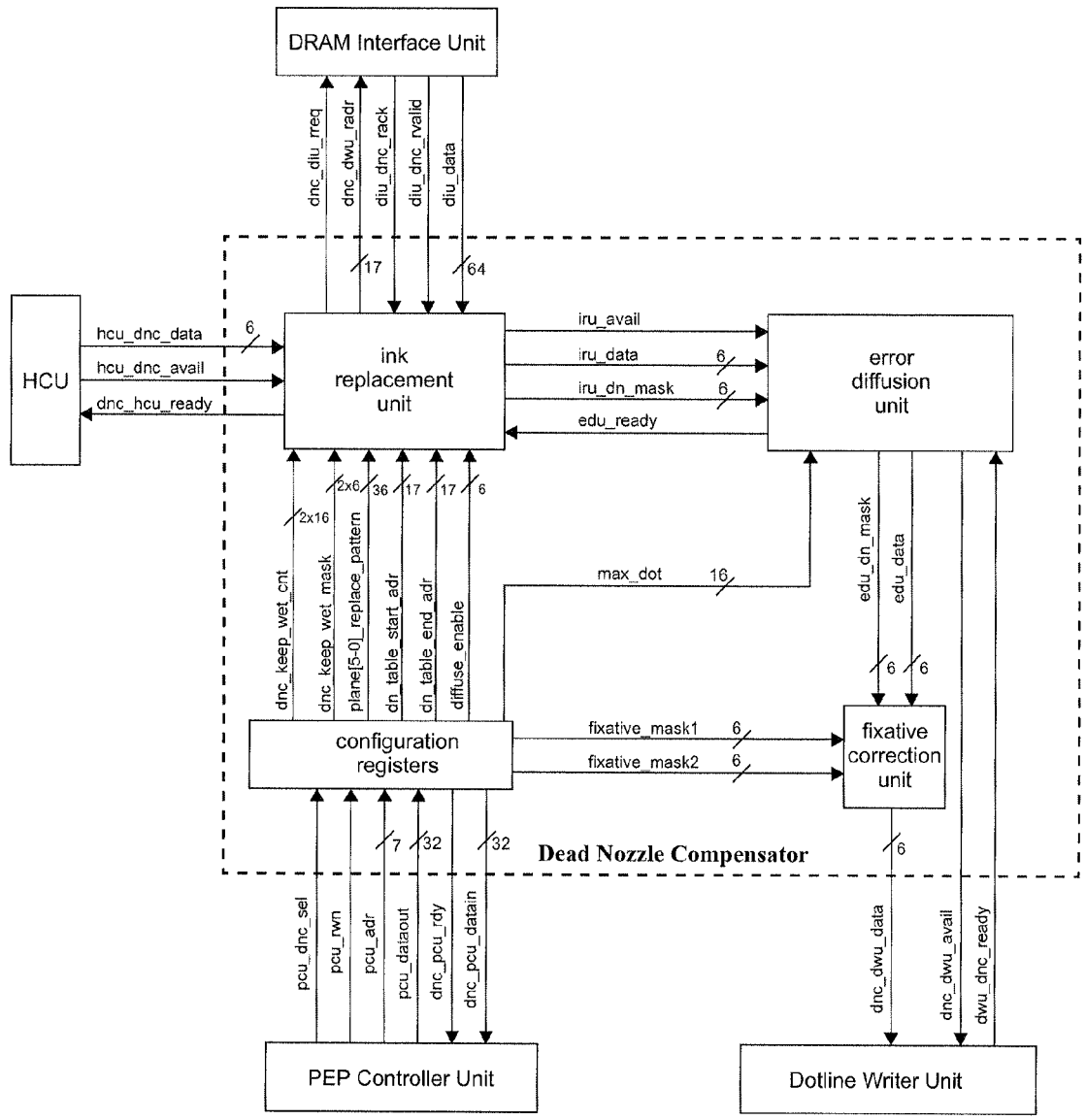

Dead nozzles are identified by means of a position value and a mask value. Position information is represented by a 10-bit delta encoded format, where the 10-bit value defines the number of dots between dead nozzle columns. The delta information is stored with an associated 6-bit dead nozzle mask (dn_mask) for the defined dead nozzle position. Each bit in the dn_mask corresponds to an ink plane. A set bit indicates that the nozzle for the corresponding ink plane is dead. The dead nozzle table format is shown in FIG. 15. The DNC reads dead nozzle information from DRAM in single 256-bit accesses. A 10-bit delta encoding scheme is chosen so that each table entry is 16 bits wide, and 16 entries fit exactly in each 256-bit read. Using 10-bit delta encoding means that the maximum distance between dead nozzle columns is 1023 dots. It is possible that dead nozzles may be spaced further than 1023 dots from each other, so a null dead nozzle identifier is required. A null dead nozzle identifier is defined as a 6-bit dn_mask of all zeros. These null dead nozzle identifiers should also be used so that:

the dead nozzle table is a multiple of 16 entries (so that it is aligned to the 256-bit DRAM locations)

the dead nozzle table spans the complete length of the line, i.e. the first entry dead nozzle table should have a delta from the first nozzle column in a line and the last entry in the dead nozzle table should correspond to the last nozzle column in a line.

Note that the DNC deals with the width of a page. This may or may not be the same as the width of the printhead (printhead ICs may overlap due to misalignment during assembly, and additionally, the LLU may introduce margining to the page). Care must be taken when programming the dead nozzle table so that dead nozzle positions are correctly specified with respect to the page and printhead.

Due to construction limitations of the printhead it is possible that nozzle rows within a printhead segment may be misaligned relative to each other by up to 5 dots per half line, which means 56 dot positions over 12 half lines (i.e. 28 dot pairs). Vertical misalignment can also occur but is compensated for in the LLU and not considered here. The DWU is required to compensate for the horizontal misalignment.

Figure 18:
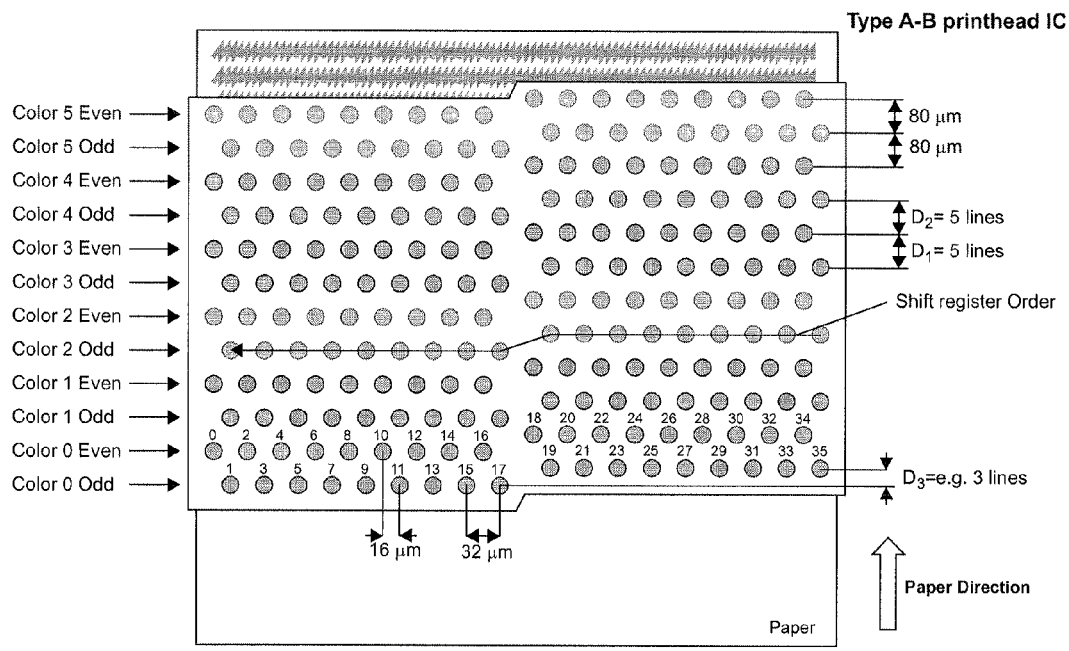
Figure 19:
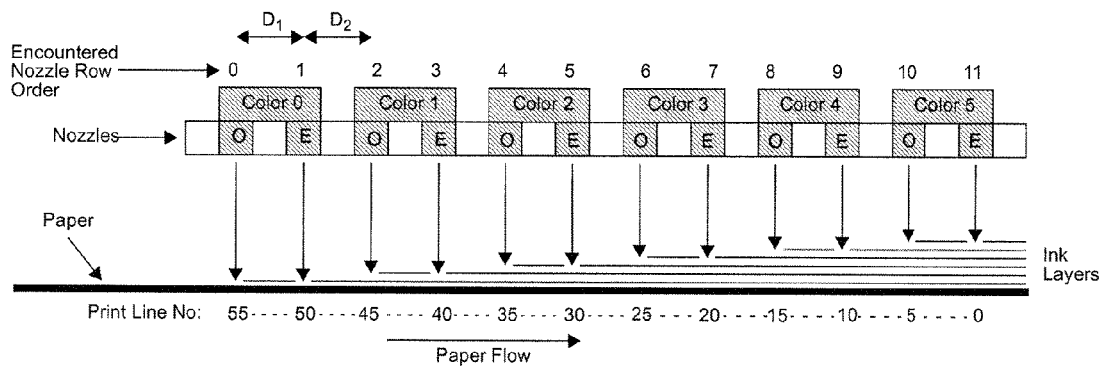
Figure 20:
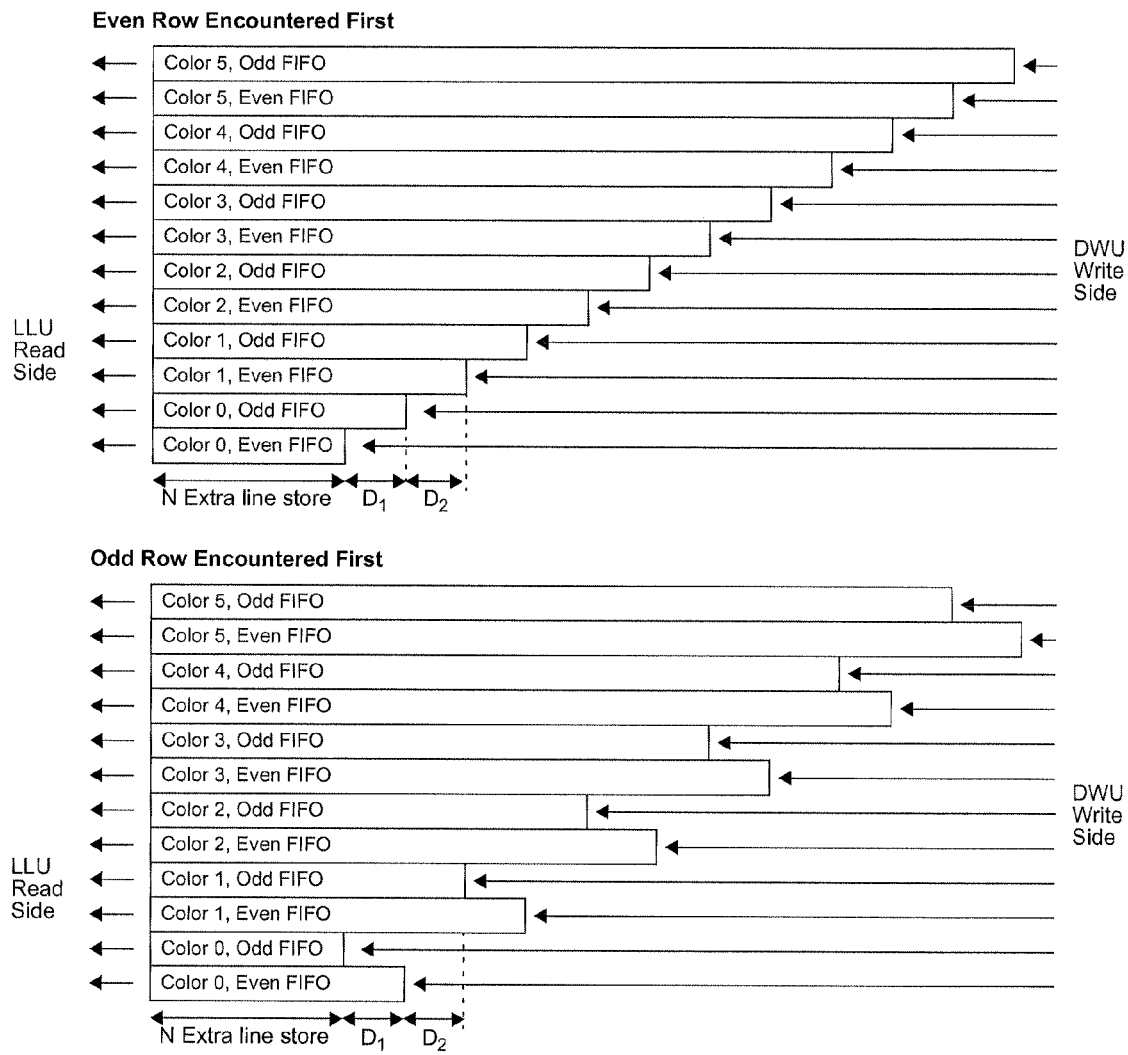

Dot data from the HCU (through the DNC) produces a dot of 6 colors all destined for the same physical location on paper. If the nozzle rows in the within a printhead segment are aligned as shown in FIG. 18 then no adjustment of the dot data is needed.

Figure 21:
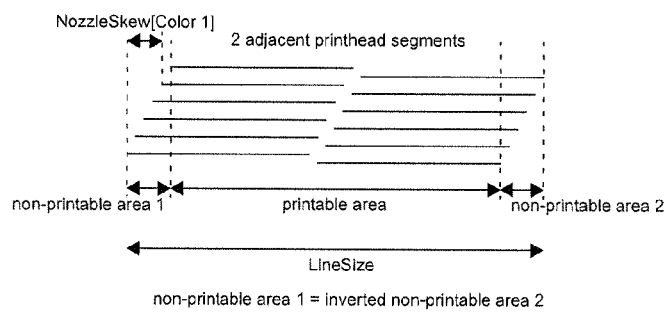

A conceptual misaligned printhead is shown in FIG. 21. The exact shape of the row alignment is arbitrary, although is most likely to be sloping (if sloping, it could be sloping in either direction).

Figure 22:
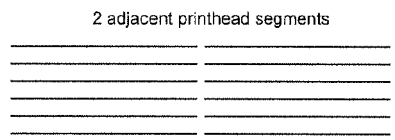
Figure 23:
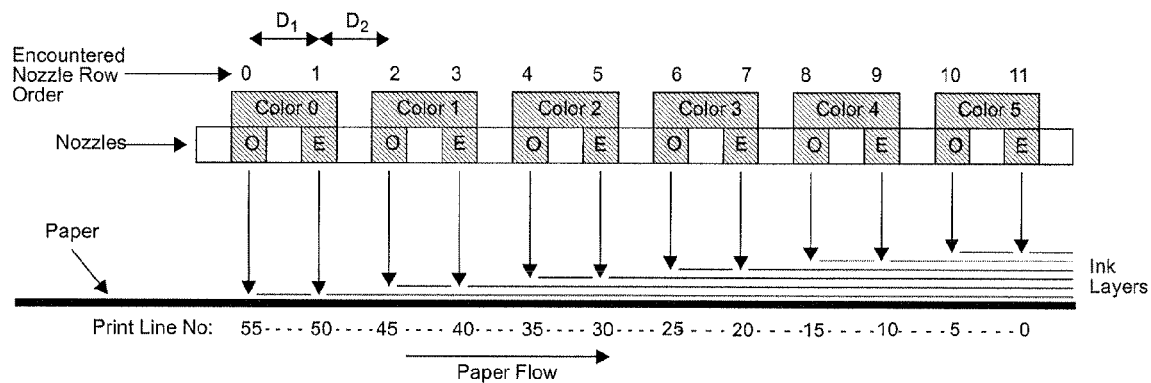
Figure 24:
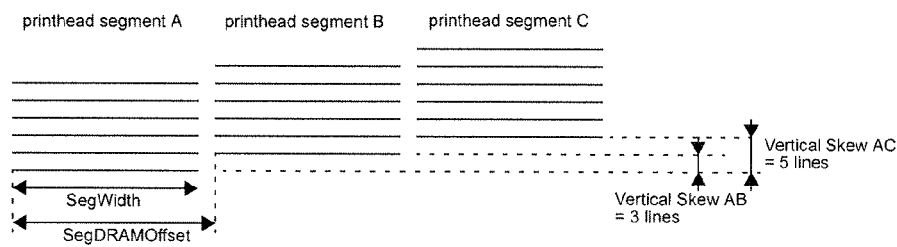
Figure 25:
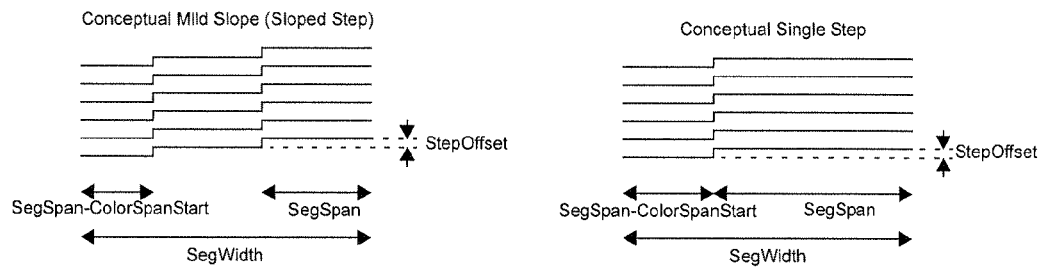
Figure 26:
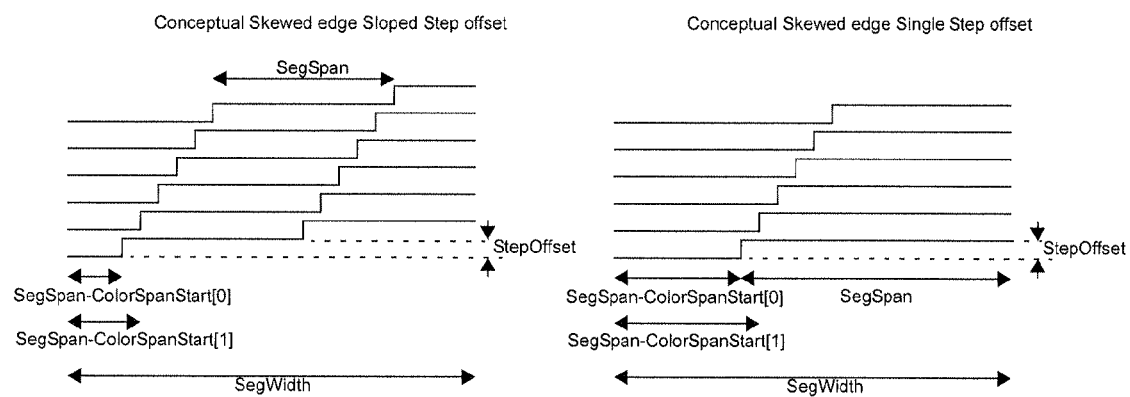
Figure 27:
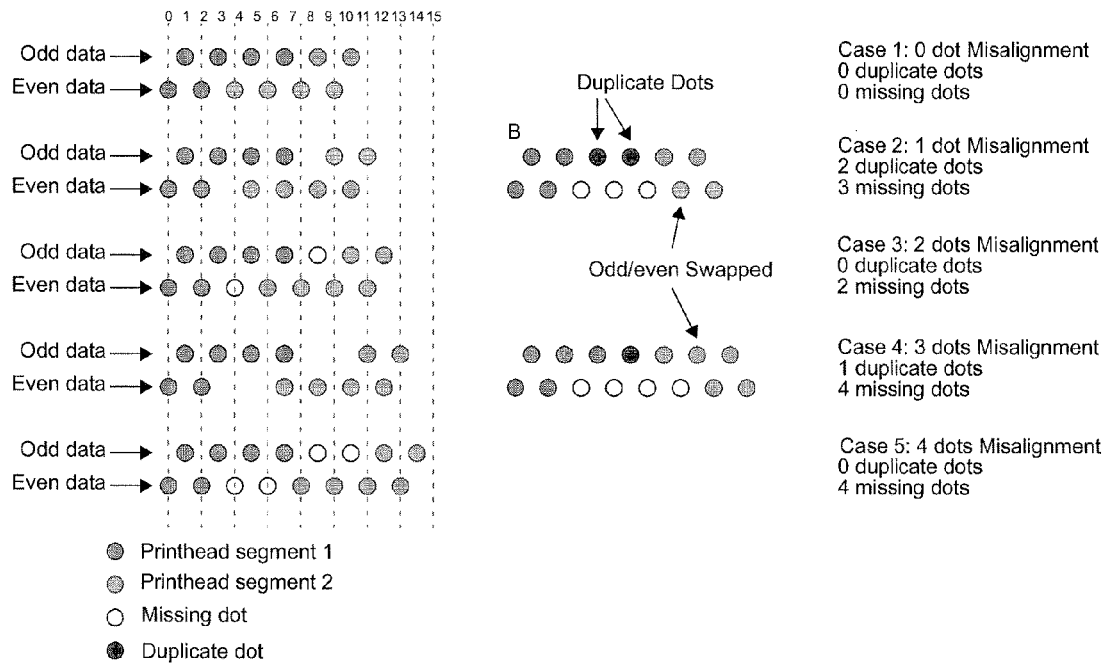
Figure 28:
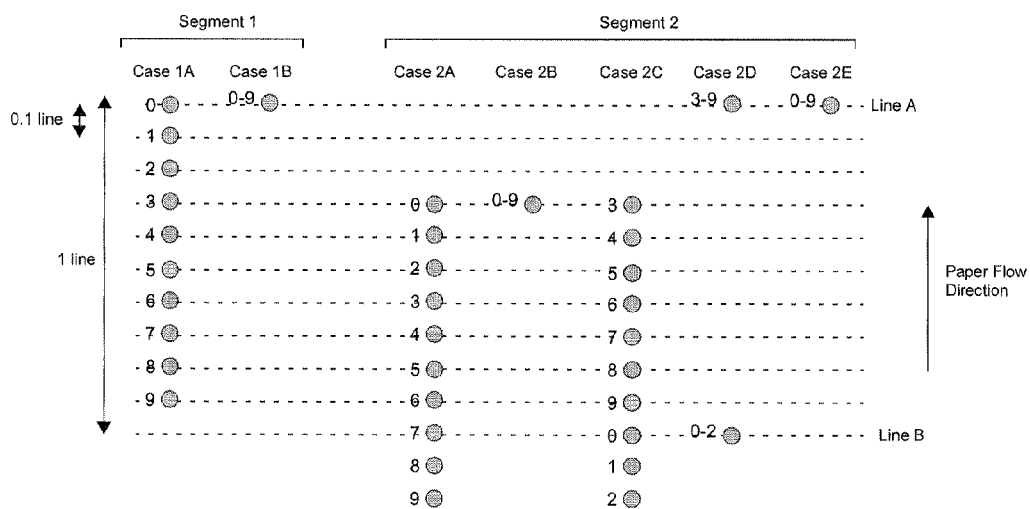
Figure 29:
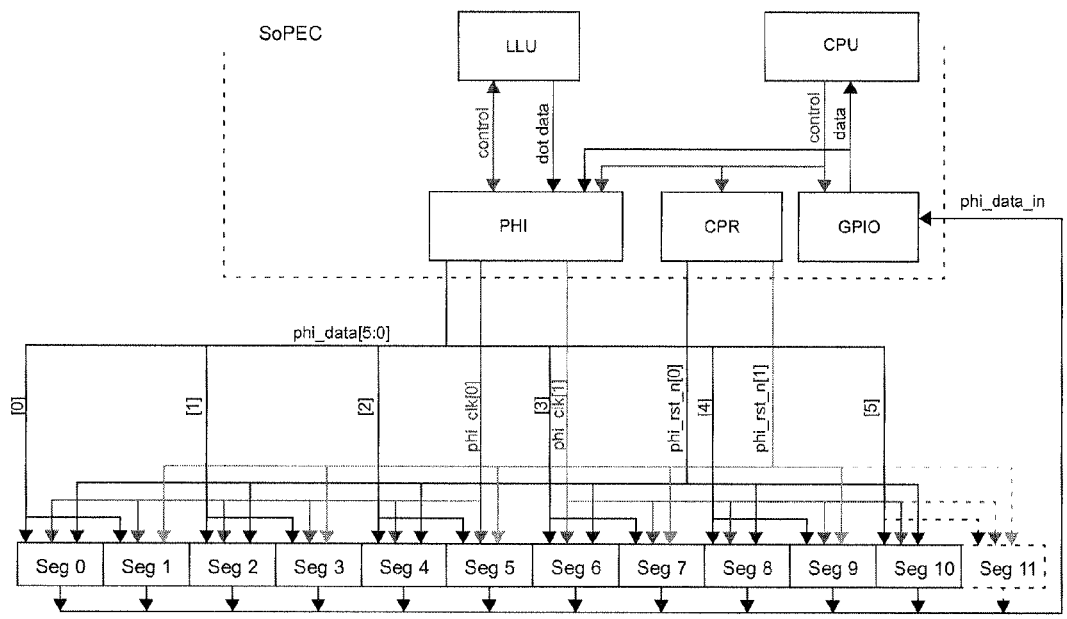
Figure 30:
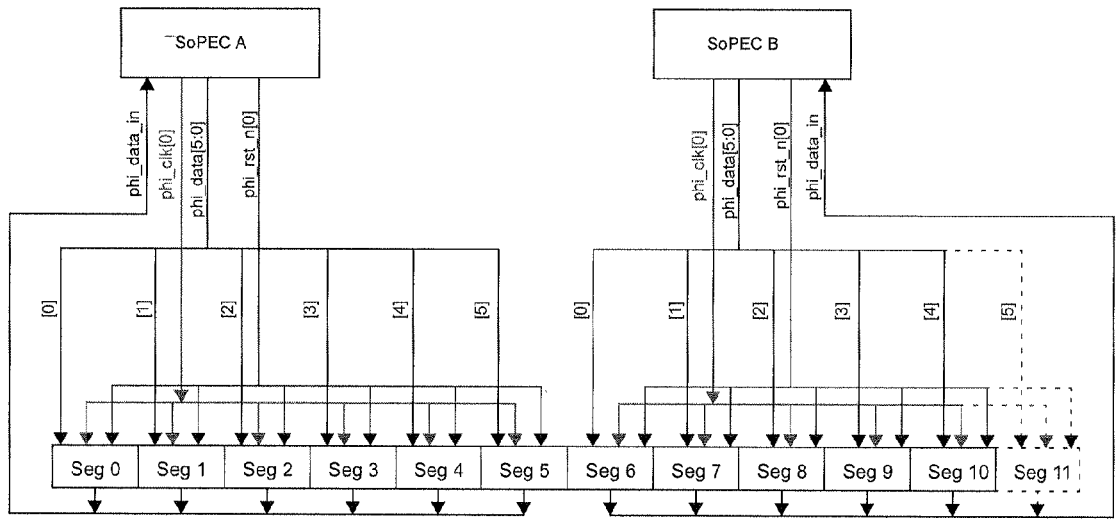
Figure 31:
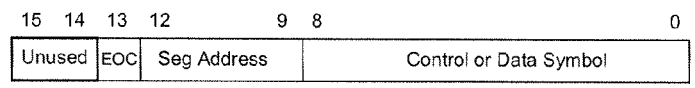
Figure 32:
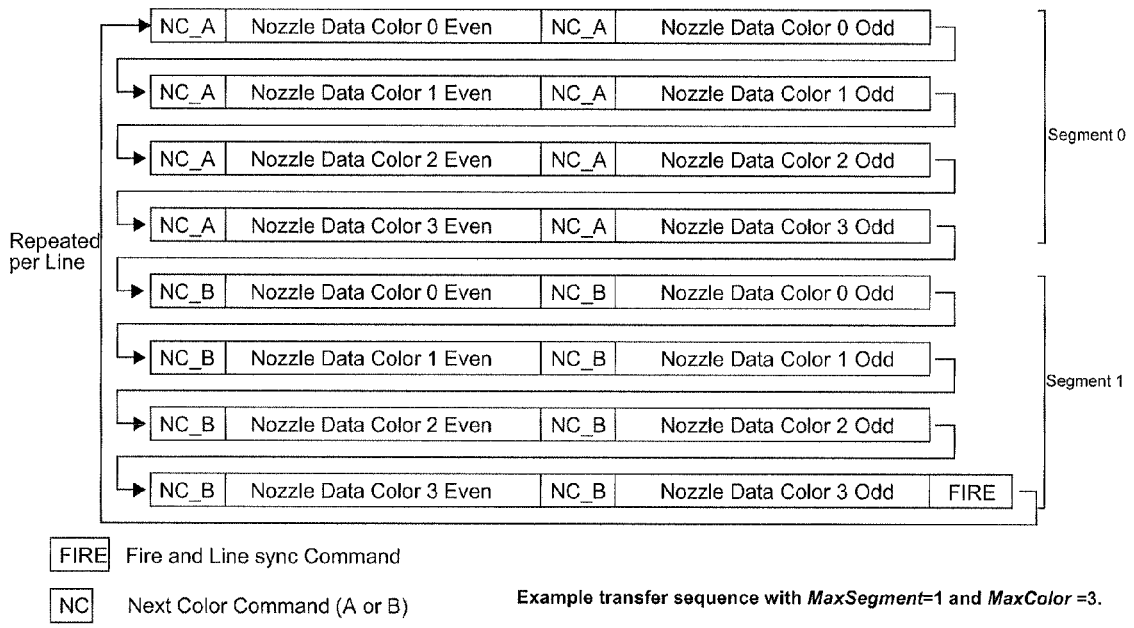
Figure 33:
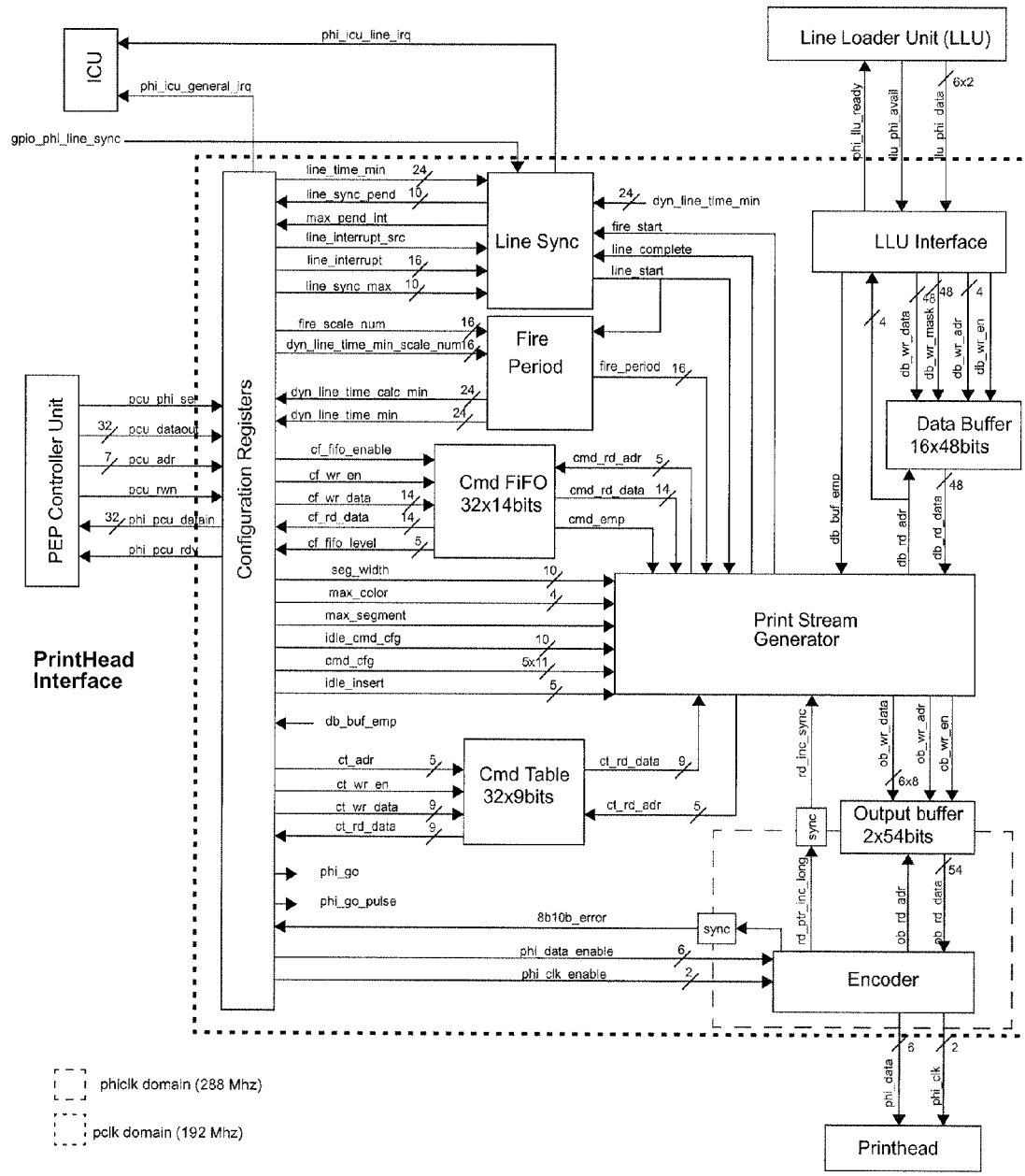
Figure 34:
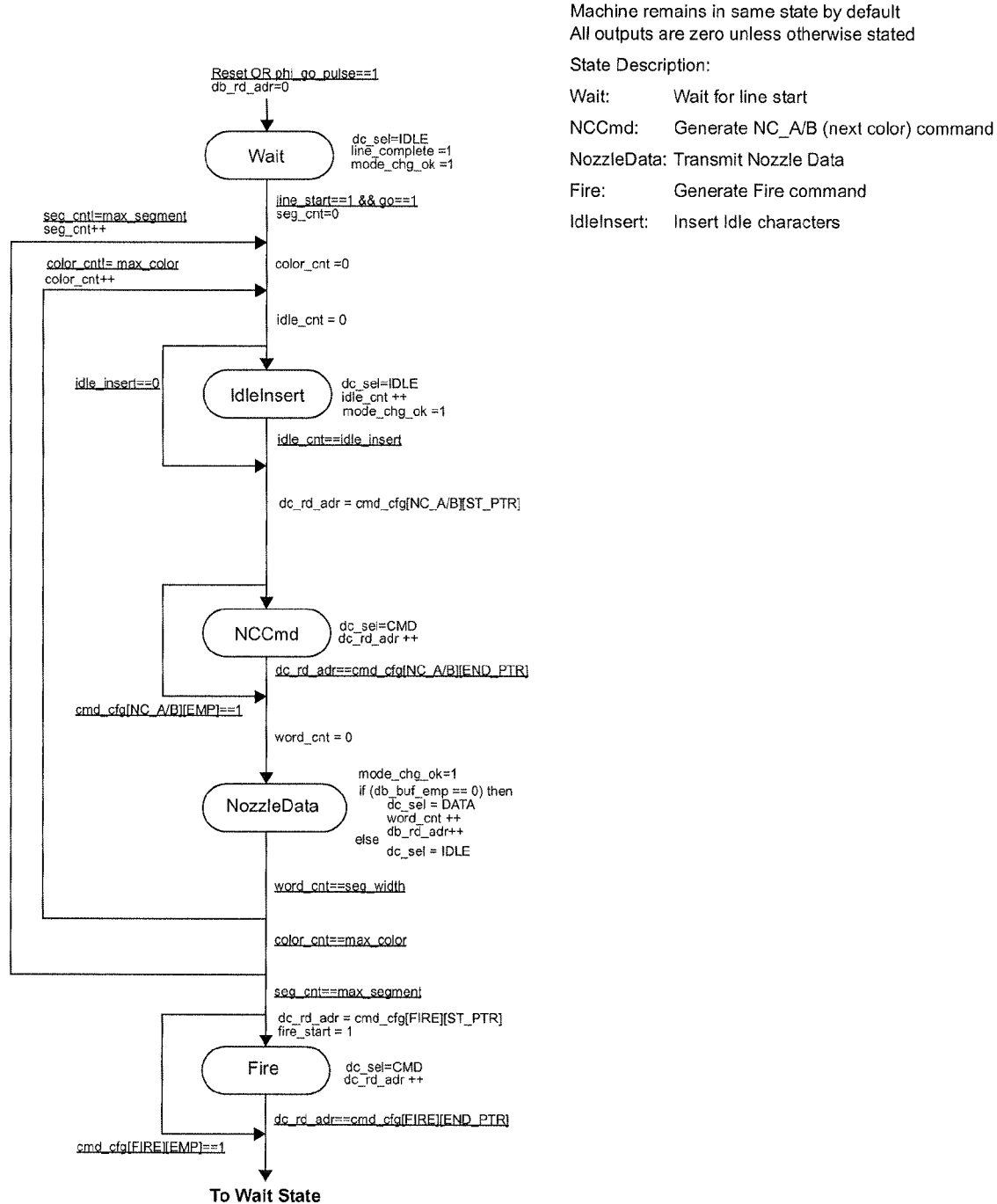
Figure 35:
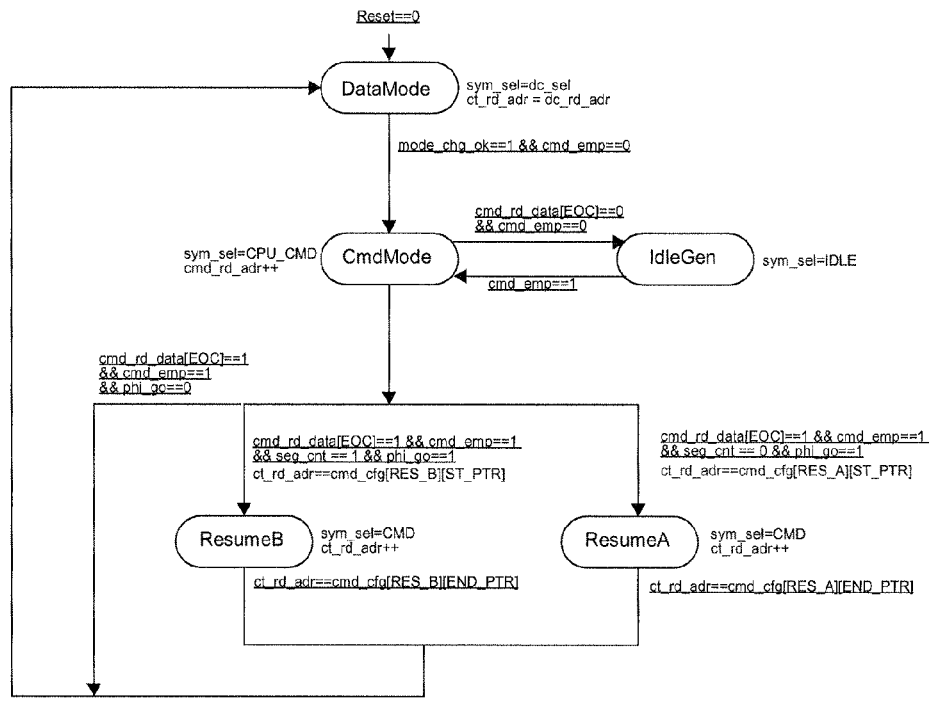
Figure 36:
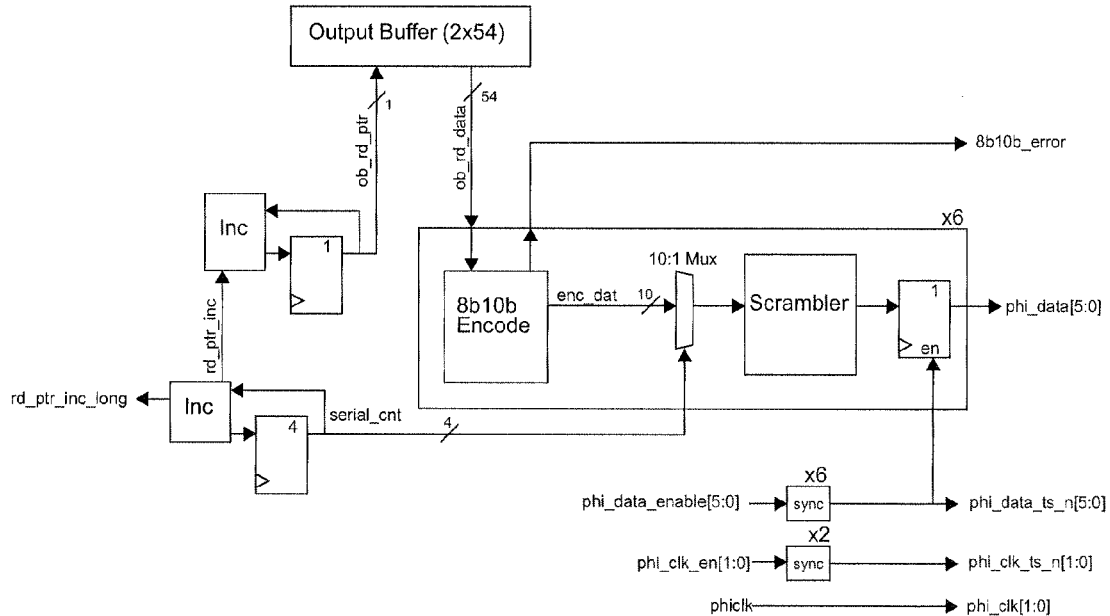
Figure 37:
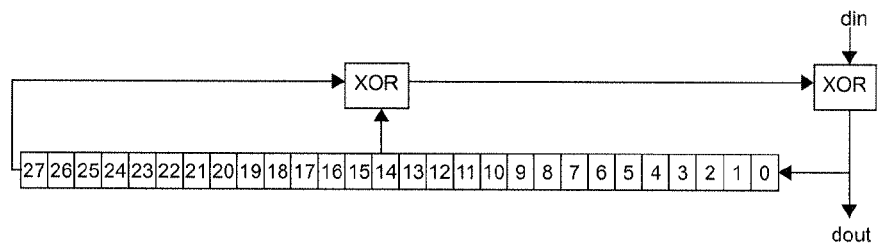

The DWU is required to adjust the shape of the dot streams to take into account the relative horizontal displacement of nozzles rows between 2 adjacent printhead segments. The LLU compensates for the vertical skew between printhead segments, and the vertical and horizontal skew within printhead segments. The nozzle row skew function aligns rows to compensate for the seam between printhead segments (as shown in FIG. 21) and not for the seam within a printhead (as shown in FIG. 18). The DWU nozzle row function results in aligned rows as shown in the example in FIG. 22.

To insert the shape of the skew into the dot stream, for each line we must first insert the dots for non-printable area 1, then the printable area data (from the DNC), and then finally the dots for non-printable area 2. This can also be considered as: first produce the dots for non-printable area 1 for line n, and then a repetition of:

produce the dots for the printable area for line n (from the DNC)

produce the dots for the non-printable area 2 (for line n) followed by the dots of non-printable area 1 (for line n+1)

The reason for considering the problem this way is that regardless of the shape of the skew, the shape of non-printable area 2 merged with the shape of non-printable area 1 will always be a rectangle since the widths of non-printable areas 1 and 2 are identical and the lengths of each row are identical. Hence step 2 can be accomplished by simply inserting a constant number (NozzleSkewPadding) of 0 dots into the stream.

For example, if the color n even row non-printable area 1 is of length X, then the length of color n even row non-printable area 2 will be of length NozzleSkewPadding−X. The split between non-printable areas 1 and 2 is defined by the NozzleSkew registers.

Data from the DNC is destined for the printable area only, the DWU must generate the data destined for the non-printable areas, and insert DNC dot data correctly into the dot data stream before writing dot data to the fifos. The DWU inserts the shape of the misalignment into the dot stream by delaying dot data destined to different nozzle rows by the relative misalignment skew amount.

The Printhead interface (PHI) accepts dot data from the LLU and transmits the dot data to the printhead, using the printhead interface mechanism. The PHI generates the control and timing signals necessary to load and drive the printhead. A printhead is constructed from a number of printhead segments. The PHI has 6 transmission lines (printhead channel), each line is capable of driving up to 2 printhead segments, allowing a single PHI to drive up to 12 printhead segments. The PHI is capable of driving any combination of 0, 1 or 2 segments on any printhead channel.

The PHI generates control information for transmission to each printhead segment. The control information can be generated automatically by the PHI based on configured values, or can be constructed by the CPU for the PHI to insert into the data stream.

The PHI transmits data to printhead segments at a rate of 288 Mhz, over 6 LVDS data lines synchronous to 2 clocks. Both clocks are in phase with each other. In order to assist sampling of data in the printhead segments, each data line is encoded with 8b10b encoding, to minimize the maximum number of bits without a transition. Each data line requires a continuous stream of symbols, if a data line has no data to send it must insert IDLE symbols to enable the receiving printhead to remain synchronized. The data is also scrambled to reduce EMI effects due to long sequences of identical data sent to the printhead segment (i.e. IDLE symbols between lines). The descrambler also has the added benefit in the receiver of increasing the chance single bit errors will be seen multiple times. The 28-bit scrambler is self-synchronizing with a feedback polynomial of $1+x^{15}+x^{28}$.

The PHI needs to send control commands to each printhead segment as part of the normal line and page download to each printhead segment. The control commands indicate line position, color row information, fire period, line sync pulses etc. to the printhead segments.

A control command consists of one control symbol, followed by 0 or more data or control symbols. A data or control symbol is defined as a 9-bit unencoded word. A data symbol has bit 8 set to 0, the remaining 8 bits represent the data character. A control symbol has bit 8 set to 1, with the 8 remaining bits set to a limited set of other values to complete the 8b10b code set.

Each command is defined by CmdCfg[CMD_NAME] register. The command configuration register configures 2 pointers into a symbol array (currently the symbol array is 32 words, but could be extended). Bits 4:0 of the command configuration register indicate the start symbol, and bits 9:5 indicate the end symbol. Bit 10 is the empty string bit and is used to indicate that the command is empty, when set the command is ignored and no symbols are sent. When a command is transmitted to a printhead segment, the symbol pointed to by the start pointer is send first, then the start pointer+1 etc. and all symbols to the end symbol pointer. If the end symbol pointer is less than the start symbol pointer the PHI will send all symbols from start to stop wrapping at 32.

The IDLE command is configured differently to the others. It is always only one symbol in length and cannot be configured to be empty. The IDLE symbol value is defined by the IdleCmdCfg register.

The symbol array can be programmed by accessing the SymbolTable registers. Note that the symbol table can be written to at any time, but can only be read when Go is set to 0.

The PHI provides a mechanism for the CPU to send data and control words to any individual segment or to broadcast to all segments simultaneously. The CPU writes commands to the command FIFO, and the PHI accepts data from the command FIFO, and transmits the symbols to the addressed printhead segment, or broadcasts the symbols to all printhead segments.

The PHI operates in 2 modes, CPU command mode and data mode. A CPU command always has higher priority than the data stream (or a stream of idles) for transmission to the printhead. When there is data in the command FIFO, the PHI will change to CPU command mode as soon as possible and start transmitting the command word. If the PHI detects data in the command FIFO, and the PHI is in the process of transmitting a control word the PHI waits for the control word to complete and then switches to CPU command mode. Note that idles are not considered control words. The PHI will remain in CPU command mode until it encounters a command word with the EOC flag set and no other data in the command FIFO.

The PHI must accept data for all printhead channels from the LLU together, and transmit all data to all printhead segments together. If the CPU command FIFO wants to send data to a particular printhead segment, the PHI must stall all data channels from the LLU, and send IDLE symbols to all other print channels not addressed by the CPU command word. If the PHI enters CPU command mode and begins to transmit command words, and the command FIFO becomes empty but the PHI has not encountered an EOC flag then the PHI will continue to stall the LLU and insert IDLE symbols into the print streams. The PHI remains in CPU command mode until an EOC flag is encountered.

To prevent such stalling the command FIFO has an enable bit CmdFIFOEnable which enables the PHI reading the command FIFO. It allows the CPU to write several words to the command FIFO without the PHI beginning to read the FIFO. If the CPU disables the FIFO (setting CmdFIFOEnable to 0) and the PHI is currently in CPU command mode, the PHI will continue transmitting the CPU command until it encounters an EOC flag and will then disable the FIFO.

When the PHI is switching from CPU command mode to data transfer mode, it sends a RESUME command to the printhead channel group data transfer that was interrupted. This enables each printhead to easily differentiate between control and data streams. For example if the PHI is transmitting data to printhead group B and is interrupted to transmit a CPU command, then upon return to data mode the PHI must send a RESUME_B control command. If the PHI was between pages (when Go=0) transmitting IDLE commands and was interrupted by a CPU command, it doesn't need to send any resume command before returning to transmit IDLE.

The command FIFO can be written to at any time by the CPU by writing to the CmdFifo register. The CmdFiFO register allows FIFO style access to the command FIFO. Writing to the CmdFIFO register will write data to the command FIFO address pointed to by the write pointer and will increment the write pointer. The CmdFIFO register can be read at any time but will always return the command FIFO value pointed to by the internal read pointer. The current fill level of the CPU command FIFO can be read by accessing the CmdFIFOLevel register. The command FIFO is 32 words×14 bits.

The PHI synchronizes line data transmission with sync pulses generated by the GPIO block (which in turn could be synchronized to the GPIO block in another SoPEC). The PHI waits for a line sync pulse and then transmits line data and the FIRE command to all printhead segments.

It is possible that when a line sync pulse arrives at the PHI that not all the data has finished being sent to the printheads. If the PHI were to forward this signal on then it would result in an incorrect print of that line, which is an error condition. This would indicate a buffer underflow in PEC1.

However, in SoPEC the printhead segments can only receive line sync signals from the SoPEC providing them data. Thus it is possible that the PHI could delay in sending the line sync pulse until it had finished providing data to the printhead. The effect of this would be a line that is printed slightly after where it should be printed. In a single SoPEC system this effect would probably not be noticeable, since all printhead segments would have undergone the same delay. In a multi-SoPEC system delays would cause a difference in the location of the lines, if the delay was great this may be noticeable.

If a line sync is early the PHI records it as a pending line sync and will send the corresponding next line and FIRE command at the next available time (i.e. when the current line of data is finished transferring to the printhead). It is possible that there may be multiple pending line syncs, whether or not this is an error condition is printer specific. The PHI records all pending line syncs (LineSyncPend register), and if the level of pending lines syncs rises over a configured level (LineSyncMaxPend register) the PHI will set the MaxSyncPend bit in the PhiStatus register which if enabled can cause an interrupt. The CPU interrupt service routine can then evaluate the appropriate response, which could involve halting the PHI.

The PHI also has 2 print speed limitation mechanisms. The LineTimeMin register specifies the minimum line time period in pclk cycles and the DynLineTimeMin register which also specifies the minimum line time period in pclk cycles but is updated dynamically after each FIRE command is transmitted. The PHI calculates DynLineTimeCalcMin value based on the last line sync period adjusted by a scale factor specified by the DynLineTimeMinScaleNum register. When a FIRE command is transmitted to the printhead the PHI moves the DynLineTimeCalcMin to the DynLineTimeMin register to limit the next line time. The DynLineTimeCalcMin value is updated for each new line sync (same as the FirePeriodCalc) whereas the DynLineTimeMin register is updated when a FIRE command is transmitted to the printhead (same as the FirePeriod register). The dynamic minimum line time is intended to ensure the previous calculated fire period will have sufficient time to fire a complete line before the PHI begins sending the next line of data.

The scale factor is defined as the ratio of the DynLineTimeMinScaleNum numerator value to a fixed denominator value of 0x10000, allowing a maximum scale factor of 1. The PHI also provides a mechanism where it can generate an interrupt to the ICU (phi_icu_line_irq) after a fixed number of line syncs are received or a fixed number of FIRE commands are sent to the printhead. The LineInterrupt register specifies the number of line syncs (or FIRE commands) to count before the interrupt is generated and the LineInterruptSrc register selects if the count should be line syncs or FIRE commands. The PHI sends data to each printhead segment in a fixed order inserting the appropriate control command sequences into the data stream at the correct time. The PHI receives a fixed data stream from the LLU, it is the responsibility of the PHI to determine which data is destined for which line, color nozzle row and printhead segment, and to insert the correct command sequences.

The SegWidth register specifies the number of dot pairs per half color nozzle row. To avoid padding to the nearest 8 bits (data symbol input amount) the SegWidth must be programmed to a multiple of 8. The MaxColor register specifies the number of half nozzle rows per printhead segment. The MaxSegment specifies the maximum number segments per printhead channel. If MaxSegment is set to 0 then all enabled channels will generate a data stream for one segment only. If MaxSegment is set to 1 then all enabled channels will generate data for 2 segments. The LLU will generate null data for any missing printhead segments.

The PageLenLine register specifies the number of lines of data to accept from the LLU and transfer to the printhead before setting the page finished flag (PhiPageFinish) in the PhiStatus register.

Printhead segments are divided into 2 groups, group A segments are 0, 2, 4, 6, 8, 10 and group B segments are 1, 3, 5, 7, 9, 11. For any printhead channel, group A segment data is transmitted first then group B.

Each time a line sync is received from the GPIO, the PHI sends a line of data and a fire (FIRE) command to all printhead segments. The PHI first sends a next color command (NC_A) for the first half color nozzle row followed by nozzle data for the first half color dots. The number of dots transmitted (and accepted from the LLU) is configured by SegWidth register. The PHI then sends a next color command indicating to the printhead to reconfigure to accept the next color nozzle data. The PHI then sends the next half color dots. The process is repeated for MaxColor number of half nozzle rows. After all dots for a particular segment are transmitted, the PHI sends a next color B (NC_B) command to indicate to the group B printheads to prepare to accept nozzle row data. The command and data sequence is repeated as before. The line transmission to the printhead is completed with the transmission of a FIRE command.

The PHI can optionally insert a number of IDLE symbols before each next color command. The number of IDLE symbols inserted is configured by the IdleInsert register. If it's set to zero no symbols will be inserted.

When a line is complete, the PHI decrements the PageLenLine counter, and waits for the next line sync pulse from the GPIO before beginning the next line of data. The PHI continues sending line data until the PageLenLine counter is 0 indicating the last line. When the last line is transmitted to the printhead segments, the PHI sets a page finished flag (PhiPageFinish) in the PhiStatus register. The PHI will then wait until the Go bit is toggled before sending the next page to the printhead.

Before starting printing SoPEC must configure the printhead segments. If there is more than one printhead segment on a printline, the printhead segments must be assigned a unique ID per print line. The IDs are assigned by holding one group of segments in reset while the other group is programmed by a CPU command stream issued through the PHI. The PHI does not directly control the printhead reset lines. They are connected to CPR block output pins and are controlled by the CPU through the CPR.

The printhead also provides a mechanism for reading data back from each individual printhead segment. All printhead segments use a common data back channel, so only one printhead segment can send data at a time. SoPEC issues a CPU command stream directed at a particular printhead segment, which causes the segment to return data on the back channel. The back channel is connected to a GPIO input, and is sampled by the CPU through the GPIO.

If SoPEC is being used in a multi-SoPEC printing system, it is possible that not all print channels, or clock outputs are being used. Any unused data outputs can be disabled by programming the PhiDataEnable register, or unused clock outputs disabled by programming the PhiClkEnable.

The CPU when enabling or disabling the clock or data outputs must ensure that the printhead segments they are connected to are held in a benign state while toggling the enable status of the output pins.

The PHI calculates the fire period needed in the printhead segments based on the last line sync period, adjusted by a fractional amount. The fractional factor is dependant on the way the columns in the printhead are grouped, the particular clock used within the printhead to count this period and the proportion of a line time over which the nozzles for that line must be fired. For example, one current plan has fire groups consisting of 32 nozzle columns which are physically located in a way that require them to be fired over a period of around 96% of the line time. A count is needed to indicate a period of (linetime/32)*96% for a 144 MHz clock.

The fractional amount the fire period is adjusted by is configured by the FireScaleNum register. The scale factor is the ratio of the configurable FireScaleNum numerator register and a fixed denominator of 0x10000. Note that the fire period is calculated in the pclk domain, but is used in the phiclk domain. The fractional registers will need to be programmed to take account of the ratio of the pclk and phiclk frequencies.

A new fire period is calculated with every new line sync pulse from the GPIO, regardless of whether the line sync pulse results in a new line of data being send to the printhead segments, or the line sync pending level. The latest calculated fire period by can read by accessing the FirePeriodCalc register.

The PHI transfers the last calculated fire period value (FirePeriodCalc) to the FirePeriod register immediately before the FIRE command is sent to the printhead. This prevents the FirePeriod value getting updated during the transfer of a FIRE command to the printhead, possibly sending an incorrect fire period value to the printhead.

The PHI can optionally send the calculated fire period by placing META character symbols in a command stream (either a CPU command, or a command configured in the command table). The META symbols are detected by the PHI and replaced with the calculated fire period.

Immediately after the PHI leaves its reset it will start sending IDLE commands to all printhead data channels. The PHI will not accept any data from the LLU until the Go bit is set. Note the command table can be programmed at any time but cannot be used by the internal PHY when Go is 0.

When Go is set to 1 the PHI will accept data from the LLU. When data actually arrives in the data buffer the PHI will set the PhiDataReady bit in the PhiStatus register. The PHI will not start sending data to the printhead until it receives 2 line syncs from the GPIO (gpio_phi_line_sync). The PHI needs to wait for 2 line syncs to allow it to calculate the fire period value. The first line sync will not become pending, and will not result in a corresponding FIRE command. Note that the PHI does not need to wait for data from the LLU before it can calculate the fire period. If the PHI is waiting for data from the LLU any line syncs it receives from the GPIO (except the first one) will become pending.

Once data is available and the fire period is calculated the PHI will start producing print streams. For each line transmitted the PHI will wait for a line sync pulse (or the minimum line time if a line sync is pending) before sending the next line of data to the printheads. The PHI continues until a full page of data has been transmitted to the printhead (as specified by the PageLenLine register). When the page is complete the PHI will automatically clear the Go bit and will set the PhiPageFinish flag in the PhiStatus register. Any bit in the PhiStatus register can be used to generate an interrupt to the ICU.

A bi-lithic printhead (as distinct from the linking printhead) is now described from the point of view of printing 30 ppm from a SoPEC ASIC, as well as architectures that solve the 60 ppm printing requirement using the bi-lithic printhead model.

To print at 30 ppm, the printheads must print a single page within 2 seconds. This would include the time taken to print the page itself plus any inter-page gap (so that the 30 ppm target could be met). The required printing rate assumes an inter-sheet spacing of 4 cm.

Figure 38:
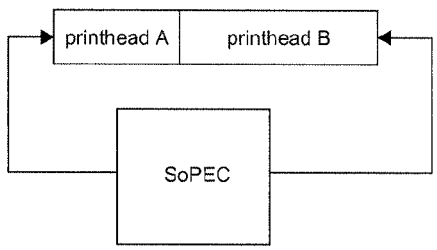

A baseline SoPEC system connecting to two printhead segments is shown in FIG. 38. The two segments (A and B) combine to form a printhead of typical width 13,824 nozzles per color. A single SoPEC produces the data for both printheads for the entire page. Therefore it has the entire line time in which to generate the dot data.

A Letter page is 11 inches high. Assuming 1600 dpi and a 4 cm inter-page gap, there are 20,120 lines. This is a line rate of 10.06 KHz (a line time of 99.4 us). The printhead is 14,080 dots wide. To calculate these dots within the line time, SoPEC requires a 140.8 MHz dot generation rate. Since SoPEC is run at 160 MHz and generates 1 dot per cycle, it is able to meet the Letter page requirement and cope with a small amount of stalling during the dot generation process.

An A4 page is 297 mm high. Assuming 62.5 dots/mm and a 4 cm inter-page gap, there are 21,063 lines. This is a line rate of 10.54 KHz (a line time of 94.8 us). The printhead is 14,080 dots wide. To calculate these dots within the line time, SoPEC requires a 148.5 MHz dot generation rate. Since SoPEC is run at 160 MHz and generates 1 dot per cycle, it is able to meet the A4 page requirement and cope with minimal stalling.

Assuming an n-color printhead, SoPEC must transmit 14,080 dots □ n-bits within the line time. i.e. n □ the data generation rate=n-bits □ 14,080 dots □ 10.54 KHz. Thus a 6-color printhead requires 874.2 Mb/sec. The transmission time is further constrained by the fact that no data must be transmitted to the printhead segments during a window around the linesync pulse. Assuming a 1% overhead for linesync overhead (being very conservative), the required transmission bandwidth for 6 colors is 883 Mb/sec.

However, the data is transferred to both segments simultaneously. This means the longest time to transfer data for a line is determined by the time to transfer print data to the longest print segment. There are 9744 nozzles per color across a type7 printhead. We therefore must be capable of transmitting 6-bits □ 9744 dots at the line rate i.e. 6-bits □ 9744 □ 10.54 KHz=616.2 Mb/sec. Again, assuming a 1% overhead for linesync overhead, the required transmission bandwidth to each printhead is 622.4 Mb/sec.

The connections from SoPEC to each segment consist of 2 □ 1-bit data lines that operate at 320 MHz each. This gives a total of 640 Mb/sec. Therefore the dot data can be transmitted at the appropriate rate to the printhead to meet the 30 ppm requirement.

SoPEC has a dot generation pipeline that generates 1 □ 6-color dot per cycle. The LBD and TE are imported blocks from PEC1, with only marginal changes, and these are therefore capable of nominally generating 2 dots per cycle. However the rest of the pipeline is only capable of generating 1 dot per cycle.

SoPEC is capable of transmitting data to 2 printheads simultaneously. Connections are 2 data plus 1 clock, each sent as an LVDS 2-wire pair. Each LVDS wire-pair is run at 320 MHz. SoPEC is in a 100-pin QFP, with 12 of those wires dedicated to the transmission of print data (6 wires per printhead segment). Additional wires connect SoPEC to the printhead, but they are not considered for the purpose of this discussion.

The dot data is accepted by the printhead at 2-bits per cycle at 320 MHz. 6 bits are available after 3 cycles at 320 MHz, and these 6-bits are then clocked into the shift registers within the printhead at a rate of 106 MHz. Thus the data movement within the printhead shift registers is able to keep up with the rate at which data arrives in the printhead.

Figure 39:
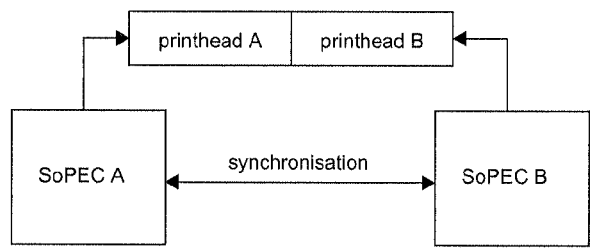

Issues introduced by printing at 60 ppm are now described, with the cases of 4, 5, and 6 colors in the printhead. The arrangement is shown in FIG. 39.

A 60 ppm printer is 1 page per second. i.e.,

A4=21,063 lines. This is a line rate of 21.06 KHz (a line time of 47.4 us)

Letter=2®,120 lines. This is a line rate of 20.12 KHz (a line time of 49.7 us)

If each SoPEC is responsible for generating the data for its specific printhead, then the worst case for dot generation is the largest printhead. Since the preferred embodiment of SoPEC is run at 160 MHz, it is only able to meet the dot requirement rate for the 5:5 printhead, and not the 6:4 or 7:3 printheads.

Each SoPEC must transmit a printhead's worth of bits per color to the printhead per line. The transmission time is further constrained by the fact that no data must be transmitted to the printhead segments during a window around the linesync pulse. Assuming that the line sync overhead is constant regardless of print speed, then a 1% overhead at 30 ppm translates into a 2% overhead at 60 ppm. Since we have 2 lines to the printhead operating at 320 MHz each, the total bandwidth available is 640 Mb/sec. The existing connection to the printhead will only deliver data to a 4-color 5:5 arrangement printhead fast enough for 60 ppm. The connection speed in the preferred embodiment is not fast enough to support any other printhead or color configuration.

The dot data is currently accepted by the printhead at 2-bits per cycle at 320 MHz. Although the connection rate is only fast enough for 4 color 5:5 printing, the data must still be moved around in the shift registers once received.

The 5:5 printer 4-color dot data is accepted by the printhead at 2-bits per cycle at 320 MHz. 4 bits are available after 2 cycles at 320 MHz, and these 4-bits would then need to be clocked into the shift registers within the printhead at a rate of 160 MHz. Since the 6:4 and 7:3 printhead configuration schemes require additional bandwidth etc., the printhead needs some change to support these additional forms of 60 ppm printing.

Given the problems described above, the following issues have been addressed for 60 ppm printing based on the earlier SoPEC architecture:

rate of data generation transmission to the printhead shift register setup within the printhead.

Figure 41:
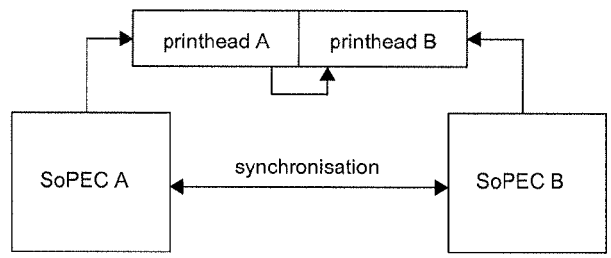
Figure 42:
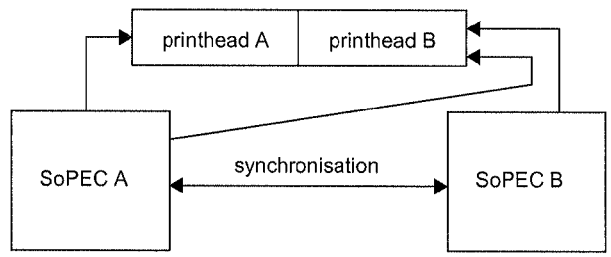

Assuming the current bi-lithic printhead, there are 3 basic classes of solutions to allow 60 ppm:

a. Each SoPEC generates dot data and transmits that data to a single printhead connection, as shown in FIG. 40.

b. One SoPEC generates data and transmits to the smaller printhead, but both SoPECs generate and transmit directly to the larger printhead, as shown in FIG. 41.

c. Same as (b) except that SoPEC A only transmits to printhead B via SoPEC B (i.e. instead of directly), as shown in FIG. 42.

Figure 40:
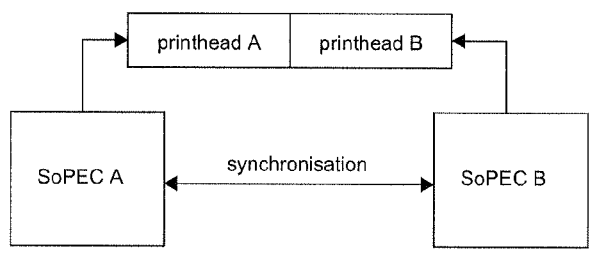

The Class A solution is where each SoPEC generates dot data and transmits that data to a single printhead connection, as shown in FIG. 40. The existing SoPEC architecture is targeted at this class of solution. Two methods of implementing a 60 ppm solution of this class are examined below.

To achieve 60 ppm using the same basic architecture as currently implemented, the following needs to occur:

Increase effective dot generation rate to 206 MHz

Increase bandwidth to printhead to 1256 Mb/sec

Increase bandwidth of printhead shift registers to match transmission bandwidth

It should be noted that even when all these speed improvements are implemented, one SoPEC will still be producing 40% more dots than it would be under a 5:5 scheme. i.e. this class of solution is not load balanced.

Each SoPEC may generate data as if for a 5:5 printhead, and the printhead, even though it is physically a 5:5, 6:4 or 7:3 printhead, maintains a logical appearance of a 5:5 printhead. There are a number of means of accomplishing this logical appearance, but they all rely on the two printheads being connected in some way, as shown in FIG. 41. In this embodiment, the dot generation rate no longer needs to be addressed as only the 5:5 dot generation rate is required, and the current speed of 160 MHz is sufficient.

The class B solution is where one SoPEC generates data and transmits to the smaller printhead, but both SoPECs generate and transmit directly to the larger printhead, as shown in FIG. 42. i.e. SoPEC A transmits to printheads A and B, while SoPEC B transmits only to printhead B. The intention is to allow each SoPEC to generate the dot data for a type 5 printhead, and thereby to balance the dot generation load.

Since the connections between SoPEC and printhead are point-to-point, it requires a doubling of printhead connections on the larger printhead (one connection set goes to SoPEC A and the other goes to SoPEC B). The two methods of implementing a 60 ppm solution of this class depend on the internals of the printhead, and are examined below.

Figure 43:
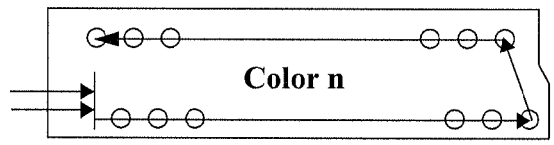

The two connections on the printhead may be connected to the same shift register. Thus the shift register can be driven by either SoPEC, as shown in FIG. 43. The 2 SoPECs take turns (under synchronisation) in transmitting on their individual lines as follows:

SoPEC B transmits even (or odd) data for 5 segments

SoPEC A transmits data for 5-printhead A segments even and odd

SoPEC B transmits the odd (or even) data for 5 segments.

Meanwhile SoPEC A is transmitting the data for printhead A, which will be length 3, 4, or 5.

Note that SoPEC A is transmitting as if to a printhead combination of N:5-N, which means that the dot generation pathway (other than synchronization) is already as defined. Although the dot generation problem is resolved by this scenario (each SoPEC generates data for half the page width and therefore it is load balanced), the transmission speed for each connection must be sufficient to deliver to a type7 printhead i.e. 1256 Mb/sec. In addition, the bandwidth of the printhead shift registers must be altered to match the transmission bandwidth.

Figure 44:
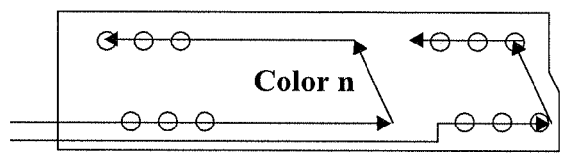

The two connections on the printhead may be connected to different shift registers, as shown in FIG. 44. Thus the two SoPECs can write to the printhead in parallel. Note that SoPEC A is transmitting as if to a printhead combination of N:5-N, which means that the dot generation pathway is already as defined.

The dot generation problem is resolved by this scenario since each SoPEC generates data for half the page width and therefore it is load balanced. Since the connections operate in parallel, the transmission speed required is that required to address 5:5 printing, i.e. 891 Mb/sec. In addition, the bandwidth of the printhead shift registers must be altered to match the transmission bandwidth.

The class C solution is the same as that described for class B, except that SoPEC A only transmits to printhead B via SoPEC B (i.e. instead of directly), as shown in FIG. 45 i.e. SoPEC A transmits directly to printhead A and indirectly to printhead B via SoPEC B, while SoPEC B transmits only to printhead B.

This class of architecture has the attraction that a printhead is driven by a single SoPEC, which minimizes the number of pins on a printhead. However it requires receiver connections on SoPEC B. It becomes particularly practical (costwise) if those receivers are currently unused (i.e. they would have been used for transmitting to the second printhead in a single SoPEC system). Of course this assumes that the pins are not being used to achieve the higher bandwidth.

Since there is only a single connection on the printhead, the serial load scenario would be the mechanism for transfer of data, with the only difference that the connections to the printhead are via SoPEC B. Although the dot generation problem is resolved by this scenario (each SoPEC generates data for half the page width and therefore it is load balanced), the transmission speed for each connection must be sufficient to deliver to a type7 printhead i.e. 1256 Mb/sec. In addition, the bandwidth of the printhead shift registers must be altered to match the transmission bandwidth.

If SoPEC B provides at least a line buffer for the data received from SoPEC A, then the transmission between SoPEC A and printhead A is decoupled, and although the bandwidth from SoPEC B to printhead B must be 1256 Mb/sec, the bandwidth between the two SoPECs can be lower i.e. enough to transmit 2 segments worth of data (359 Mb/sec).

Architecture A has the problem that no matter what the increase in speed, the solution is not load balanced, leaving architecture B or C the more preferred solution where load-balancing between SoPEC chips is desirable or necessary. The main advantage of an architecture A style solution is that it reduces the number of connections on the printhead.

All architectures require the increase in bandwidth to the printhead, and a change to the internal shift register structure of the printhead.

Other architectures can be used where different printhead modules are used. For example, in one embodiment, the dot data is provided from a single printed controller (SoPEC) via multiple serial links to a printhead. Preferably, the links in this embodiment each carry dot data for more than one channel (color, etc) of the printhead. For example, one link can carry CMY dot data from the printer controller and the other channel can carry K, IR and fixative channels.

The basic idea of the linking printhead is that we create a printhead from tiles each of which can be fully formed within the reticle. The printheads are linked together as shown in FIG. 49 to form the page-width printhead. For example, an A4/Letter page is assembled from 11 tiles.

The printhead is assembled by linking or butting up tiles next to each other. The physical process used for linking means that wide-format printheads are not readily fabricated (unlike the 21 mm tile). However printers up to around A3 portrait width (12 inches) are expected to be possible.

The nozzles within a single segment are grouped physically to reduce ink supply complexity and wiring complexity. They are also grouped logically to minimize power consumption and to enable a variety of printing speeds, thereby allowing speed/power consumption trade-offs to be made in different product configurations.

Each printhead segment contains a constant number of nozzles per color (currently 1280), divided into half (640) even dots and half (640) odd dots. If all of the nozzles for a single color were fired at simultaneously, the even and odd dots would be printed on different dot-rows of the page such that the spatial difference between any even/odd dot-pair is an exact number of dot lines. In addition, the distance between a dot from one color and the corresponding dot from the next color is also an exact number of dot lines.

The exact distance between even and odd nozzle rows, and between colors will vary between embodiments, so it is preferred that these relationships be programmable with respect to SoPEC.

Figure 50:
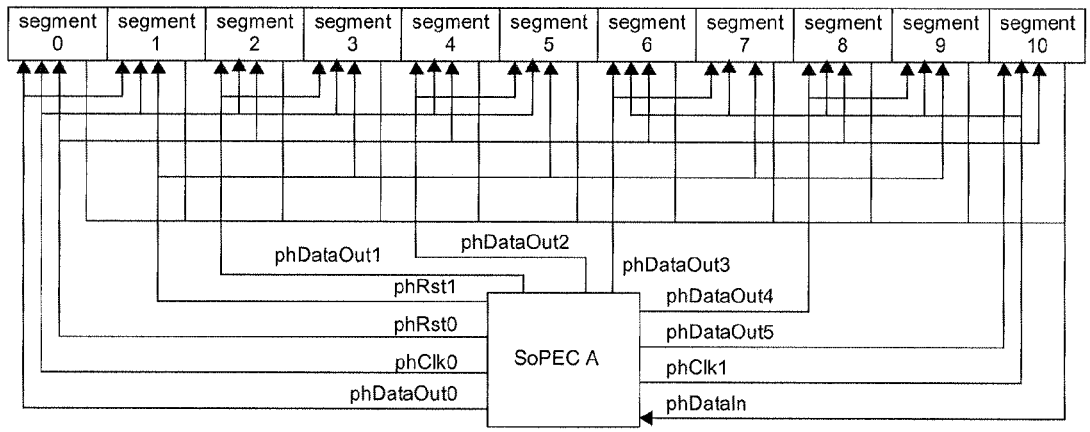

When 11 segments are joined together to create a 30 ppm printhead, a single SoPEC will connect to them as shown in FIG. 50. Notice that each phDataOutn lvds pair goes to two adjacent printhead segments, and that each phClkn signal goes to 5 or 6 printhead segments. Each phRstn signal goes to alternate printhead segments.

SoPEC drives phRst0 and phRst1 to put all the segments into reset. SoPEC then lets phRst1 come out of reset, which means that all the segment 1, 3, 5, 7, and 9 are now alive and are capable of receiving commands. SoPEC can then communicate with segment 1 by sending commands down phDataOut0, and program the segment 1 to be id 1. It can communicate with segment 3 by sending commands down phDataOut1, and program segment 3 to be id 1. This process is repeated until all segments 1, 3, 5, 7, and 9 are assigned ids of 1. The id only needs to be unique per segment addressed by a given phDataOutn line.

SoPEC can then let phRst0 come out of reset, which means that segments 0, 2, 4, 6, 8, and 10 are all alive and are capable of receiving commands. The default id after reset is 0, so now each of the segments is capable of receiving commands along the same pDataOutn line.

SoPEC needs to be able to send commands to individual printheads, and it does so by writing to particular registers at particular addresses. The exact relationship between id and register address etc. is yet to be determined, but at the very least it will involve the CPU being capable of telling the PHI to send a command byte sequence down a particular phDataOutn line.

One possibility is that one register contains the id (possibly 2 bits of id). Further, a command may consist of:
 register write
 register address
 data A 10-bit wide fifo can be used for commands in the PHI.

Figure 51:
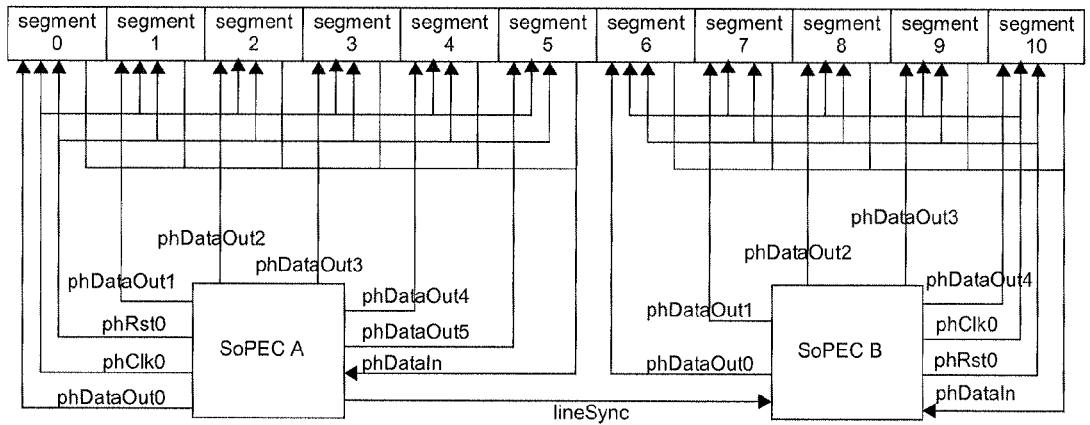

When 11 segments are joined together to create a 60 ppm printhead, the 2 SoPECs will connect to them as shown in FIG. 51. In the 60 ppm case only phClk0 and phRst0 are used (phClk1 and phRst1 are not required). However note that lineSync is required instead. It is possible therefore to reuse phRst1 as a lineSync signal for multi-SoPEC synchronisation. It is not possible to reuse the pins from phClk1 as they are lvds. It should be possible to disable the lvds pads of phClk1 on both SoPECs and phDataOut5 on SoPEC B and therefore save a small amount of power.

The A-A chip printhead style consists of identical printhead tiles (type A) assembled in such a way that rows of nozzles between 2 adjacent chips have no vertical misalignment.

Figure 52:
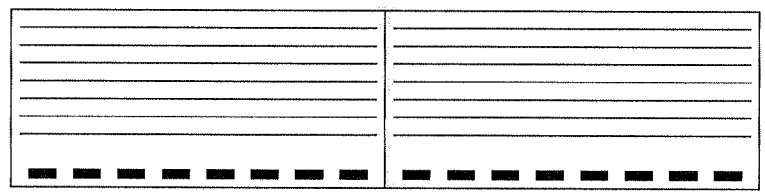
Figure 53:
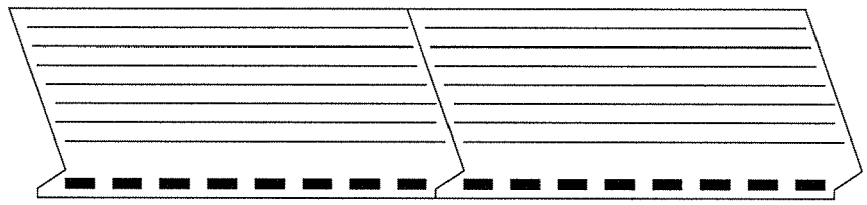
Figure 54:
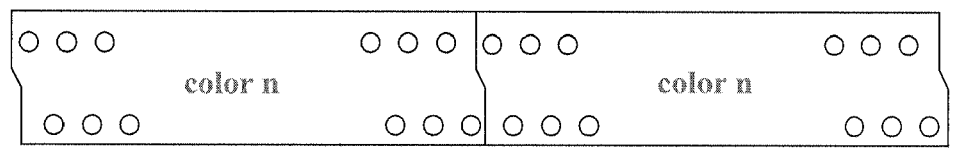

The most ideal format for this kind of printhead from a data delivery point of view is a rectangular join between two adjacent printheads, as shown in FIG. 52. However due to the requirement for dots to be overlapping, a rectangular join results in a it results in a vertical stripe of white down the join section since no nozzle can be in this join region. A white stripe is not acceptable, and therefore this join type is not acceptable. FIG. 53 shows a sloping join similar to that described for the bi-lithic printhead chip, and FIG. 54 is a zoom in of a single color component, illustrating the way in which there is no visible join from a printing point of view (i.e. the problem seen in FIG. 52 has been solved).

Figure 55:
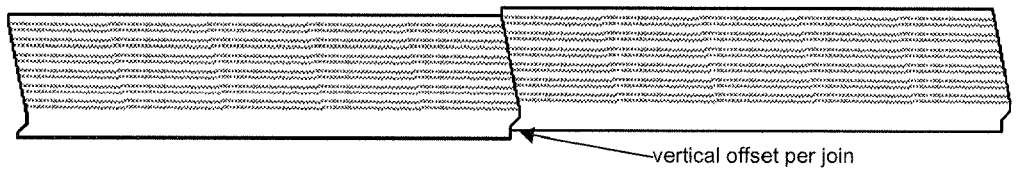

The A-chip/A-chip setup requires perfect vertical alignment. Due to a variety of factors (including ink sealing) it may not be possible to have perfect vertical alignment. To create more space between the nozzles, A-chips can be joined with a growing vertical offset, as shown in FIG. 55. The growing offset comes from the vertical offset between two adjacent tiles. This offset increases with each join. For example, if the offset were 7 lines per join, then an 11 segment printhead would have a total of 10 joins, and 70 lines.

To supply print data to the printhead for a growing offset arrangement, the print data for the relevant lines must be present. A simplistic solution of simply holding the entire line of data for each additional line required leads to increased line store requirements. For example, an 11 segment×1280-dot printhead requires an additional 11×1280-dots×6-colors per line i.e. 10.3125 Kbytes per line. 70 lines requires 722 Kbytes of additional storage. Considering SoPEC contains only 2.5 MB total storage, an additional 722 Kbytes just for the offset component is not desirable. Smarter solutions require storage of smaller parts of the line, but the net effect is the same: increased storage requirements to cope with the growing vertical offset.

Figure 56:
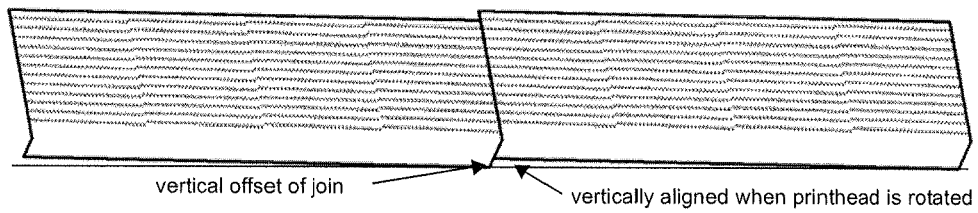

The problem of a growing offset is that a number of additional lines of storage need to be kept, and this number increases proportional to the number of joins i.e. the longer the printhead the more lines of storage are required. However, we can place each chip on a mild slope to achieve a constant number of printlines regardless of the number of joins. The arrangement is similar to that used in PEC1, where the printheads are sloping. The difference here is that each printhead is only mildly sloping, for example so that the total number of lines gained over the length of the printhead is 7. The next printhead can then be placed offset from the first, but this offset would be from the same base. i.e. a printhead line of nozzles starts addressing line n, but moves to different lines such that by the end of the line of nozzles, the dots are 7 dotlines distant from the startline. This means that the 7-line offset required by a growing-offset printhead can be accommodated. The arrangement is shown in FIG. 56.

Note also, that in this example, the printhead segments are vertically aligned (as in PEC1). It may be that the slope can only be a particular amount, and that growing offset compensates for additional differences—i.e. the segments could in theory be misaligned vertically. In general SoPEC must be able to cope with vertically misaligned printhead segments.

The question then arises as to how much slope must be compensated for at 60 ppm speed. Basically—as much as can comfortably handled without too much logic. However, amounts like 1 in 256 (i.e. 1 in 128 with respect to a half color), or 1 in 128 (i.e. 1 in 64 with respect to a half color) must be possible. Greater slopes and weirder slopes (e.g. 1 in 129 with respect to a half color) must be possible, but with a sacrifice of speed i.e. SoPEC must be capable even if it is a slower print.

Note also that the nozzles are aligned, but the chip is placed sloped. This means that when horizontal lines are attempted to be printed and if all nozzles were fired at once, the effect would be lots of sloped lines. However, if the nozzles are fired in the correct order relative to the paper movement, the result is a straight line for n dots, then another straight line for n dots 1 line up.

The PEC1 style slope is the physical arrangement used by printhead segments addressed by PEC1. Note that SoPEC is not expected to work at 60 ppm speed with printheads connected in this way. However it is expected to work and is shown here for completeness, and if tests should prove that there is no working alternative to the 21 mm tile, then SoPEC will require significant reworking to accommodate this arrangement at 60 ppm.

Figure 57:
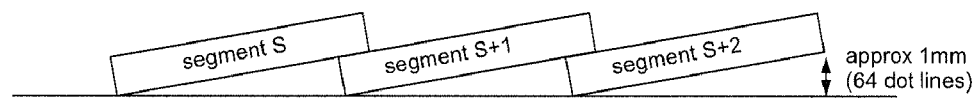

In this scheme, the segments are joined together by being placed on an angle such that the segments fit under each other, as shown in FIG. 57. The exact angle will depend on the width of the Memjet segment and the amount of overlap desired, but the vertical height is expected to be in the order of 1 mm, which equates to 64 dot lines at 1600 dpi.

Figure 58:
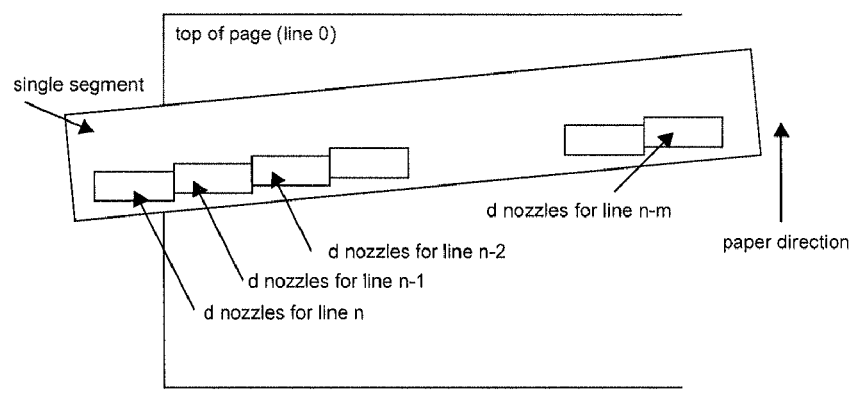

FIG. 58 shows more detail of a single segment in a multi-segment configuration, considering only a single row of nozzles for a single color plane. Each of the segments can be considered to produce dots for multiple sets of lines. The leftmost d nozzles (d depends on the angle that the segment is placed at) produce dots for line n, the next d nozzles produce dots for line n−1, and so on.

In the A-chip/A-chip with inter-line slope compensation the nozzles are physically arranged inside the printhead to compensate for the nozzle firing order given the desire to spread the power across the printhead. This means that one nozzle and its neighbor can be vertically separated on the printhead by 1 printline. i.e. the nozzles don't line up across the printhead. This means a jagged effect on printed "horizontal lines" is avoided, while achieving the goal of averaging the power.

Figure 59:

The arrangement of printheads is the same as that shown in FIG. 56. However the actual nozzles are slightly differently arranged, as illustrated via magnification in FIG. 59.

Figure 60:
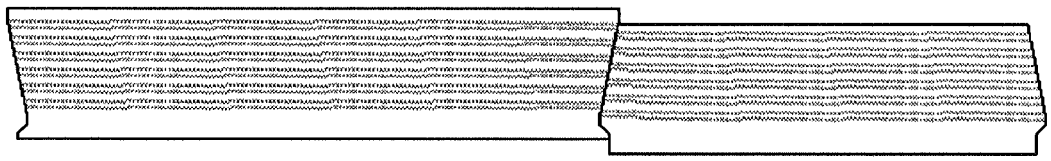

Another possibility is to have two kinds of printing chips: an A-type and a B-type. The two types of chips have different shapes, but can be joined together to form long printheads. A parallelogram is formed when the A-type and B-type are joined. The two types are joined together as shown in FIG. 60.

Figure 61:

Note that this is not a growing offset. The segments of a multiple-segment printhead have alternating fixed vertical offset from a common point, as shown in FIG. 61. If the vertical offset from a type-A to a type-B printhead were n lines, the entire printhead regardless of length would have a total of n lines additionally required in the line store. This is certainly a better proposition than a growing offset).

However there are many issues associated with an A-chip/B-chip printhead. Firstly, there are two different chips i.e. an A-chip, and a B-chip. This means 2 masks, 2 developments, verification, and different handling, sources etc. It also means that the shape of the joins are different for each printhead segment, and this can also imply different numbers of nozzles in each printhead. Generally this is not a good option.

Figure 62:
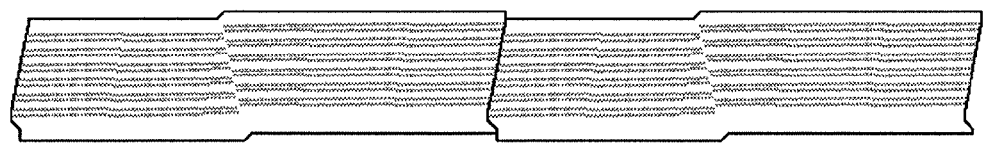

The general linking concept in the A-chip/B-chip above can be incorporated into a single printhead chip that contains the A-B join within the single chip type. This kind of joining mechanism is referred to as the A-B chip since it is a single chip with A and B characteristics. The two types are joined together as shown in FIG. 62. This has the advantage of the single chip for manipulation purposes.

Figure 63:
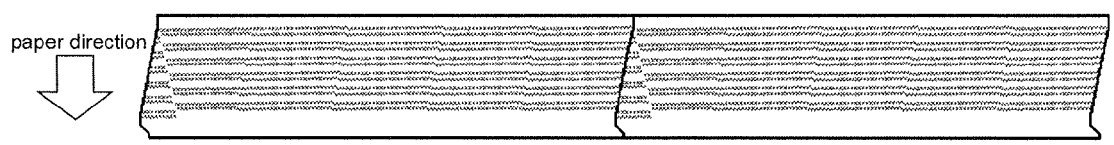
Figure 64:
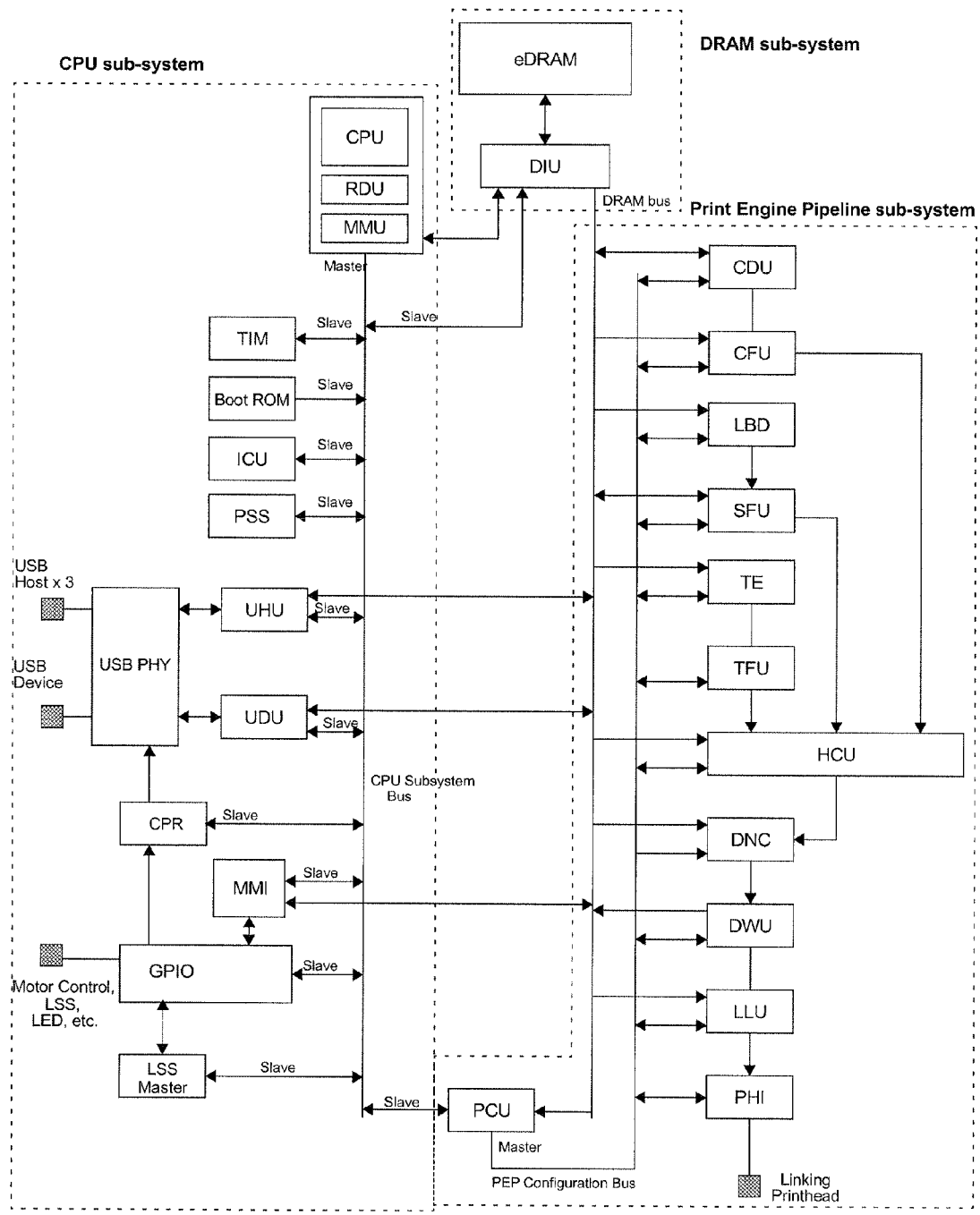
Figure 65:
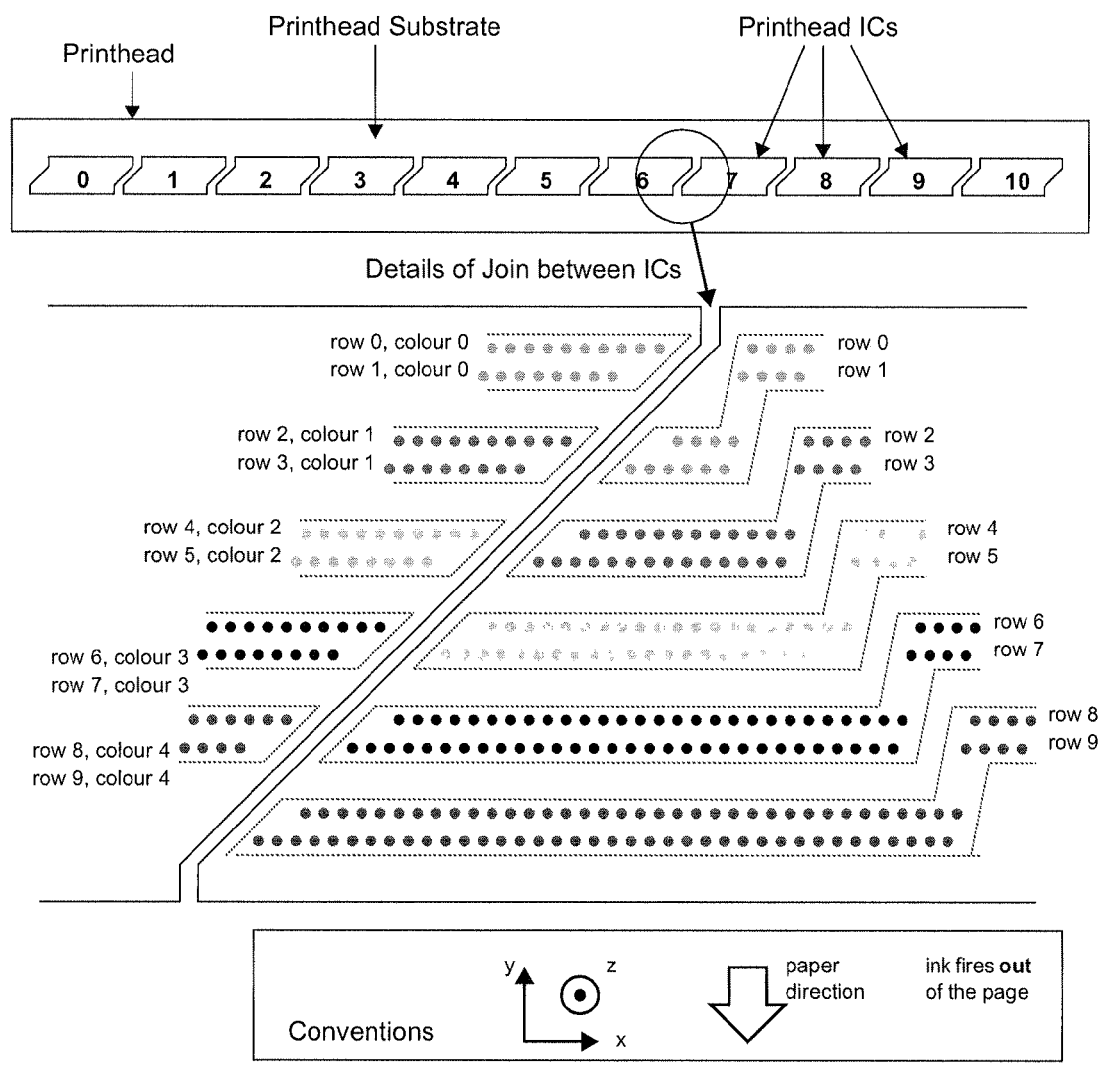
Figures 66, 67:
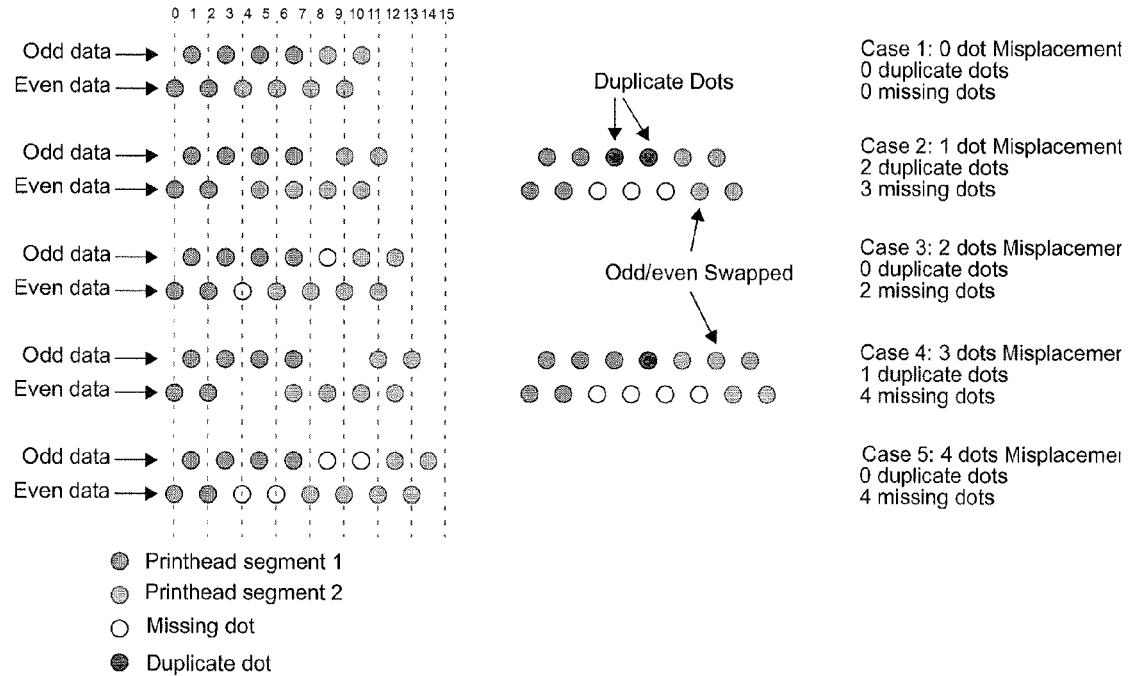

A-B chip with printhead compensation is where we push the A-B chip discontinuity as far along the printhead segment as possible—right to the edge. This maximises the A part of the chip, and minimizes the B part of the chip. If the B part is small enough, then the compensation for vertical misalignment can be incorporated on the printhead, and therefore the printhead appears to SoPEC as if it was a single type A chip. This only makes sense if the B part is minimized since printhead real-estate is more expensive at 0.35 microns rather than on SoPEC at 0.18 microns. The arrangement is shown in FIG. 63.

Note that since the compensation is accomplished on the printhead, the direction of paper movement is fixed with respect to the printhead. This is because the printhead is keeping a history of the data to apply at a later time and is only required to keep the small amount of data from the B part of the printhead rather than the A part.

Within reason, some of the various linking methods can be combined. For example, we may have a mild slope of 5 over the printhead, plus an on-chip compensation for a further 2 lines for a total of 7 lines between type A chips. The mild slope of 5 allows for a 1 in 128 per half color (a reasonable bandwidth increase), and the remaining 2 lines are compensated for in the printheads so do not impact bandwidth at all.

However we can assume that some combinations make less sense. For example, we do not expect to see an A-B chip with a mild slope.

SoPEC also caters for printheads and printhead modules that have redundant nozzle rows. The idea is that for one print line, we fire from nozzles in row x, in the next print line we fire from the nozzles in row y, and the next print line we fire from row x again etc. Thus, if there are any defective nozzles in a given row, the visual effect is halved since we only print every second line from that row of nozzles. This kind of redundancy requires SoPEC to generate data for different physical lines instead of consecutive lines, and also requires additional dot line storage to cater for the redundant rows of nozzles.

Redundancy can be present on a per-color basis. For example, K may have redundant nozzles, but C, M, and Y have no redundancy. In the preferred form, we are concerned with redundant row pairs, i.e. rows 0+1 always print odd and even dots of the same colour, so redundancy would require say rows 0+1 to alternate with rows 2+3.

To enable alternating between two redundant rows (for example), two additional registers REDUNDANT_ROWS_0[7:0] and REDUNDANT_ROWS_1[7:0] are provided at addresses 8 and 9. These are protected registers, defaulting to 0x00. Each register contains the following fields:

Bits [2:0]—RowPairA (000 means rows 0+1, 001 means rows 2+3 etc)

Bits [5:3]—RowPairB (000 means rows 0+1, 001 means rows 2+3 etc)

Bit [6]—toggleAB (0 means loadA/fireB, 1 means loadB/fireA)

Bit [7]—valid (0 means ignore the register).

The toggle bit changes state on every FIRE command; SoPEC needs to clear this bit at the start of a page.

The operation for redundant row printing would use similar mechanism to those used when printing less than 5 colours:

with toggleAB=0, the RowPairA rows would be loaded in the DATA_NEXT sequence, but the RowPairB rows would be skipped. The TDC FIFO would insert dummy data for the RowPairB rows. The RowPairA rows would not be fired, while the RowPairB rows would be fired.

with toggleAB=1, the RowPairB rows would be loaded in the DATA_NEXT sequence, but the RowPairA rows would be skipped. The TDC FIFO would insert dummy data for the RowPairA rows. The RowPairB rows would not be fired, while the RowPairA rows would be fired.

In other embodiments, one or more redundant rows can also be used to implement per-nozzle replacement in the case of one or more dead nozzles. In this case, the nozzles in the redundant row only pirnt dots for positions where a nozzle in the main row is defective. This may mean that only a relatively small numbers of nozzles in the redundant row ever print, but this setup has the advantage that two failed printhead modules (ie, printhead modules with one or more defective nozzles) can be used, perhaps mounted alongside each other on the one printhead, to provide gap-free printing. Of course, if this is to work correctly, it is important to select printhead modules that have different defective nozzles, so that the operative nozzles in each printhead module can compensate for the dead nozzle or nozzles in the other.

Whilst probably of questionable commercial usefulness, it is also possible to have more than one additional row for redundancy per color. It is also possible that only some rows have redundant equivalents. For example, black might have a redundant row due to its high visibility on white paper, whereas yellow might be a less likely candidate since a defective yellow nozzle is much less likely to produce a visually objectionable result.

A dot generator will process zero or one or two segments, based on a two bit configuration. When processing a segment it will process the twelve half colors in order, color zero even first, then color zero odd, then color 1 even, etc. The LLU will know how long a segments is, and we will assume all segments are the same length.

To process a color of a segment the generator will need to load the correct word from dram. Each color will have a current base address, which is a pointer into the dot fifo for that color. Each segment has an address offset, which is added to the base address for the current color to find the first word of that colour. For each generator we maintain a current address value, which is operated on to determine the location future reads occur from for that segment. Each segment also has a start bit index associated with it that tells it where in the first word it should start reading data from.

A dot generator will hold a current 256 bit word it is operating on. It maintains a current index into that word. This bit index is maintained for the duration of one color (for one segment), it is incremented whenever data is produced and reset to the segment specified value when a new color is started. 2 bits of data are produced for the PHI each cycle (subject to being ready and handshaking with the PHI).

From the start of the segment each generator maintains a count, which counts the number of bits produced from the current line. The counter is loaded from a start-count value (from a table indexed by the half-color being processed) that is usually set to 0, but in the case of the A-B printhead, may be set to some other non-zero value. The LLU has a slope span value, which indicates how many dots may be produced before a change of line needs to occur. When this many dots have been produced by a dot generator, it will load a new data word and load 0 into the slope counter. The new word may be found by adding a dram address offset value held by the LLU. This value indicates the relative location of the new word; the same value serves for all segment and all colours. When the new word is loaded, the process continues from the current bit index, if bits 62 and 63 had just been read from the old word (prior to slope induced change) then bits 64 and 65 would be used from the newly loaded word.

When the current index reaches the end of the 256 bits current data word, a new word also needs to be loaded. The address for this value can be found by adding one to the current address.

It is possible that the slope counter and the bit index counter will force a read at the same time. In this case the address may be found by adding the slope read offset and one to the current address.

Observe that if a single handshaking is use between the dot generators and the PHI then the slope counter as used above is identical between all 6 generators, i.e. it will hold the same counts and indicate loads at the same times. So a single slope counter can be used. However the read index differs for each generator (since there is a segment configured start value. This means that when a generator encounters a 256-bit boundary in the data will also vary from generator to generator.

The printhead will be designed for 5 colors. At present the intended use is:
cyan
magenta
yellow
black
infra-red However the design methodology must be capable of targeting a number other than 5 should the actual number of colors change. If it does change, it would be to 6 (with fixative being added) or to 4 (with infra-red being dropped). The printhead chip does not assume any particular ordering of the 5 color channels.

The printhead will contain 1280 nozzles of each color—640 nozzles on one row firing even dots, and 640 nozzles on another row firing odd dots. This means 11 linking printheads are required to assemble an A4/Letter printhead. However the design methodology must be capable of targeting a number other than 1280 should the actual number of nozzles per color change. Any different length may need to be a multiple of 32 or 64 to allow for ink channel routing.

The printhead will target true 1600 dpi printing. This means ink drops must land on the page separated by a distance of 15.875 microns. The 15.875 micron inter-dot distance coupled with MEMs requirements mean that the horizontal distance between two adjacent nozzles on a single row (e.g. firing even dots) will be 31.75 microns. All 640 dots in an odd or even color row are exactly aligned vertically. Rows are fired sequentially, so a complete row is fired in small fraction (nominally one tenth) of a line time, with individual nozzle firing distributed within this row time. As a result dots can end up on the paper with a vertical misplacement of up to one tenth of the dot pitch. This is considered acceptable.

Figure 70:
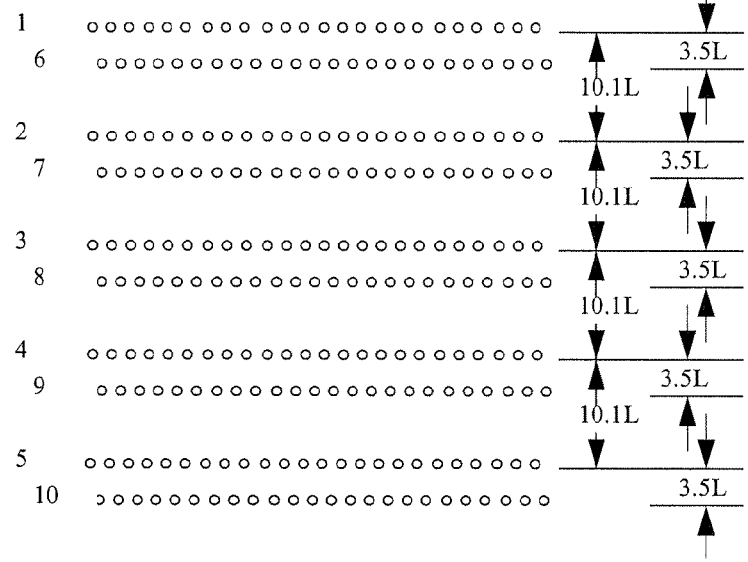

The vertical distance between rows is adjusted based on the row firing order. Firing can start with any row, and then follows a fixed rotation. FIG. 70 shows the default row firing order from 1 to 10, starting at the top even row. Rows are separated by an exact number of dot lines, plus a fraction of a dot line corresponding to the distance the paper will move between row firing times. This allows exact dot-on-dot printing for each color. The starting row can be varied to correct for vertical misalignment between chips, to the nearest 0.1 pixels. SoPEC appropriate delays each row's data to allow for the spacing and firing order.

An additional constraint is that the odd and even rows for given color must be placed close enough together to allow them to share an ink channel. This results in the vertical spacing shown in FIG. 70, where L represents one dot pitch.

Figure 71:
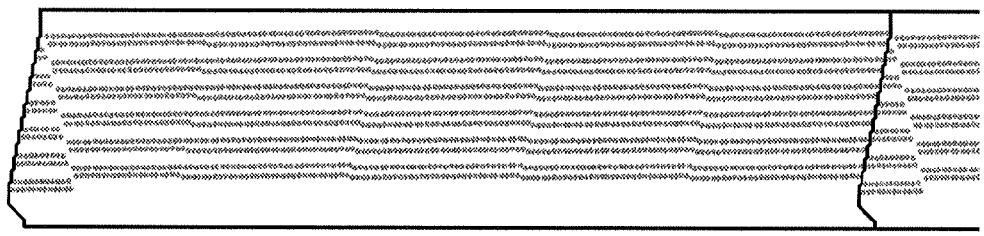
Figure 72:
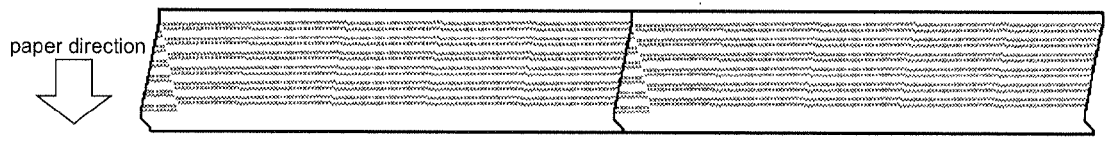

Multiple identical printhead chips must be capable of being linked together to form an effectively horizontal assembled printhead. Although there are several possible internal arrangements, construction and assembly tolerance issues have made an internal arrangement of a dropped triangle (i.e. a set of rows) of nozzles within a series of rows of nozzles, as shown in FIG. 71. These printheads can be linked together as shown in FIG. 72.

Compensation for the triangle is preferably performed in the printhead, but if the storage requirements are too large, the triangle compensation can occur in SoPEC. However, if the compensation is performed in SoPEC, it is required in the present embodiment that there be an even number of nozzles on each side of the triangle.

It will be appreciated that the triangle disposed adjacent one end of the chip provides the minimum on-printhead storage requirements. However, where storage requirements are less critical, other shapes can be used. For example, the dropped rows can take the form of a trapezoid.

The join between adjacent heads has a 45° angle to the upper and lower chip edges. The joining edge will not be straight, but will have a sawtooth or similar profile. The nominal spacing between tiles is 10 microns (measured perpendicular to the edge). SoPEC can be used to compensate for both horizontal and vertical misalignments of the print heads, at some cost to memory and/or print quality. Note also that paper movement is fixed for this particular design.

A print rate of 60 A4/Letter pages per minute is possible. The printhead will assume the following:
  page length=297 mm (A4 is longest page length)
  an inter-page gap of 60 mm or less (current best estimate is more like 15+/−5 mm This implies a line rate of 22,500 lines per second. Note that if the page gap is not to be considered in page rate calculations, then a 20 KHz line rate is sufficient.

Assuming the page gap is required, the printhead must be capable of receiving the data for an entire line during the line time. i.e. 5 colors □ 1280 dots □ 22,500 lines=144 MHz or better (173 MHz for 6 colors).

The printhead will most likely be inserted into a print cartridge for user-insertion into the printer, similar to the way a laser-printer toner cartridge is inserted into a laser printer. In a home/office environment, ESD discharges up to 15 kV may occur during handling. It is not feasible to provide protection against such discharges as part of the chip, so some kind of shielding will be needed during handling. The printhead chip itself will target MIL-STD-883 class 1 (2 kV human body model), which is appropriate for assembly and test in a an ESD-controlled environment.

The SRM043 is a CMOS and MEMS integrated chip. The MEMS structures/nozzles can eject ink which has passed through the substrate of the CMOS via small etched holes. The SRM043 has nozzles arranged to create a accurately placed 1600 dots per inch printout. The SRM043 has 5 colors, 1280 nozzles per color. The SRM043 is designed to link to a similar SRM043 with perfect alignment so the printed image has no artifacts across the join between the two chips.

SRM043 contains 10 rows of nozzles, arranged as upper and lower row pairs of 5 different inks. The paired rows share a common ink channel at the back of the die. The nozzles in one of the paired rows are horizontally spaced 2 dot pitches apart, and are offset relative to each other.

Figure 73:
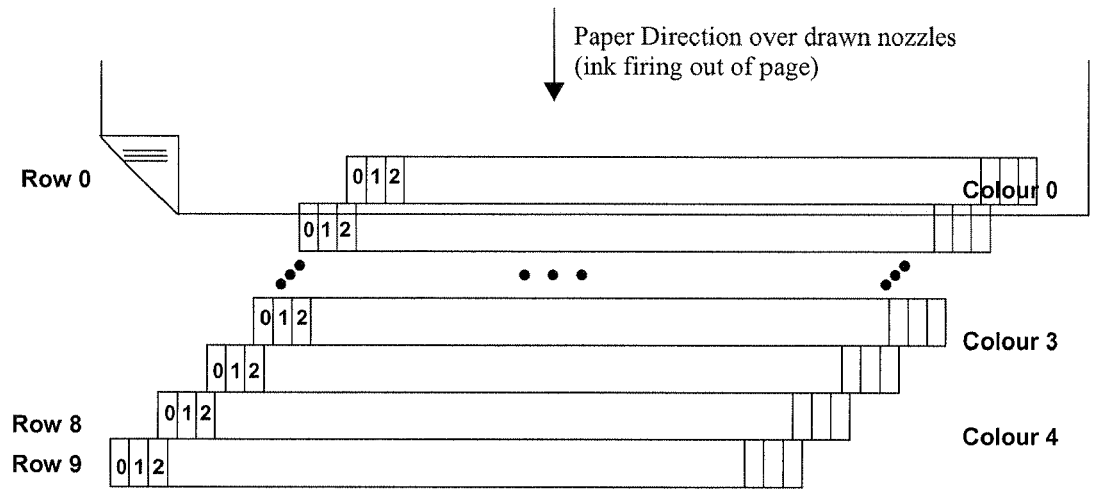
Figure 74:
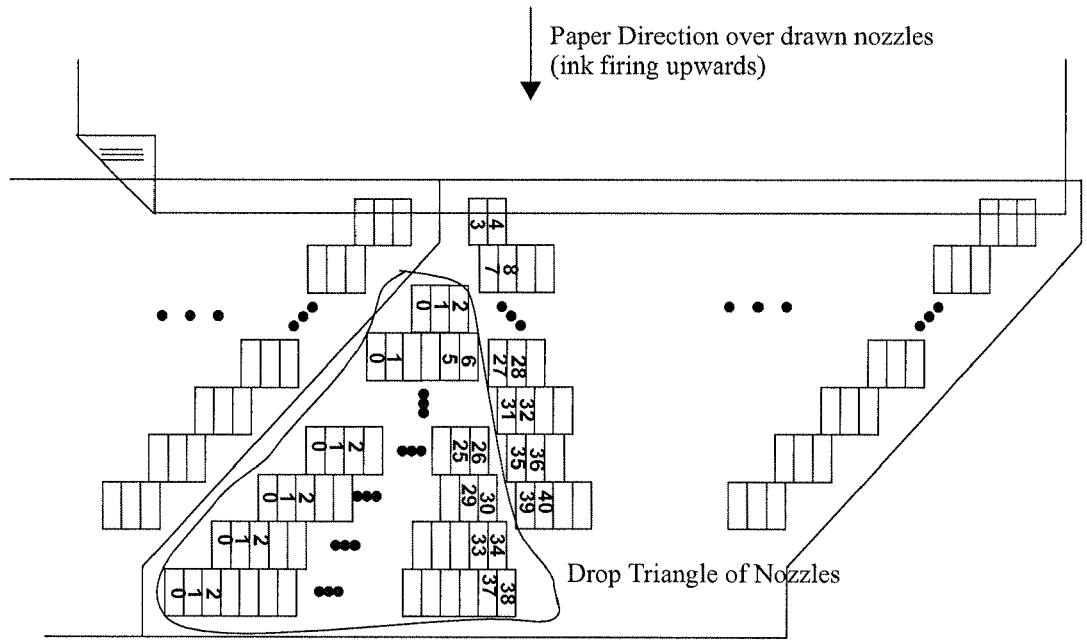
FIG. 74. Nozzle Offset at Linking Ends
FIG. 75. Bonding Diagram
FIG. 76. MEMS Representation.
Figure 75:
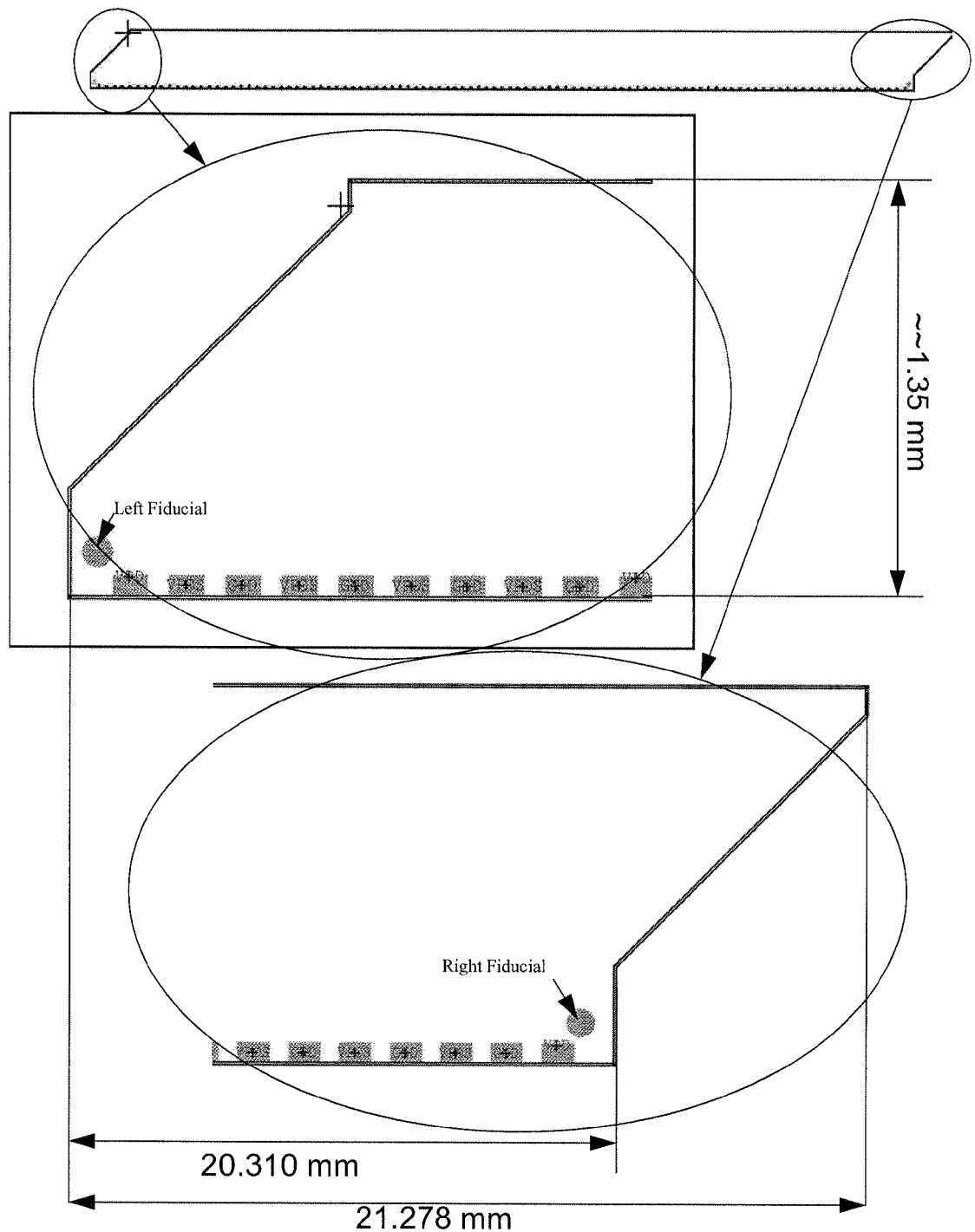
Figure 76:
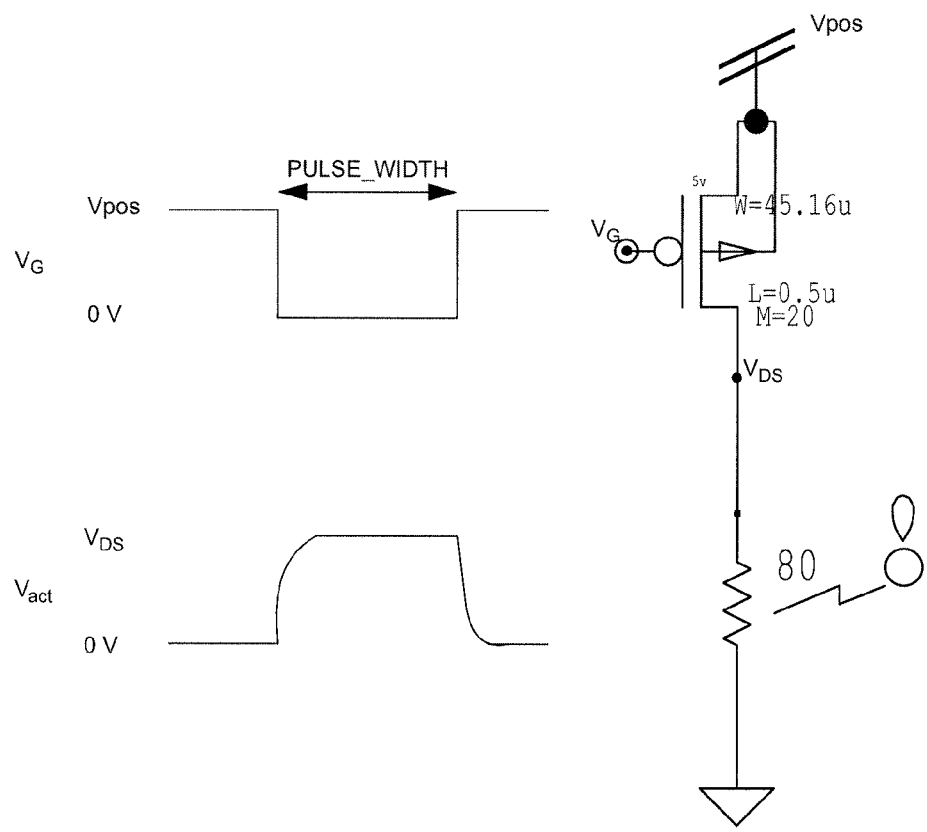
Figure 77:
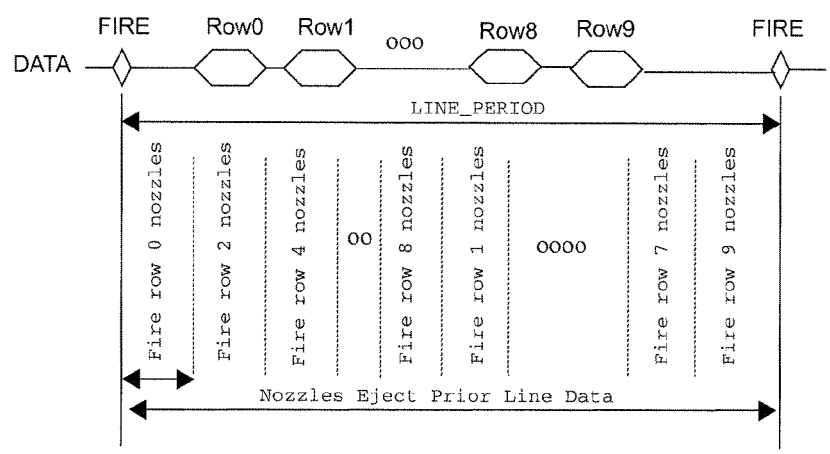
FIG. 77. Line Data Load and Firing, properly placed Printhead,
FIG. 78. Simple Fire order
FIG. 79. Micro positioning
FIG. 80. Measurement convention
FIG. 81. Scrambler implementation
FIG. 82. Block Diagram FIG. 83. TDC block diagram
FIG. 84. DEX block diagram

1600 dpi has a dot pitch of DP □ 15.875 □ m. The MEMS print nozzle unit cell is 2 DP wide by 5 DP high (31.75 □ m×79.375 □ m). To achieve 1600 dpi per colour, 2 horizontal rows of (1280/2) nozzles are placed with a horizontal offset of 5 DP (2.5 cells). Vertical offset is 3.5 DP between the two rows of the same colour and 10.1 DP between rows of different colour. This slope continues between colours and results in a print area which is a trapezoid as shown in FIG. 73. Within a row, the nozzles are perfectly aligned vertically.

For ink sealing reasons a large area of silicon beyond the end nozzles in each row is required on the base of the die, near where the chip links to the next chip. To do this the first 4*Row#+4-2*(Row# mod 2) nozzles from each row are vertical shifted down DP. Data for the nozzles in the triangle must be delayed by 10 line times to match the triangle vertical offset. The appropriate number of data bits at the start of each row are put into a FIFO. Data from the FIFO's output is used instead. The rest of the data for the row bypasses the FIFO.

SRM043 consists of a core of 10 rows of 640 MEMS constructed ink ejection nozzles. Around each of these nozzles is a CMOS unit cell.

The basic operation of the SRM043 is to
  receive dot data for all colours for a single line
  fire all nozzles according to that dot data To minimise peak power, nozzles are not all fired simultaneously, but are spread as evenly as possible over a line time. The firing sequence and nozzle placement are designed taking into account paper movement during a line, so that dots can be optimally placed on the page. Registers allow optimal placement to be achieved for a range of different MEMs firing pulse widths, printing speeds and inter-chip placement errors.

The MEMS device can be modeled as a resistor, that is heated by a pulse applied to the gate of a large PMOS FET. The profile (firing) pulse has a programmable width which is unique to each ink color. The magnitude of the pulse is fixed by the external Vpos supply less any voltage drop across the driver FET.

The unit cell contains a flip-flop forming a single stage of a shift register extending the length of each row. These shift registers, one per row, are filled using a register write command in the data stream. Each row may be individually addressed, or a row increment command can be used to step through the rows.

When a FIRE command is received in the data stream, the data in all the shift register flip-flops is transferred to a dot-latch in each of the unit cells, and a fire cycle is started to eject ink from every nozzle that has a 1 in its dot-latch.

The FIRE command will reset the row addressing to the last row. A DATA_NEXT command preceding the first row data will then fill the first row. While the firing/ejection is taking place, the data for the next line may be loaded into the row shift registers. Due to the mechanism used to handle the falling triangle block of nozzles the following restrictions apply:

The rows must be loaded in the same order between FIRE commands. Any order may be used, but it must be the same each time.

Data must be provided for each row, sufficient to fill the triangle segment.

A fire cycle sequences through all of the nozzles on the chip, firing all of those with a 1 in their dot-latch. The sequence is one row at a time, each row taking 10% of the total fire cycle. Within a row, a programmable value called the column Span is used to control the firing. Each <span>'th nozzle in the row is fired simultaneously, then their immediate left neighbours, repeating <span> times until all nozzles in that row have fired. This is then repeated for each subsequent row, according the row firing order described below. Hence the maximum number of nozzles firing at any one time is 640 divided by <span>.

Figure 78:
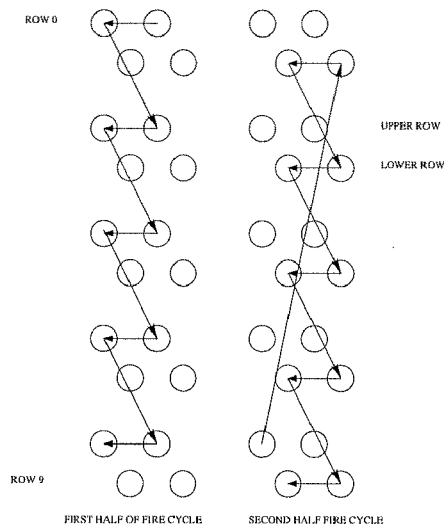

In the default case, row 0 of the chip is fired first, according to the span pattern. These nozzles will all fired in the first 10% of the line time. Next all nozzles in row 2 will fire in the same pattern, similarly then rows 4, 6 then 8. Immediately following, half way through the line time, row 1 will start firing, followed by rows 3, 5, 7 then 9. FIG. 78 shows this for the case of Span=2.

The 1/10 line time together with the 10.1 DP vertical color pitch appear on paper as a 10 DP line separation. The odd and even same-color rows physically spaced 3.5 DP apart vertically fired half a line time apart results on paper as a 3 DP separation.

A modification of the firing order shown in FIG. 78 can be used to assist in the event of vertical misalignment of the printhead when physically mounted into a cartridge. This is termed micro positioning.

Figure 79:
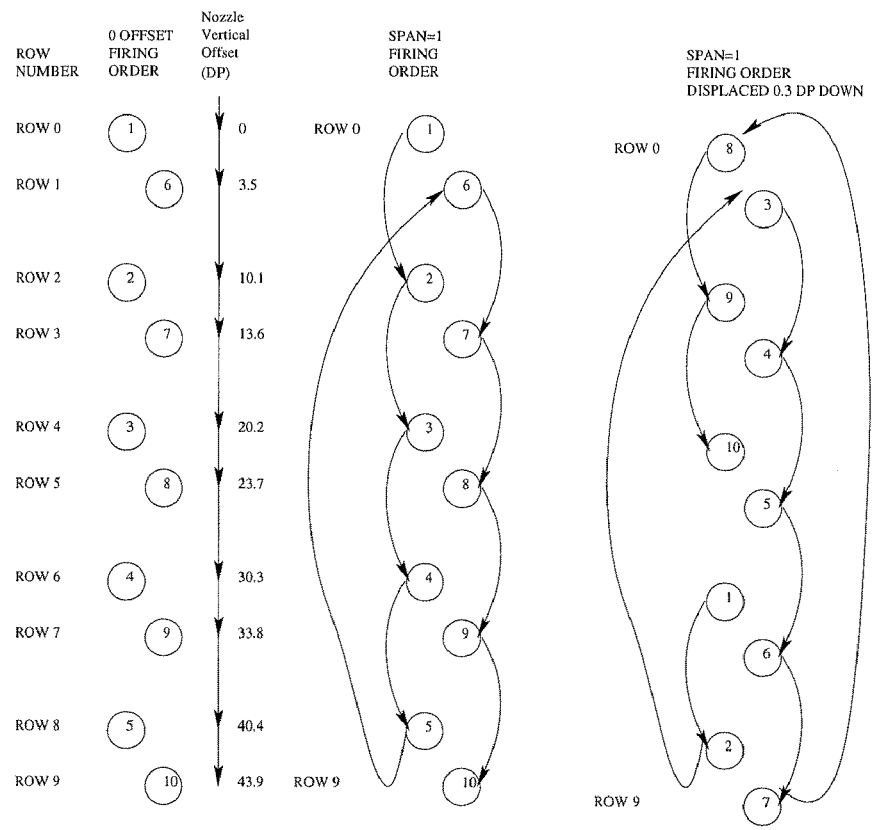
Figure 80:
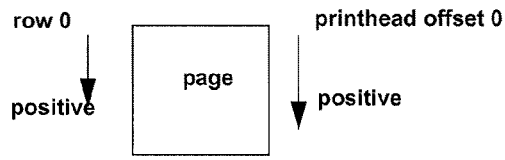
Figure 81:
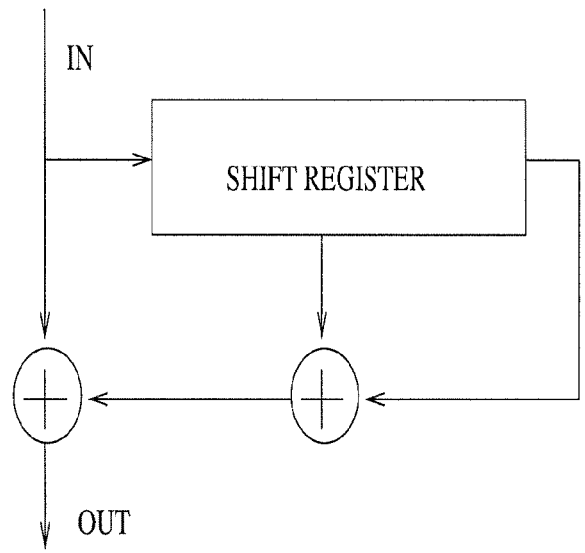

FIG. 79 shows in general how the fire pattern is modified to compensate for mounting misalignment of one printhead with respect to its linking partner. The base construction of the printhead separates the row pairs by slightly more than an integer times the dot Pitch to allow for distributing the fire pattern over the line period. This architecture can be exploited to allow micro positioning.

Consider for example the printhead on the right being placed 0.3 dots lower than the reference printhead to the left. The reference printhead if fired with the standard pattern.

TABLE 1

Worked microposition example, 0 vertical offset

| nozzle | firing order | time delay | nozzle paper row | dot position | required row data |
|---|---|---|---|---|---|
| 0 | 0 | 0 | 0 | 0 | 0 |
| 2 | 1 | 0.1 | 10.1 | 10.1 | −10 |
| 4 | 2 | 0.2 | 20.2 | 20.2 | −20 |
| 6 | 3 | 0.3 | 30.3 | 30.3 | −30 |
| 8 | 4 | 0.4 | 40.4 | 40.4 | −40 |
| 1 | 5 | 0.5 | 3.5 | 3.5 | −3 |
| 3 | 6 | 0.6 | 13.6 | 13.6 | −13 |
| 5 | 7 | 0.7 | 23.7 | 23.7 | −23 |
| 7 | 8 | 0.8 | 33.8 | 33.8 | −33 |
| 9 | 9 | 0.9 | 43.9 | 43.9 | −43 |

TABLE 2

Worked microposition example, offset 0.3 down

| nozzle | Firing order | time delay | nozzle paper row | dot position | required row data |
|---|---|---|---|---|---|
| 0 | 7 | 0.7 | 0 | −0.3 | 1 |
| 2 | 8 | .8 | 10.1 | 9.8 | −9 |
| 4 | 9 | 0.9 | 20.2 | 19.9 | −19 |
| 6 | 0 | 0 | 30.3 | 30 | −30 |
| 8 | 1 | 0.1. | 40.4 | 40.1 | −40 |
| 1 | 2 | 0.2 | 3.5 | 3.2 | −3 |
| 3 | 3 | 0.3 | 13.6 | 13.3 | −13 |
| 5 | 4 | 0.4 | 23.7 | 23.4 | −23 |
| 7 | 5 | 0.5 | 33.8 | 33.5 | −33 |
| 9 | 6 | 0.6 | 43.9 | 43.6 | −43 |

In Tables 1 and 2:
the nozzle column shows the name of the nozzle
the firing order column shows the order the nozzles should fire in
the time delay shows the fraction of a dot pitch the paper has moved since the start of the fire cycle. It is the firing order divided by the number of rows.
the nozzle paper row is the vertical offset to the nozzle, from the printhead geometry
the dot position shows where the nozzle lines up on the page, it is the nozzle paper row-printhead vertical offset.
the required row data column indicates what row data set should be loaded in the row shift register. It is the time delay-dot position, and should always be an integer.

This scheme can compensate for printhead placement errors to 1/10 dot pitch accuracy, for arbitrary printhead vertical misalignment. The VPOSITION register holds the row number to fire first. The printhead performs sub-line placement, the correct line must be loaded by SoPEC.

The width of the pulse that turns a heater on to eject an ink drop is called the profile. The profile is a function of the MEMs characteristics and the ink characteristics. Different profiles might be used for different colors. Optimal dot placement requires each line to take 10% of the line time. to fire. So, while a row for a color with a shorter profile could in theory be fired faster than a color with a longer profile, this is not desirable for dot placement.

To address this, the fire command includes a parameter called the fireperiod. This is the time allocated to fire a single nozzle, irrespective of its profile. For best dot placement, the fireperiod should be chosen to be greater than the longest profile. If a profile is programmed to be longer than a fireperiod, then that nozzle pulse will be extended to match the profile. This extends the line time, it does not affect subsequent profiles. This will degrade dot placement accuracy on paper.

The fireperiod and profiles are measured in wclks. A wclk is a programmable number of 288 Mhz clock periods. The value written to fireperiod and profile registers should be one less than the desired delay in wclks. These registers are all 8 bits wide, so periods from 1 to 256 wclks can be achieved. The Wclk prescaler should be programmed such that the longest profile is between 128 and 255 wclks long. This gives best line time resolution.

The ideal value for column span and fireperiod can be chosen based on the maximum profile and the linetime. The linetime is fixed by the desired printing speed, while the maximum profile depends on ink and MEMs characteristics as described previously. To ensure that all nozzles are fired within a line time, the following relationship must be obeyed:

rows*columnspan*fireperiod<linetime

To reduce the peak Vpos current, the column span should be programmed to be the largest value that obeys the above relationship. This means making fireperiod as small as possible, consistent with the requirement that fireperiod be longer than the maximum profile, for optimal dot placement.

As an example, with a 1 uS maximum profile width, 10 rows, and 44 us desired row time a span of 4 yields 4*10*1=40 uS minimum time. A span of 5 would require 50 uS which is too long.

Having chosen the column span, the fireperiod should be adjusted upward from its minimum so that nozzle firing occupies all of the available linetime. In the above example, fireperiod would be set to 44 us/(4*10)=1.1 uS. This will produce a 10% gap between individual profiles, but ensures that dots are accurately placed on the page. Using a fireperiod longer or shorter than the scaled line time will result in inaccurately placed ink dots.

The fireperiod to be used is updated as a parameter to every FIRE command. This is to allow for variation in the linetime, due to changes in paper speed. This is important because a correctly calculated fireperiod is essential for optimal dot placement.

If a FIRE command is received before a fire cycle is complete, the error bit NO_EARLY_ERR is set and the next fire cycle is started immediately. The final column(s) of the previous cycle will not have been fully fired. This can only occur if the new FIRE command is given early than expected, based on the previous fireperiod.

The profile pulse can only be a rectangular pulse. The only controls available are pulse width and how often the nozzle is fired.

A nozzle can be fired rapidly if required by making the column span 1. Control of the data in the whole array is essential to select which nozzle[s] are fired. Using this technique, a nozzle can be fired for 1/10 of the line period. Data in the row shift registers must be used to control which nozzles are unclogged, and to manage chip peak currents. It is possible to fire individual nozzles even more rapidly by reducing the profile periods on colors not being cleared, and using a short fireperiod.

The program registers generally require multiple bytes of data. and will not be stable until the write operation is complete. An incomplete write operation (not enough data) will leave the register with an unknown value.

Sensitive registers are write protected to make it more difficult for noise or transmission errors to affect them unintentionally. Writes to protected registers must be immediately preceded with a UNPROTECT command. Unprotected registers can be written at any time. Reads are not protected.

A fire cycle will be terminated early when registers controlling fire parameters are written. Hence these registers should preferably not be written while printing a page. Readback of the core requires the user to suspend core write operations to the target row for the duration of the row read. There is no ability to directly read the TDC fifo. It may be indirectly read by writing data to the core with the TDC fifo enabled, then reading back the core row. The triangle sized segment at the start of the core row will contain TDC fifo data.

Reads are performed bit serially, using the read address command to select a register, and the read-next command repeatedly to step through the register bits sequentially from bit 0. While reading, part or all of a register may be read prior to issuing the read-done command. Register bits which are currently undefined will read X.

The printhead is little-endian. Bit order is controlled by the 8B/10B encode on write, and is LSB first on read. Byte 0 is the least significant byte and is sent first. Registers are a varying number of bytes deep, ranging from 0 (unprotect) to 80 (any core row).

The printhead should be powered up with RstL low. This ensures that the printhead will not attempt to fire any nozzle due to the unknown state of power up. This will put registers into their default state (usually zero). RstL may be released after 3 Clk cycles, and IDLE symbols should be send to the printhead.

During these IDLE symbols, the printhead will find the correct delay to correctly sample the Data. Once communication is established, functional registers can be programmed and status flags initialized. For a multi-drop Data, RstL should be deasserted for one chip at a time, and that chip given a unique DEVICE_ID with a write to that register. The last chip may keep the default DEVICE_ID. After this step all chips can be addressed, either separately or by broadcast as desired. A broadcast write may be used to set system parameters such as FIRE, PULSE_PROFILE, MAIN and ENABLE.

Data is written to the core one row at a time. Data is written to the row indexed by ROW_ADDRESS, using the data symbols following a write to the DATA_RESUME or DATA_NEXT register. It is also possible to interrupt this data transfer phase with another (not row data) register write. Use DATA_RESUME to continue the data transfer after the interruption is completed. Only the first 640 bits of data sent to the current row are used, further data is ignored.

In this mode data to the core should be written with the DATA_NEXT command. DATA_RESUME is used if a complete transfer is interrupted. A FIRE command or RstL leaves the ROW_ADDRESS in the correct state for this method to work correctly.

Figure 82:
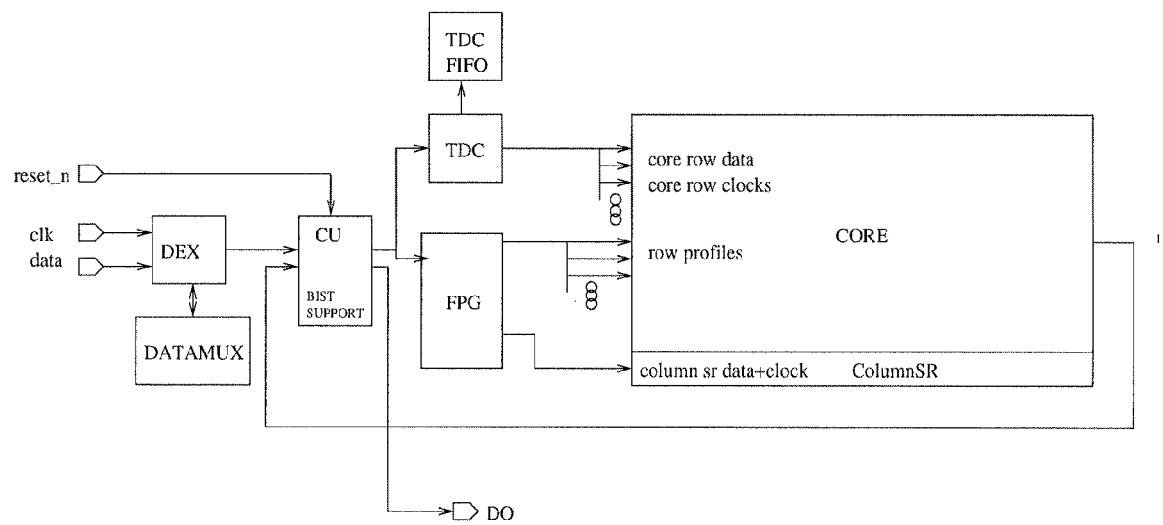
Figure 83:
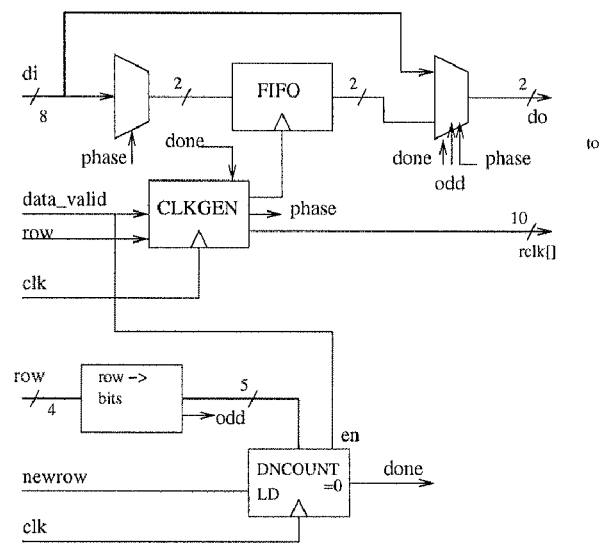
Figure 84:
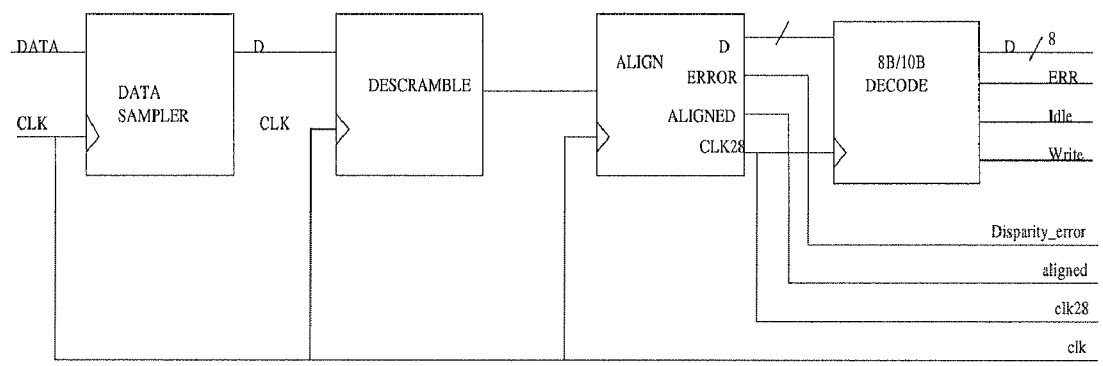

FIG. 82 shows the top levels of the block diagram and by extension the top wrapper netlist for the printhead. The modules comprising the linking printhead CMOS are:

The core contains an array of unit cells and the column shift register (columnSR). The Unit Cell is the base structure of the printhead, consisting of one bit of the row data shift register, a latch to double buffer the data, the MEMS ink firing mechanism, a large transistor to drive the MEMS and some gates to enable that transistor at the correct time. The column shift register is at the bottom of the core unit cell array. It is used to generate timing for unit cell firing, in conjunction with the Fire and Profile Generator (FPG);

The Triangle Delay Compensation (TDC) module handles the loading of data into row shift registers of the core. The dropped triangle at the left hand end of the core prints 10 lines lower on the page than the bulk of each row. This implies data has to be delayed by 10 line times before ink ejection. To minimize overhead on the print controller, and to make the interface cleaner, that delay is provided on chip. The TDC block connects to a fifo used to store the data to be delayed, and routes the first few nozzle data samples in a particular row with data through the fifo. All subsequent data is passed straight through to the row shift registers. The TDC also serializes 8 bit wide data at the symbol rate of 28.8 MHz to 2 bit nibbles at a 144 MHz rate, routes that data to all row shift registers, and synchronously generates gated clocks for the addressed row shift register;

The FPG controls the firing sequence of the nozzles on a row and column basis, and the width of the firing pulses applied to each actuator. It produces timed profile pulses for each row of the core. It also generates clock and data to drive the ColumnSR. The column enables from the ColumnSR, the row profile, and the data within the core are all and'ed together to fire the unit cell actuators and hence eject ink. The FPG sequences the firing to produce accurate dot placement, compensating for printhead position and generates correct width profiles;

The Data EXtractor converts the input data stream into byte-wide command and data symbols to the Command Unit (CU). It interfaces with a full-custom Datamux to sample data presented to the chip at the optimum eye. This data is then descrambled, symbols are aligned and deserialized, and then decoded. Data and symbol type is passed to the CU;

The CU contains most of the control registers. It is responsible for implementing the command protocol, and routes control and data and clocks to the rest of the chip as appropriate. The CU also contains all BIST functionality. The CU synchronizes reset_n for the rest of the chip. Reset is removed synchronously, but is applied to flip flops on the async clear pin. Fire enable is overridden with an asynchronous reset signal; and The chip has high speed clock and data LVDS pads connected to the DEX module. There is a Reset_n input and a modal tristate/open drain output managed by the CU. There are also a number of ground pads, VDD pads and also VPOS pads for the unit cell. The design should have no power sequencing requirements, but does require reset_n to be asserted at power on. Lack of power sequencing requires that the ESD protection in the pads be to ground, there cannot be diodes between the VPOS and VDD rails. Similarly the level translator in the unit cell must ensure that the PMOS switching transistor is off in the event VPOS is up before VDD.

The normal operation of the linking printhead is:
reset the head
program registers to control the firing sequence and parameters
load data for a single print line into (up to) 10 rows of the printhead
send a FIRE command, which latches the loaded data, and begins a fire cycle while the fire cycle is in progress, load data for the next print line
if the page is not finished, goto 4.

Note the spacing of FIRE commands determines the printing speed (in lines/second). The printhead would normally be set up so that a fire cycle takes all of the time available between FIRE commands.

A Memjet printhead chip consists of an array of MEMs ejection devices (typically heaters), each with associated drive logic implemented in CMOS. Together the ejection device and the drive logic comprise a "unit cell". Global control logic accepts data for a line to be printed in the form of a stream of fire bits, one bit per device. The fire bits are shifted into the array via a shift register. When each unit cell has the correct fire data bit, the control logic initiates a firing sequence, in which each ejection device is fired if its corresponding fire bit is a 1, and not fired if its corresponding fire bit is a 0.

Ejection devices can suffer damage over time, due to
latent manufacturing defects
temporary environment conditions (such as depriming or temporary blockage)
permanent environment conditions (permanent blockage)

Generally the damage is associated with the device getting excessively hot.

As the devices rely on self-cooling to operate correctly, there is a vicious cycle: a hot device is likely to malfunction (e.g. to deprime, or fail to eject a drop when fired), and a malfunctioning device is likely to become hot. Also, a malfunctioning device can generate heat that flows to adjacent (good) devices, causing them to overheat and malfunction. Damaged or malfunctioning ejection devices (heaters) generally also exhibit a variation in the resistivity of the heater material.

Continued operation of a device at excess temperature can cause permanent damage, including permanent total failure. Therefore it is useful to detect temperature, and/or conditions that may lead to excess temperature, and use this information to temporarily or permanently suppress the firing operation of a device or devices. Temporarily suppressing firing is intended to allow a device to cool, and/or another adverse condition such as depriming to clear, so that the device can subsequently resume correct firing. Permanently suppressing firing stops a damaged device from generating heat that affects adjacent devices.

The basis of the temperature (or other) detection is the variation of a measurable parameter with respect to a threshold. This provides a binary measurement result per sensor—a negative result indicates a safe condition for firing, a positive result indicates that the temperature has exceeded a first threshold which is a potentially dangerous condition for firing. The threshold can be made variable via the control logic, to allow calibration.

A direct thermal sensor would include a sensing device with a known temperature variation co-efficient; there are many well-known techniques in this area. Alternatively we can detect a change in the ejection device parameters (e.g. resistivity) directly, without it necessarily being attributable to temperature.

Temperature sensing is possible using either a MEMs sensing device as part of the MEMs heater structure, or a CMOS sensing device included in the drive logic adjacent to the MEMs heater. Depending on requirements, a sensing device can be provided for every unit cell, or a sensing device per group (2, 4, 8 etc.) of cells. This depends on the size and complexity of the sensing device, the accuracy of the sensing device, and on the thermal characteristics of the printhead structure.

As mentioned, the sensing devices give a positive or negative result per cell or group of cells. There are a number of ways to use this data to suppress firing. In the simplest case, firing is suppressed directly in the unit cell driving logic, based on the most recent sensing result for that cell, by overriding the firing data provided by external controller.

Alternatively, the sensing result can be passed out of the unit cell array to the control logic on the printhead chip, which can then suppress firing by modifying the firing data shifted into the cell for subsequent lines. One method of passing the results out of the array would be to load it each cell's sensing result into the existing shift register, and shift the sensor results out as new firing data is being shifted in. Alternatively a dedicated circuit can be used to pass the results out.

The control logic could use the raw sensing results alone to make the decision to suppress firing. Alternatively, it could combine these results with other data, for example:
allow a programmable override, i.e. ignore the sensor results, either for a region or the whole chip
process groups of sensing results to make decisions on which cells should not be fired
use and algorithm based on cumulative sensor results over time.

In addition to operations on the printhead, sensing results (raw or processed/summarised) can be fed back to SoPEC (or other high level device controlling the printhead), for example to update the dead nozzle map, or change printhead parameters.

One way of doing this is to use the shift register used to shift in the dot data. For example, the clock signal that causes the values in the shift register to be output to the buffer can also trigger the shift registers to load the thermal values relating to the various nozzles. These thermal values are shifter out of the shift register as new dot data is shifted in.

The thermal signals can be stored in memory and use to effect modifications to operation of one or more nozzles where thermal problems are identified. However, it is also possible to provide the output of the shift register to the input of an AND gate. The other input to the AND gate is the dot data to be clocked in. At any particular time, the dot data at the input to the AND gate corresponds with the thermal data for the nozzle for which the dot data is destined. In this way, the dot data is only loaded, and the nozzle enabled, if the thermal data indicates that there is no thermal problem with the nozzle. A second AND gate can be provided as a global enable/disable mechanism. The second AND gate accepts an enable signal and the output of the shift register as inputs, and outputs its result to the input of the first AND gate. In this embodiment, the other input to the AND gate is the current dot data.

Depending upon the implementation, the nozzle or nozzles can be reactivated once the temperature falls to or below the first threshold. However, it may also be desirable to allow some hysteresis by setting a second threshold lower than first and only enabling the nozzle or nozzles once the second threshold is reached.

It is possible to use SoPEC to send dot data to a printhead that is using less than its full complement of rows. For example, it is possible that the fixative, IR and black channels will be omitted in a low end, low cost printer. Rather than design a new printhead having only three channels, it is possible to select which channels are active in a printhead with a larger number of channels (such as the presently preferred channel version). It may be desirable to use a printhead which has one or more defective nozzles in up to three rows as a printhead (or printhead module) in a three color printer. It would be disadvantageous to have to load empty data into each empty channel, so it is preferable to allow one or more rows to be disabled in the printhead.

The printhead already has a register that allows each row to be individually enabled or disabled (register ENABLE at address 0). Currently all this does is suppress firing for a non-enabled row.

To avoid SoPEC needing to send blank data for the unused rows, the functionality of these bits is extended to:

1. skip over disabled rows when DATA_NEXT register is written;

2. force dummy bits into the TDC FIFO for a disabled rows, corresponding to the number of nozzles in the dropped triangle section for that row. These dummy bits are written immediately following the first row write to the fifo following a fire command.

Using this arrangement, it is possible to operate a 6 color printhead as a 1 to 6 color printhead, depending upon which mode is set. The mode can be set by the printer controller (SoPEC); once set, SoPEC need only send dot data for the active channels of the printhead.

It will be appreciated by those skilled in the art that the foregoing represents only a preferred embodiment of the present invention. Those skilled in the relevant field will immediately appreciate that the invention can be embodied in many other forms.

We claim:

1. A printer comprising:
a plurality of elongate printhead modules arranged parallel to each other to extend across a pagewidth, each printhead module having a plurality of ink ejection nozzles, at least one of the printhead modules being longer than the other printhead modules; and
a plurality of substantially identical controllers for processing print data into dot data and for controlling ink ejection of the nozzles of the printhead modules in accordance with the dot data, at least one of the controllers being arranged to directly control all of the printhead modules and at least one other of the controllers being arranged to directly control only one of the printhead modules, each controller having a plurality of serial outputs for directly supplying the dot data for a plurality of channels of the associated printhead module or modules.

2. A printer according to claim 1, wherein the plurality of channels include at least two color channels.

3. A printer according to claim 1, wherein the plurality of channels include at least one fixative channel.

4. A printer according to claim 1, wherein the plurality of channels include at least one infrared ink channel.

5. A printer according to claim 1, wherein plurality of substantially identical controllers are connected to a common input of the printhead modules.

6. A printer according to claim 1, wherein the printhead modules are configured such that no dot data passes between them.

7. A printer according to claim 1, wherein at least one of the controllers is configured to output to the associated printhead module or modules dot data to be printed with at least two different inks and control data for controlling printing of the dot data.

* * * * *